United States Patent
Jayawardene et al.

(10) Patent No.: US 10,939,142 B2
(45) Date of Patent: Mar. 2, 2021

(54) APPARATUS AND METHODS FOR CONTENT STORAGE, DISTRIBUTION AND SECURITY WITHIN A CONTENT DISTRIBUTION NETWORK

(71) Applicant: Charter Communications Operating, LLC, St. Louis, MO (US)

(72) Inventors: Diwelawatte Jayawardene, Aurora, CO (US); Pratik Das, Centennial, CO (US); Manish Jindal, Centennial, CO (US); Joshua Sanders, St. Louis, MO (US); Elliott Hoole, Parker, CO (US); Ramneek Bali, Frisco, TX (US)

(73) Assignee: Charter Communications Operating, LLC, St. Louis, MO (US)

( * ) Notice: Subject to any disclaimer, the term of this patent is extended or adjusted under 35 U.S.C. 154(b) by 110 days.

(21) Appl. No.: 16/058,520

(22) Filed: Aug. 8, 2018

(65) Prior Publication Data

US 2019/0268633 A1 Aug. 29, 2019

Related U.S. Application Data

(60) Provisional application No. 62/636,020, filed on Feb. 27, 2018.

(51) Int. Cl.
*G06F 15/16* (2006.01)
*H04N 21/231* (2011.01)
(Continued)

(52) U.S. Cl.
CPC ... *H04N 21/23103* (2013.01); *H04N 21/2347* (2013.01); *H04N 21/23106* (2013.01); *H04N 21/44004* (2013.01); *H04N 21/8456* (2013.01)

(58) Field of Classification Search
CPC ....... H04N 21/23103; H04N 21/23106; H04N 21/2347; H04N 21/44004; H04N 21/8456
(Continued)

(56) References Cited

U.S. PATENT DOCUMENTS

| 4,521,881 | A | 6/1985 | Stapleford et al. |
| 4,546,382 | A | 10/1985 | McKenna et al. |

(Continued)

FOREIGN PATENT DOCUMENTS

| CA | 2643806 C | 6/2013 |
| GB | 2405567 A | 3/2005 |

(Continued)

OTHER PUBLICATIONS

CableLabs Asset Distribution Interface (ADI) Specification, Version 1 1, MD-SP-ADI1.103-040107, Jan. 7, 2004. pp, 1-26.
(Continued)

*Primary Examiner* — Alicia Baturay
(74) *Attorney, Agent, or Firm* — Gazdzinski & Associates, PC

(57) ABSTRACT

Apparatus and methods for content fragmentation, distribution, protection, and re-constitution within a content distribution network. In one embodiment, the apparatus and methods enable distribution of content fragments to edge nodes (which may include user or subscriber CPE), thereby enabling edge networks or membership groups to be established wherein content can be shared solely at the edge. In one variant, high data bandwidth, symmetric uplink/downlink, low latency PHY links (e.g., 5G NR-compliant wireless interfaces) between the edge nodes participating in the edge networks or membership groups are used such that particular quality of service/experience performance requirements can be met. Distribution of the fragments also advantageously enhances redundancy and security.

20 Claims, 21 Drawing Sheets

(51) Int. Cl.
  *H04N 21/44*    (2011.01)
  *H04N 21/2347*  (2011.01)
  *H04N 21/845*   (2011.01)

(58) Field of Classification Search
  USPC .................................................... 709/219
  See application file for complete search history.

(56) References Cited

U.S. PATENT DOCUMENTS

| | | |
|---|---|---|
| 4,602,279 A | 7/1986 | Freeman |
| 4,930,120 A | 5/1990 | Baxter et al. |
| 5,155,591 A | 10/1992 | Wachob |
| 5,233,423 A | 8/1993 | Jernigan et al. |
| 5,313,454 A | 5/1994 | Bustini et al. |
| 5,361,091 A | 11/1994 | Hoarty et al. |
| 5,600,364 A | 2/1997 | Hendricks et al. |
| RE35,651 E | 11/1997 | Bradley et al. |
| 5,734,380 A | 3/1998 | Adams et al. |
| 5,758,257 A | 5/1998 | Herz et al. |
| 5,774,170 A | 6/1998 | Hite et al. |
| 5,793,410 A | 8/1998 | Rao |
| 5,815,662 A | 9/1998 | Ong |
| 5,862,312 A | 1/1999 | Mann et al. |
| 5,878,324 A | 3/1999 | Borth et al. |
| 5,886,995 A | 3/1999 | Arsenault et al. |
| 5,914,945 A | 6/1999 | Abu-Amara et al. |
| 5,926,205 A | 7/1999 | Krause et al. |
| 5,935,206 A | 8/1999 | Dixon et al. |
| 5,963,844 A | 10/1999 | Dail |
| 6,002,393 A | 12/1999 | Hite et al. |
| 6,018,359 A | 1/2000 | Kermode et al. |
| 6,047,327 A | 4/2000 | Tso et al. |
| 6,081,830 A | 6/2000 | Schindler |
| 6,092,178 A | 7/2000 | Jindal et al. |
| 6,105,134 A | 8/2000 | Pinder et al. |
| 6,124,878 A | 9/2000 | Adams et al. |
| 6,128,316 A | 10/2000 | Takeda et al. |
| 6,134,532 A | 10/2000 | Lazarus et al. |
| 6,157,377 A | 12/2000 | Shah-Nazaroff et al. |
| 6,161,142 A | 12/2000 | Wolfe et al. |
| 6,167,432 A | 12/2000 | Jiang |
| 6,169,728 B1 | 1/2001 | Perreault et al. |
| 6,175,856 B1 | 1/2001 | Riddle |
| 6,182,050 B1 | 1/2001 | Ballard |
| 6,211,869 B1 | 4/2001 | Loveman et al. |
| 6,211,901 B1 | 4/2001 | Imajima et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,240,243 B1 | 5/2001 | Chen et al. |
| 6,240,553 B1 | 5/2001 | Son et al. |
| 6,252,964 B1 | 6/2001 | Wasilewski et al. |
| 6,256,393 B1 | 7/2001 | Safadi et al. |
| 6,275,618 B1 | 8/2001 | Kodama |
| 6,330,609 B1 | 12/2001 | Garofalakis et al. |
| 6,337,715 B1 | 1/2002 | Inagaki et al. |
| 6,345,279 B1 | 2/2002 | Li et al. |
| 6,353,626 B1 | 3/2002 | Sunay et al. |
| 6,378,130 B1 | 4/2002 | Adams |
| 6,434,141 B1 | 8/2002 | Oz et al. |
| 6,446,261 B1 | 9/2002 | Rosser |
| 6,463,508 B1 | 10/2002 | Wolf et al. |
| 6,463,585 B1 | 10/2002 | Hendricks et al. |
| 6,487,721 B1 | 11/2002 | Safadi |
| 6,498,783 B1 | 12/2002 | Lin |
| 6,502,139 B1 | 12/2002 | Birk et al. |
| 6,516,412 B2 | 2/2003 | Wasilewski et al. |
| 6,560,578 B2 | 5/2003 | Eldering |
| 6,590,865 B1 | 7/2003 | Ibaraki et al. |
| 6,594,699 B1 | 7/2003 | Sahai et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,651,103 B1 | 11/2003 | Markowitz et al. |
| 6,671,736 B2 | 12/2003 | Virine et al. |
| 6,687,735 B1 | 2/2004 | Logston et al. |
| 6,700,624 B2 | 3/2004 | Yun |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,187 B1 | 5/2004 | Vogel |
| 6,745,245 B1 | 6/2004 | Carpenter |
| 6,763,391 B1 | 7/2004 | Ludtke |
| 6,771,290 B1 | 8/2004 | Hoyle |
| 6,772,435 B1 | 8/2004 | Thexton et al. |
| 6,775,843 B1 | 8/2004 | McDermott |
| 6,799,196 B1 | 9/2004 | Smith |
| 6,839,757 B1 | 1/2005 | Romano et al. |
| 6,842,783 B1 | 1/2005 | Boivie et al. |
| 6,859,839 B1 | 2/2005 | Zahorjan et al. |
| 6,868,439 B2 | 3/2005 | Basu et al. |
| 6,891,841 B2 | 5/2005 | Leatherbury et al. |
| 6,898,800 B2 | 5/2005 | Son et al. |
| 6,917,628 B2 | 7/2005 | McKinnin et al. |
| 6,944,166 B1 | 9/2005 | Perinpanathan et al. |
| 6,948,183 B1 | 9/2005 | Peterka |
| 6,961,430 B1 | 11/2005 | Gaske et al. |
| 6,977,691 B1 | 12/2005 | Middleton et al. |
| 6,981,045 B1 | 12/2005 | Brooks |
| 6,985,934 B1 | 1/2006 | Armstrong et al. |
| 6,986,156 B1 | 1/2006 | Rodriguez et al. |
| 7,010,801 B1 | 3/2006 | Jerding et al. |
| 7,017,174 B1 | 3/2006 | Sheedy |
| 7,024,461 B1 | 4/2006 | Janning et al. |
| 7,024,676 B1 | 4/2006 | Klopfenstein |
| 7,027,460 B2 | 4/2006 | Iyer et al. |
| 7,031,348 B1 | 4/2006 | Gazit |
| 7,039,116 B1 | 5/2006 | Zhang et al. |
| 7,039,169 B2 | 5/2006 | Jones |
| 7,039,614 B1 | 5/2006 | Candelore |
| 7,039,938 B2 | 5/2006 | Candelore |
| 7,047,309 B2 | 5/2006 | Baumann et al. |
| 7,058,387 B2 | 6/2006 | Kumar et al. |
| 7,069,573 B1 | 6/2006 | Brooks et al. |
| 7,073,189 B2 | 7/2006 | McElhatten et al. |
| 7,075,945 B2 | 7/2006 | Arsenault et al. |
| 7,085,839 B1 | 8/2006 | Baugher et al. |
| 7,086,077 B2 | 8/2006 | Giammaressi |
| 7,088,910 B2 | 8/2006 | Potrebic et al. |
| 7,089,577 B1 | 8/2006 | Rakib et al. |
| 7,093,272 B1 | 8/2006 | Shah-Nazaroff et al. |
| 7,100,183 B2 | 8/2006 | Kunkel et al. |
| 7,103,906 B1 | 9/2006 | Katz et al. |
| 7,107,462 B2 | 9/2006 | Fransdonk |
| 7,110,457 B1 | 9/2006 | Chen et al. |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,174,385 B2 | 2/2007 | Li |
| 7,178,161 B1 | 2/2007 | Fristoe et al. |
| 7,181,010 B2 | 2/2007 | Russ et al. |
| 7,181,760 B1 | 2/2007 | Wallace |
| 7,191,461 B1 | 3/2007 | Arsenault et al. |
| 7,194,752 B1 | 3/2007 | Kenyon et al. |
| 7,194,756 B2 | 3/2007 | Addington et al. |
| 7,200,788 B2 | 4/2007 | Hiraki et al. |
| 7,203,940 B2 | 4/2007 | Barmettler et al. |
| 7,207,055 B1 | 4/2007 | Hendricks et al. |
| 7,216,265 B2 | 5/2007 | Hughes et al. |
| 7,225,164 B1 | 5/2007 | Candelore et al. |
| 7,225,458 B2 | 5/2007 | Klauss et al. |
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,254,608 B2 | 8/2007 | Yeager et al. |

(56) References Cited

U.S. PATENT DOCUMENTS

| | | | |
|---|---|---|---|
| 7,257,650 B2 | 8/2007 | Maciesowicz | |
| 7,266,198 B2 | 9/2007 | Medvinsky | |
| 7,266,611 B2 | 9/2007 | Jabri et al. | |
| 7,266,726 B1 | 9/2007 | Ladd et al. | |
| 7,283,782 B2 | 10/2007 | Sinnarajah et al. | |
| 7,296,074 B2 | 11/2007 | Jagels | |
| 7,299,290 B2 | 11/2007 | Karpoff | |
| 7,305,691 B2 | 12/2007 | Cristofalo | |
| 7,308,415 B2 | 12/2007 | Kimbrel et al. | |
| 7,317,728 B2 | 1/2008 | Acharya et al. | |
| 7,320,134 B1 | 1/2008 | Tomsen et al. | |
| 7,325,073 B2 | 1/2008 | Shao et al. | |
| 7,327,692 B2 | 2/2008 | Ain et al. | |
| 7,334,044 B1 | 2/2008 | Allen | |
| 7,340,759 B1 | 3/2008 | Rodriguez | |
| 7,346,688 B2 | 3/2008 | Allen et al. | |
| 7,346,917 B2 | 3/2008 | Gatto et al. | |
| 7,352,775 B2 | 4/2008 | Powell | |
| 7,355,980 B2 | 4/2008 | Bauer et al. | |
| 7,363,371 B2 | 4/2008 | Kirby et al. | |
| 7,370,120 B2 | 5/2008 | Kirsch et al. | |
| 7,376,386 B2 | 5/2008 | Phillips et al. | |
| 7,379,494 B2 | 5/2008 | Raleigh et al. | |
| 7,403,618 B2 | 7/2008 | Van et al. | |
| 7,434,245 B1 | 10/2008 | Shiga et al. | |
| 7,457,520 B2 | 11/2008 | Rosetti et al. | |
| 7,464,179 B2 | 12/2008 | Hodges et al. | |
| 7,555,006 B2 | 6/2009 | Wolfe et al. | |
| 7,567,565 B2 | 7/2009 | La | |
| 7,577,118 B2 | 8/2009 | Haumonte et al. | |
| 7,602,820 B2 | 10/2009 | Helms et al. | |
| 7,617,516 B2 | 11/2009 | Huslak et al. | |
| 7,630,401 B2 | 12/2009 | Iwamura | |
| 7,689,995 B1 | 3/2010 | Francis et al. | |
| 7,690,020 B2 | 3/2010 | Lebar | |
| 7,720,986 B2 | 5/2010 | Savoor et al. | |
| 7,721,313 B2 | 5/2010 | Barrett | |
| 7,757,251 B2 | 7/2010 | Gonder et al. | |
| 7,763,360 B2 | 7/2010 | Paul et al. | |
| 7,779,097 B2 | 8/2010 | Lamkin et al. | |
| 7,783,316 B1 | 8/2010 | Mitchell | |
| 7,805,052 B2 | 9/2010 | Nakamura et al. | |
| 7,805,741 B2 | 9/2010 | Yeh | |
| 7,836,178 B1 | 11/2010 | Bedell et al. | |
| 7,908,626 B2 | 3/2011 | Williamson et al. | |
| 7,917,008 B1 | 3/2011 | Lee et al. | |
| 7,930,715 B2 | 4/2011 | Hendricks et al. | |
| 8,122,479 B2 | 2/2012 | Britt | |
| 8,170,065 B2 | 5/2012 | Hasek et al. | |
| 8,213,358 B1 | 7/2012 | Goyal et al. | |
| 8,280,982 B2 | 10/2012 | La et al. | |
| 8,290,351 B2 | 10/2012 | Plotnick et al. | |
| 8,291,453 B2 | 10/2012 | Boortz et al. | |
| 8,341,242 B2 | 12/2012 | Dillon et al. | |
| 8,359,351 B2 | 1/2013 | Istvan et al. | |
| 8,365,212 B1 | 1/2013 | Orlowski | |
| 8,392,952 B2 | 3/2013 | Carlucci et al. | |
| 8,458,125 B1 | 6/2013 | Chong, Jr. et al. | |
| 8,468,099 B2 | 6/2013 | Headings et al. | |
| 8,516,533 B2 | 8/2013 | Davis et al. | |
| 8,521,002 B2 | 8/2013 | Yahata et al. | |
| 8,561,116 B2 | 10/2013 | Hasek | |
| 8,613,089 B1 | 12/2013 | Holloway et al. | |
| 8,634,703 B1 | 1/2014 | Barton | |
| 8,667,548 B2 * | 3/2014 | Chen | H04L 43/04 |
| | | | 725/117 |
| 8,726,303 B2 | 5/2014 | Ellis, III | |
| 8,804,519 B2 | 8/2014 | Svedberg | |
| 8,843,973 B2 | 9/2014 | Morrison | |
| 8,997,136 B2 | 3/2015 | Brooks et al. | |
| 9,071,859 B2 | 6/2015 | Lajoie | |
| 9,178,634 B2 | 11/2015 | Tidwell et al. | |
| 9,277,266 B2 | 3/2016 | Riedl et al. | |
| 9,591,069 B2 * | 3/2017 | Thornburgh | H04L 67/1046 |
| 9,910,742 B1 * | 3/2018 | Faibish | G06F 3/0685 |
| 10,007,673 B1 * | 6/2018 | Faibish | G06F 16/185 |
| 10,078,639 B1 * | 9/2018 | Faibish | G06F 16/185 |
| 10,116,629 B2 * | 10/2018 | Crofton | H04L 63/0428 |
| 10,162,828 B2 * | 12/2018 | Foster | G06F 17/30091 |
| 10,264,072 B2 * | 4/2019 | Crofton | H04L 67/06 |
| 10,356,158 B2 * | 7/2019 | Crofton | G06F 16/182 |
| 10,404,798 B2 * | 9/2019 | Crofton | H04L 67/06 |
| 2001/0013123 A1 | 8/2001 | Freeman et al. | |
| 2001/0030785 A1 | 10/2001 | Pangrac et al. | |
| 2001/0050901 A1 | 12/2001 | Love et al. | |
| 2002/0004912 A1 | 1/2002 | Fung | |
| 2002/0019984 A1 | 2/2002 | Rakib | |
| 2002/0032754 A1 | 3/2002 | Logston et al. | |
| 2002/0049902 A1 | 4/2002 | Rhodes | |
| 2002/0049980 A1 | 4/2002 | Hoang | |
| 2002/0053082 A1 | 5/2002 | Weaver et al. | |
| 2002/0054589 A1 | 5/2002 | Ethridge et al. | |
| 2002/0059577 A1 | 5/2002 | Lu et al. | |
| 2002/0059619 A1 | 5/2002 | Lebar | |
| 2002/0063621 A1 | 5/2002 | Tseng et al. | |
| 2002/0087975 A1 | 7/2002 | Schlack | |
| 2002/0087976 A1 | 7/2002 | Kaplan et al. | |
| 2002/0095684 A1 | 7/2002 | St. John et al. | |
| 2002/0100059 A1 | 7/2002 | Buehl et al. | |
| 2002/0104083 A1 | 8/2002 | Hendricks et al. | |
| 2002/0112240 A1 | 8/2002 | Bacso et al. | |
| 2002/0120498 A1 | 8/2002 | Gordon et al. | |
| 2002/0123928 A1 | 9/2002 | Eldering et al. | |
| 2002/0124182 A1 | 9/2002 | Bacso et al. | |
| 2002/0124249 A1 | 9/2002 | Shintani et al. | |
| 2002/0129378 A1 | 9/2002 | Cloonan et al. | |
| 2002/0144262 A1 | 10/2002 | Plotnick et al. | |
| 2002/0144263 A1 | 10/2002 | Eldering et al. | |
| 2002/0144275 A1 | 10/2002 | Kay et al. | |
| 2002/0147771 A1 | 10/2002 | Traversat et al. | |
| 2002/0152299 A1 | 10/2002 | Traversat et al. | |
| 2002/0154655 A1 | 10/2002 | Gummalla et al. | |
| 2002/0154694 A1 | 10/2002 | Birch | |
| 2002/0154885 A1 | 10/2002 | Covell et al. | |
| 2002/0162109 A1 | 10/2002 | Shteyn | |
| 2002/0163928 A1 | 11/2002 | Rudnick et al. | |
| 2002/0164151 A1 | 11/2002 | Jasinschi et al. | |
| 2002/0166119 A1 | 11/2002 | Cristofalo | |
| 2002/0170057 A1 | 11/2002 | Barrett et al. | |
| 2002/0172281 A1 | 11/2002 | Mantchala et al. | |
| 2002/0174430 A1 | 11/2002 | Ellis et al. | |
| 2002/0178447 A1 | 11/2002 | Plotnick et al. | |
| 2002/0196939 A1 | 12/2002 | Unger et al. | |
| 2003/0002862 A1 | 1/2003 | Rodriguez et al. | |
| 2003/0004810 A1 | 1/2003 | Eldering | |
| 2003/0005453 A1 | 1/2003 | Rodriguez et al. | |
| 2003/0007516 A1 | 1/2003 | Abramov et al. | |
| 2003/0014759 A1 | 1/2003 | Van | |
| 2003/0021412 A1 | 1/2003 | Candelore et al. | |
| 2003/0023981 A1 | 1/2003 | Lemmons | |
| 2003/0025832 A1 | 2/2003 | Swart et al. | |
| 2003/0033199 A1 | 2/2003 | Coleman | |
| 2003/0037331 A1 | 2/2003 | Lee | |
| 2003/0046704 A1 | 3/2003 | Laksono et al. | |
| 2003/0056217 A1 | 3/2003 | Brooks | |
| 2003/0061619 A1 | 3/2003 | Giammaressi | |
| 2003/0067554 A1 | 4/2003 | Klarfeld | |
| 2003/0067877 A1 | 4/2003 | Sivakumar et al. | |
| 2003/0074565 A1 | 4/2003 | Wasilewski et al. | |
| 2003/0077067 A1 | 4/2003 | Wu et al. | |
| 2003/0088876 A1 | 5/2003 | Mao et al. | |
| 2003/0093311 A1 | 5/2003 | Knowlson | |
| 2003/0093784 A1 | 5/2003 | Dimitrova et al. | |
| 2003/0093790 A1 | 5/2003 | Logan et al. | |
| 2003/0093792 A1 | 5/2003 | Labeeb et al. | |
| 2003/0095791 A1 | 5/2003 | Barton et al. | |
| 2003/0101449 A1 | 5/2003 | Bentolila et al. | |
| 2003/0101451 A1 | 5/2003 | Bentolila et al. | |
| 2003/0110499 A1 | 6/2003 | Knudson et al. | |
| 2003/0115612 A1 | 6/2003 | Mao et al. | |
| 2003/0118014 A1 | 6/2003 | Iyer et al. | |
| 2003/0135860 A1 | 7/2003 | Dureau | |
| 2003/0139980 A1 | 7/2003 | Hamilton | |
| 2003/0140351 A1 | 7/2003 | Hoarty et al. | |

(56) References Cited

U.S. PATENT DOCUMENTS

| | | |
|---|---|---|
| 2003/0145323 A1 | 7/2003 | Hendricks et al. |
| 2003/0149975 A1 | 8/2003 | Eldering et al. |
| 2003/0161473 A1 | 8/2003 | Fransdonk |
| 2003/0179773 A1 | 9/2003 | Mocek et al. |
| 2003/0182261 A1 | 9/2003 | Patterson |
| 2003/0208763 A1 | 11/2003 | McElhatten et al. |
| 2003/0208783 A1 | 11/2003 | Hillen et al. |
| 2003/0214962 A1 | 11/2003 | Allaye-Chan et al. |
| 2003/0217365 A1 | 11/2003 | Caputo |
| 2003/0229681 A1 | 12/2003 | Levitan |
| 2003/0235393 A1 | 12/2003 | Boston et al. |
| 2003/0235396 A1 | 12/2003 | Boston et al. |
| 2003/0237090 A1 | 12/2003 | Boston et al. |
| 2004/0006625 A1 | 1/2004 | Saha et al. |
| 2004/0010807 A1 | 1/2004 | Urdang et al. |
| 2004/0031053 A1 | 2/2004 | Lim et al. |
| 2004/0045030 A1 | 3/2004 | Reynolds et al. |
| 2004/0078809 A1 | 4/2004 | Drazin |
| 2004/0101271 A1 | 5/2004 | Boston et al. |
| 2004/0103437 A1 | 5/2004 | Allegrezza et al. |
| 2004/0109672 A1 | 6/2004 | Kim et al. |
| 2004/0113936 A1 | 6/2004 | Dempski |
| 2004/0123313 A1 | 6/2004 | Koo et al. |
| 2004/0133907 A1 | 7/2004 | Rodriguez et al. |
| 2004/0146006 A1 | 7/2004 | Jackson |
| 2004/0158858 A1 | 8/2004 | Paxton et al. |
| 2004/0163109 A1 | 8/2004 | Kang et al. |
| 2004/0179605 A1 | 9/2004 | Lane |
| 2004/0181800 A1 | 9/2004 | Rakib et al. |
| 2004/0187150 A1 | 9/2004 | Gonder et al. |
| 2004/0187159 A1 | 9/2004 | Gaydos et al. |
| 2004/0193648 A1 | 9/2004 | Lai et al. |
| 2004/0193704 A1 | 9/2004 | Smith |
| 2004/0194134 A1 | 9/2004 | Gunatilake et al. |
| 2004/0226044 A1 | 11/2004 | Goode |
| 2004/0244058 A1 | 12/2004 | Carlucci et al. |
| 2004/0254999 A1 | 12/2004 | Bulleit et al. |
| 2004/0255336 A1 | 12/2004 | Logan et al. |
| 2004/0261114 A1 | 12/2004 | Addington et al. |
| 2004/0261116 A1 | 12/2004 | McKeown et al. |
| 2004/0267880 A1 | 12/2004 | Patiejunas |
| 2004/0267965 A1 | 12/2004 | Vasudevan et al. |
| 2005/0010697 A1 | 1/2005 | Kinawi et al. |
| 2005/0034171 A1 | 2/2005 | Benya |
| 2005/0039205 A1 | 2/2005 | Riedl |
| 2005/0039206 A1 | 2/2005 | Opdycke |
| 2005/0041679 A1 | 2/2005 | Weinstein et al. |
| 2005/0047596 A1 | 3/2005 | Suzuki |
| 2005/0050160 A1 | 3/2005 | Upendran et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0076092 A1 | 4/2005 | Chang et al. |
| 2005/0086691 A1 | 4/2005 | Dudkiewicz et al. |
| 2005/0097598 A1 | 5/2005 | Pedlow, Jr. et al. |
| 2005/0108529 A1 | 5/2005 | Juneau |
| 2005/0108768 A1 | 5/2005 | Deshpande et al. |
| 2005/0108769 A1 | 5/2005 | Arnold et al. |
| 2005/0111844 A1 | 5/2005 | Compton et al. |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0125528 A1 | 6/2005 | Burke, II et al. |
| 2005/0125832 A1 | 6/2005 | Jost et al. |
| 2005/0135476 A1 | 6/2005 | Gentric et al. |
| 2005/0152397 A1 | 7/2005 | Bai et al. |
| 2005/0168323 A1 | 8/2005 | Lenoir et al. |
| 2005/0198686 A1 | 9/2005 | Krause et al. |
| 2005/0210510 A1 | 9/2005 | Danker |
| 2005/0223409 A1 | 10/2005 | Rautila et al. |
| 2005/0276284 A1 | 12/2005 | Krause et al. |
| 2005/0283818 A1 | 12/2005 | Zimmermann et al. |
| 2005/0289618 A1 | 12/2005 | Hardin |
| 2005/0289619 A1 | 12/2005 | Melby |
| 2006/0010075 A1 | 1/2006 | Wolf |
| 2006/0020984 A1 | 1/2006 | Ban et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0066632 A1 | 3/2006 | Wong et al. |
| 2006/0073843 A1 | 4/2006 | Aerrabotu et al. |
| 2006/0075449 A1 | 4/2006 | Jagadeesan et al. |
| 2006/0080408 A1 | 4/2006 | Istvan et al. |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0117374 A1 | 6/2006 | Kortum et al. |
| 2006/0127039 A1 | 6/2006 | Van |
| 2006/0130107 A1 | 6/2006 | Gonder et al. |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0140584 A1 | 6/2006 | Ellis et al. |
| 2006/0171390 A1 | 8/2006 | La |
| 2006/0171423 A1 | 8/2006 | Helms et al. |
| 2006/0173783 A1 | 8/2006 | Marples et al. |
| 2006/0197828 A1 | 9/2006 | Zeng et al. |
| 2006/0212906 A1 | 9/2006 | Cantalini |
| 2006/0218601 A1 | 9/2006 | Michel |
| 2006/0218604 A1 | 9/2006 | Riedl et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0256376 A1 | 11/2006 | Hirooka |
| 2006/0271946 A1 | 11/2006 | Woundy et al. |
| 2006/0277569 A1 | 12/2006 | Smith |
| 2006/0291506 A1 | 12/2006 | Cain |
| 2006/0294250 A1 | 12/2006 | Stone et al. |
| 2007/0022459 A1 | 1/2007 | Gaebel, Jr. et al. |
| 2007/0033531 A1 | 2/2007 | Marsh |
| 2007/0047449 A1 | 3/2007 | Berger et al. |
| 2007/0053293 A1 | 3/2007 | McDonald et al. |
| 2007/0061818 A1 | 3/2007 | Williams et al. |
| 2007/0076728 A1 | 4/2007 | Rieger et al. |
| 2007/0078910 A1 | 4/2007 | Bopardikar |
| 2007/0089127 A1 | 4/2007 | Flickinger et al. |
| 2007/0094691 A1 | 4/2007 | Gazdzinski |
| 2007/0101157 A1 | 5/2007 | Faria |
| 2007/0101370 A1 | 5/2007 | Calderwood |
| 2007/0104456 A1 | 5/2007 | Craner |
| 2007/0106805 A1 | 5/2007 | Marples et al. |
| 2007/0113243 A1 | 5/2007 | Brey |
| 2007/0118852 A1 | 5/2007 | Calderwood |
| 2007/0121569 A1 | 5/2007 | Fukui et al. |
| 2007/0121678 A1 | 5/2007 | Brooks et al. |
| 2007/0124416 A1 | 5/2007 | Casey et al. |
| 2007/0124781 A1 | 5/2007 | Casey et al. |
| 2007/0130581 A1 | 6/2007 | Del et al. |
| 2007/0133405 A1 | 6/2007 | Bowra et al. |
| 2007/0153820 A1 | 7/2007 | Gould |
| 2007/0156539 A1 | 7/2007 | Yates |
| 2007/0157234 A1 | 7/2007 | Walker |
| 2007/0162927 A1 | 7/2007 | Ramaswamy et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204313 A1 | 8/2007 | McEnroe et al. |
| 2007/0204314 A1 | 8/2007 | Hasek et al. |
| 2007/0217436 A1 | 9/2007 | Markley et al. |
| 2007/0223380 A1 | 9/2007 | Gilbert et al. |
| 2007/0233857 A1 | 10/2007 | Cheng et al. |
| 2007/0241176 A1 | 10/2007 | Epstein et al. |
| 2007/0250872 A1 | 10/2007 | Dua |
| 2007/0250880 A1 | 10/2007 | Hainline |

(56) References Cited

U.S. PATENT DOCUMENTS

| | | |
|---|---|---|
| 2007/0271386 A1 | 11/2007 | Kurihara et al. |
| 2007/0274400 A1 | 11/2007 | Murai et al. |
| 2007/0276925 A1 | 11/2007 | La et al. |
| 2007/0276926 A1 | 11/2007 | Lajoie et al. |
| 2008/0016526 A1 | 1/2008 | Asmussen |
| 2008/0022012 A1 | 1/2008 | Wang |
| 2008/0040403 A1 | 2/2008 | Hayashi |
| 2008/0052157 A1 | 2/2008 | Kadambi et al. |
| 2008/0066112 A1 | 3/2008 | Bailey et al. |
| 2008/0092181 A1 | 4/2008 | Britt |
| 2008/0098212 A1 | 4/2008 | Helms et al. |
| 2008/0098446 A1 | 4/2008 | Seckin et al. |
| 2008/0101460 A1 | 5/2008 | Rodriguez |
| 2008/0112405 A1 | 5/2008 | Cholas et al. |
| 2008/0134156 A1 | 6/2008 | Osminer et al. |
| 2008/0134165 A1 | 6/2008 | Anderson et al. |
| 2008/0134615 A1 | 6/2008 | Risi et al. |
| 2008/0141175 A1 | 6/2008 | Sarna et al. |
| 2008/0141317 A1 | 6/2008 | Radloff et al. |
| 2008/0152316 A1 | 6/2008 | Sylvain |
| 2008/0155059 A1 | 6/2008 | Hardin et al. |
| 2008/0159714 A1 | 7/2008 | Harrar et al. |
| 2008/0184297 A1 | 7/2008 | Ellis et al. |
| 2008/0192820 A1 | 8/2008 | Brooks et al. |
| 2008/0201748 A1 | 8/2008 | Hasek et al. |
| 2008/0209464 A1 | 8/2008 | Wright-Riley |
| 2008/0212947 A1 | 9/2008 | Nesvadba et al. |
| 2008/0229354 A1 | 9/2008 | Morris et al. |
| 2008/0235732 A1 | 9/2008 | Han et al. |
| 2008/0235746 A1 | 9/2008 | Peters et al. |
| 2008/0244667 A1 | 10/2008 | Osborne |
| 2008/0244682 A1 | 10/2008 | Sparrell et al. |
| 2008/0271068 A1 | 10/2008 | Ou et al. |
| 2008/0273591 A1 | 11/2008 | Brooks et al. |
| 2008/0276270 A1 | 11/2008 | Kotaru et al. |
| 2009/0010610 A1 | 1/2009 | Scholl et al. |
| 2009/0019485 A1 | 1/2009 | Ellis et al. |
| 2009/0025027 A1 | 1/2009 | Craner |
| 2009/0028182 A1 | 1/2009 | Brooks et al. |
| 2009/0037960 A1 | 2/2009 | Melby |
| 2009/0052863 A1 | 2/2009 | Parmar et al. |
| 2009/0052870 A1 | 2/2009 | Marsh et al. |
| 2009/0077614 A1 | 3/2009 | White et al. |
| 2009/0083813 A1 | 3/2009 | Dolce et al. |
| 2009/0100182 A1 | 4/2009 | Chaudhry |
| 2009/0100459 A1 | 4/2009 | Riedl et al. |
| 2009/0165053 A1 | 6/2009 | Thyagarajan et al. |
| 2009/0207866 A1 | 8/2009 | Cholas et al. |
| 2009/0210899 A1 | 8/2009 | Lawrence-Apfelbaum et al. |
| 2009/0210912 A1 | 8/2009 | Cholas et al. |
| 2009/0217326 A1 | 8/2009 | Hasek |
| 2009/0217332 A1 | 8/2009 | Hindle et al. |
| 2009/0220216 A1 | 9/2009 | Marsh et al. |
| 2009/0254600 A1 | 10/2009 | Lee et al. |
| 2009/0260042 A1 | 10/2009 | Chiang |
| 2009/0274212 A1 | 11/2009 | Mizutani et al. |
| 2009/0317065 A1 | 12/2009 | Fyock et al. |
| 2010/0061708 A1 | 3/2010 | Barton |
| 2010/0157928 A1 | 6/2010 | Spinar et al. |
| 2010/0223491 A1 | 9/2010 | Ladd et al. |
| 2010/0235432 A1* | 9/2010 | Trojer ............... H04L 12/2861 709/203 |
| 2010/0247067 A1 | 9/2010 | Gratton |
| 2010/0251289 A1 | 9/2010 | Agarwal et al. |
| 2010/0333131 A1 | 12/2010 | Parker et al. |
| 2011/0103374 A1 | 5/2011 | Lajoie et al. |
| 2011/0162007 A1 | 6/2011 | Karaoguz et al. |
| 2011/0264530 A1 | 10/2011 | Santangelo et al. |
| 2012/0014255 A1 | 1/2012 | Svedberg |
| 2012/0210382 A1 | 8/2012 | Walker et al. |
| 2012/0278841 A1 | 11/2012 | Hasek et al. |
| 2013/0227608 A1 | 8/2013 | Evans et al. |
| 2013/0246643 A1 | 9/2013 | Luby et al. |
| 2013/0325870 A1 | 12/2013 | Rouse et al. |
| 2013/0346766 A1 | 12/2013 | Tani |
| 2014/0119195 A1 | 5/2014 | Tofighbakhsh et al. |
| 2014/0189749 A1 | 7/2014 | Gordon et al. |
| 2015/0092837 A1 | 4/2015 | Chen et al. |
| 2015/0271541 A1 | 9/2015 | Gonder et al. |
| 2015/0324379 A1 | 11/2015 | Danovitz et al. |
| 2016/0188344 A1 | 6/2016 | Tamir et al. |
| 2016/0191133 A1 | 6/2016 | Noh et al. |
| 2016/0191147 A1 | 6/2016 | Martch |
| 2016/0307596 A1 | 10/2016 | Hardin et al. |
| 2017/0302959 A1 | 10/2017 | Samchuk et al. |
| 2017/0366833 A1 | 12/2017 | Amidei et al. |
| 2018/0097690 A1* | 4/2018 | Yocam ............... H04B 1/0003 |
| 2018/0098292 A1* | 4/2018 | Gulati ............... H04W 52/283 |
| 2018/0131975 A1 | 5/2018 | Badawiyeh et al. |
| 2018/0131979 A1 | 5/2018 | Bayoumi et al. |
| 2018/0192094 A1 | 7/2018 | Barnett et al. |
| 2018/0213251 A1 | 7/2018 | Ikonin et al. |
| 2018/0368122 A1 | 12/2018 | Kuchibhotla et al. |
| 2018/0376474 A1 | 12/2018 | Khoryaev et al. |
| 2019/0014337 A1 | 1/2019 | Skupin et al. |
| 2019/0014363 A1 | 1/2019 | Skupin et al. |
| 2019/0069038 A1 | 2/2019 | Phillips |
| 2019/0166306 A1 | 5/2019 | Zen et al. |
| 2020/0045110 A1 | 2/2020 | Varnica et al. |

FOREIGN PATENT DOCUMENTS

| | | |
|---|---|---|
| WO | WO-0110125 A1 | 2/2001 |
| WO | WO-0176236 A1 | 10/2001 |
| WO | WO-0191474 A2 | 11/2001 |
| WO | WO-0219581 A1 | 3/2002 |
| WO | WO-2004008693 A1 | 1/2004 |

OTHER PUBLICATIONS

Cisco Intelligent Network Architecture for Digital Video—SCTE Cable-Tec Expo 2004 information page, Orange County Convention Center, Jun. 2004, 24 pages.

Deering et al., Internet Protocol, Version 6 (Ipv6) Specification, IETF RFC 2460 (Dec. 1998).

DOCSIS 1.0: Cable Modem to Customer Premise Equipment Interface Specification, dated Nov. 3, 2008, 64 pages.

DOCSIS 1.1: Operations Support System Interface Specification, dated Sep. 6, 2005, 242 pages.

DOCSIS 1.1: Radio Frequency Interface Specification, dated Sep. 6, 2005, 436 pages.

DOCSIS 2.0: Radio Frequency Interface Specification, dated Apr. 21, 2009, 499 pages.

DOCSIS 3.0: Cable Modem to CPE Interface Specification, dated May 9, 2017, 19 pages.

DOCSIS 3.0: MAC and Upper Layer Protocols Interface Specification, dated Jan. 10, 2017, 795 pages.

DOCSIS 3.0: Operations Support System Interface Specification, dated Jan. 10, 2017, 547 pages.

DOCSIS 3.0: Physical Layer Specification, dated Jan. 10, 2017, 184 pages.

DOCSIS 3.1: Cable Modem Operations Support System Interface Specification, dated May 9, 2017, 308 pages.

DOCSIS 3.1: CCAP Operations Support System Interface Specification, dated May 9, 2017, 703 pages.

DOCSIS 3.1: MAC and Upper Layer Protocols Interface Specification, dated May 9, 2017, 838 pages.

DOCSIS 3.1: Physical Layer Specification, dated May 9, 2017, 249 pages.

Internet Protocol DARPA Internet Program Protocol Specification, IETF RFC 791 (Sep. 1981).

Kanouff, Communications Technology: Next-Generation Bandwidth Management—The Evolution of the Anything-to-Anywhere Network, 8 pages, Apr. 1, 2004.

Motorola DOCSIS Cable Module DCM 2000 specifications, 4 pages, copyright 2001.

OpenVision Session Resource Manager—Open Standards-Based Solution Optimizes Network Resources by Dynamically Assigning

(56) References Cited

OTHER PUBLICATIONS

Bandwidth in the Delivery of Digital Services article, 2 pages, (copyright 2006), (http://www.imake.com/hopenvision).
SCTE 130-1 2008 Digital Program Insertion—Advertising Systems Interfaces standards.
SCTE 130-1 2013. Part 1: Digital Program Insertion—Advertising Systems Interfaces, Part 1—Advertising Systems Overview, 20 pages.
SCTE 130-10 2013: Digital Program Insertion—Advertising Systems Interfaces Part 10—Stream Restriction Data Model.
SCTE 130-2 2008a: Digital Program Insertion—Advertising Systems Interfaces Part 2—Core Data Elements.
SCTE 130-2 2014 Digital Program Insertion—Advertising Systems Interfaces standards.
SCTE 130-3 2013: Digital Program Insertion—Advertising Systems Interfaces Part 3—Ad Management Service Interface.
SCTE 130-4 2009: Digital Program Insertion—Advertising Systems Interfaces Part 4—Content Information Service.
SCTE 130-5 2010: Digital Program Insertion—Advertising Systems Interfaces Part 5—Placement Opportunity Information Service.
SCTE 130-6 2010: Digital Program Insertion—Advertising Systems Interfaces Part 6—Subscriber Information Service.
SCTE 130-7 2009: Digital Program Insertion—Advertising Systems Interfaces Part 7—Message Transport.
SCTE 130-8 2010a: Digital Program Insertion Advertising Systems Interfaces Part 8—General Information Service.
SCTE 130-9 2014: Recommended Practices for SCTE 130 Digital Program Insertion—Advertising Systems Interfaces.
SCTE130-3 2010: Digital Program Insertion—Advertising Systems Interfaces Part 3—Ad Management Service Interface.
Wikipedia, Digital Video Recorder, obtained from the Internet Nov. 11, 2014.

\* cited by examiner

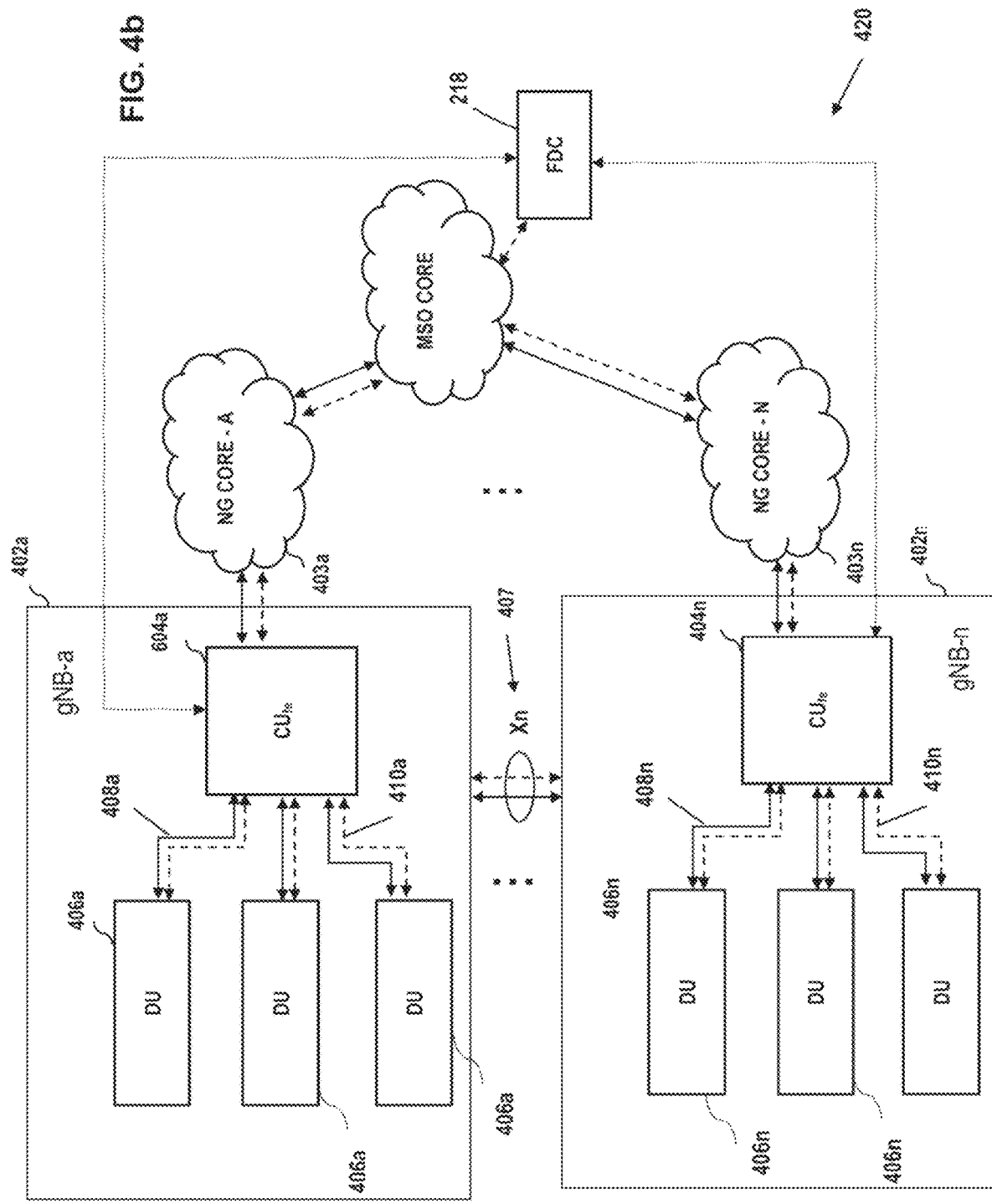

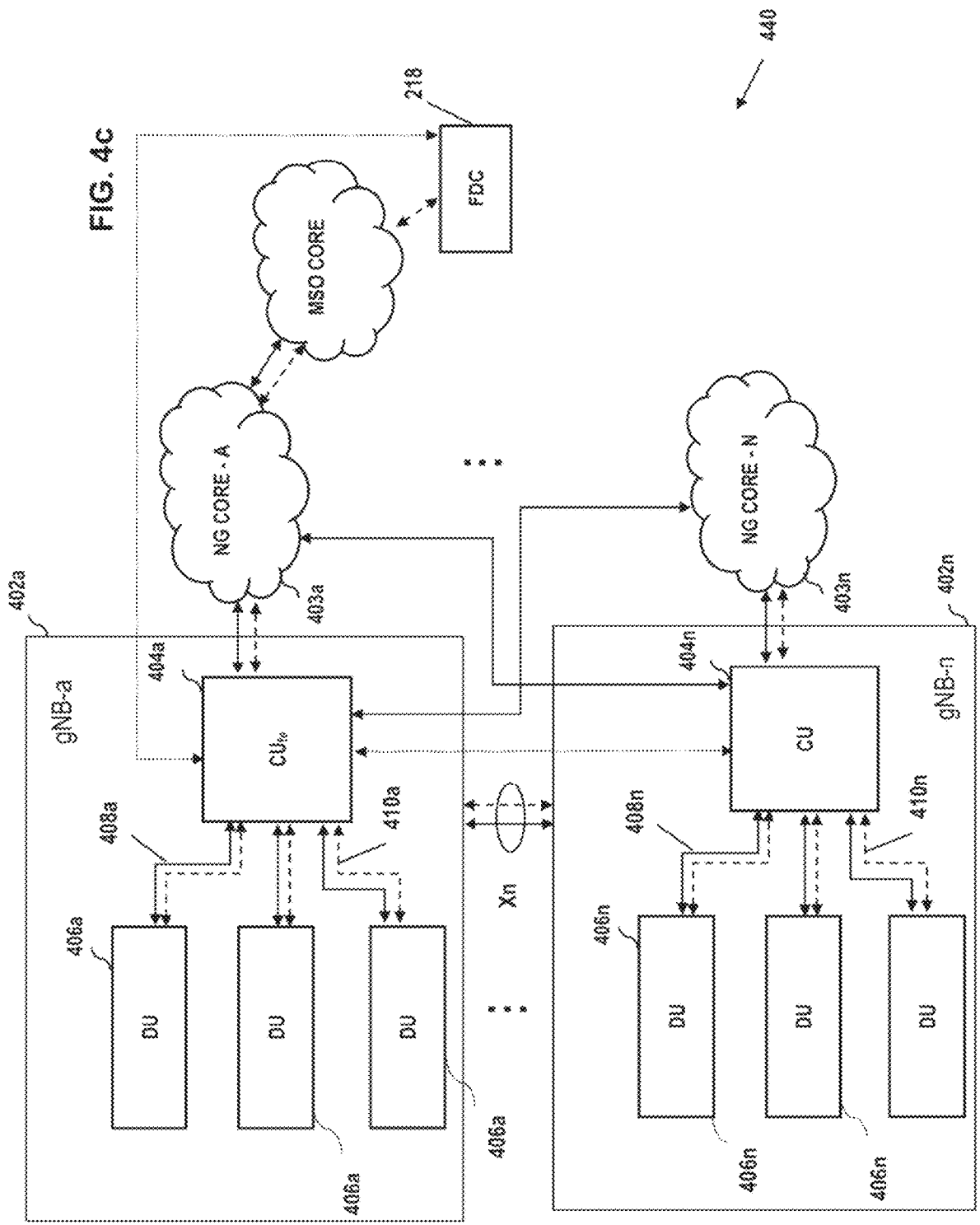

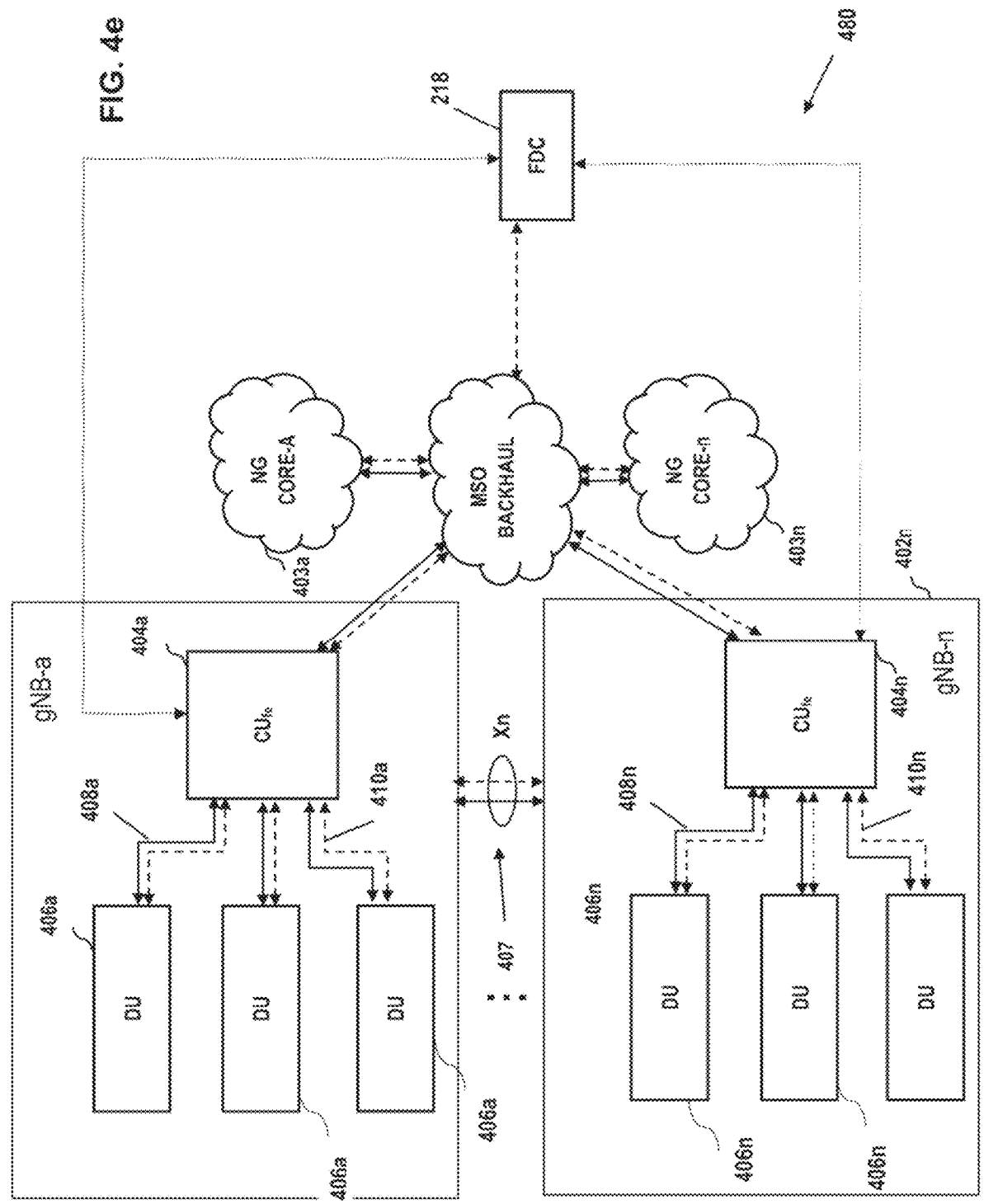

APPARATUS AND METHODS FOR CONTENT STORAGE, DISTRIBUTION AND SECURITY WITHIN A CONTENT DISTRIBUTION NETWORK

PRIORITY AND RELATED APPLICATIONS

This application claims priority to U.S. Provisional Patent Application Ser. No. 62/636,020 filed Feb. 27, 2018 and entitled "APPARATUS AND METHODS FOR CONTENT STORAGE, DISTRIBUTION AND SECURITY WITHIN A CONTENT DISTRIBUTION NETWORK," which is incorporated herein by reference in its entirety.

The subject matter of this application is also generally related to aspects of the subject matter of co-owned and co-pending U.S. patent application Ser. No. 15/170,787 filed Jun. 1, 2016 and entitled "CLOUD-BASED DIGITAL CONTENT RECORDER APPARATUS AND METHODS," incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital content over a network, and in one exemplary aspect to a network architecture for providing a cloud-based and edge-based content storage and delivery functionality, including delivery to Internet Protocol (IP)-enabled client devices.

2. Description of Related Technology

Digital video recorders (DVRs) and personal video recorders (PVRs) are devices which record video content, in digital format, to a disk drive or other medium. The use of such devices is now ubiquitous, and they provide conveniences to TV viewers such as e.g., (i) allowing a user to record a program for later review, (ii) allowing a user to record every episode of a program for a period, and/or (iii) automatically recording programs for the user based on viewing habits and preferences. Further, the presentation of the recorded programming content can be manipulated by exercising rewind, pause, play, stop, and fast-forward functions (hereinafter referred to as "trick mode" functions) in such DVRs and PVRs.

Traditional DVRs are maintained and managed by an end user; e.g., subscriber of a cable or satellite network. While having utility, such premises recording devices have several disabilities, including the need for the user to possess the physical "box", the need to maintain the recording or storage device powered up at all times when recording may be required, as well as the finite storage volume limitations of the device (the latter which can effectively limit the user's selection for content).

Cloud-Based Storage—

Such disabilities have made providing virtual ownership of content delivery and virtual storage, i.e., storage in the "cloud", more appealing over time, and hence network operators are increasingly turning to such solutions. One such cloud-based approach is the so-called "nPVR" or network PVR. An nPVR is a form of a PVR which can store content on a remote network device instead of a local storage medium such as a DVR. The nPVR allows the user to perform the analogous DVR functions through use of a network entity or process, rather than a local DVR at the user premises, thereby ostensibly relieving the user of the burdens of ownership and maintenance of a DVR unit, and providing greater digital data storage capacity.

Moreover, physically secure storage of content at the content distribution network as opposed to the premises may also provide certain assurances regarding physical security and unauthorized reproduction.

Numerous nPVR architectures exist. See, e.g., co-owned U.S. patent application Ser. No. 10/302,550, filed Nov. 22, 2002, issued as U.S. Pat. No. 7,073,189 on Jul. 4, 2006, and entitled "Program Guide and Reservation System for Network Based Digital Information and Entertainment Storage and Delivery System", incorporated by reference herein in its entirety, which discloses one exemplary network architecture and functionalities for implementing nPVR service. Generally, nPVR systems employ Video on-demand (VOD) or similar architecture of a content distribution network (CDN) to provide content storage and retrieval.

Similarly, so called "start-over" is a feature offered to some network users which allows the user to jump to the beginning of a program in progress without any preplanning or in-home recording devices (e.g., DVR). Start-over is enabled by a software upgrade to the existing video on-demand (VOD) platform, and to the installed base of digital set-top boxes. In other words, the start-over feature utilizes an nPVR system to maintain content which users may request, and delivers content in a manner similar to VOD. The typical start-over system instantaneously captures live television programming for immediate, on-demand viewing. Start-over functionality is the result of MSO-initiated nPVR storage of broadcast programs in real time. In other words, the MSO determines which programs will be start-over enabled, and stores this content as it is broadcast to an nPVR which is accessible by the various client devices utilizing a mechanism similar to VOD (discussed below).

When tuning to a start-over enabled show in progress, customers are alerted to the feature through an on-screen prompt. By pressing appropriate remote control buttons, the program is restarted from the beginning. Under one type of approach, start-over enabled programs may only be restarted within the shows' original telecast window (i.e., during the time window set for broadcasting the program), and may not be restarted after the show has finished broadcast. Thus, the start-over feature generally functions as an nPVR for predefined content (i.e., content on a start-over enabled channel) during a predefined period (i.e., the broadcast window). Co-owned, U.S. patent application Ser. No. 10/913,064, filed Aug. 6, 2004, and entitled "Technique for Delivering Programming Content Based on a Modified Network Personal Video Recorder Service", incorporated herein by reference in its entirety, discloses exemplary network architecture and functionalities for implementing start-over service within a content-based (e.g., cable) network.

As noted above, start-over services generally employ a VOD or similar architecture to provide content storage and retrieval. A typical prior art VOD architecture useful for prior art nPVR and start-over functionality is shown in FIG.

1a, and comprises sending content through various staging and segmenting functions, then on to a VOD server. At the staging and segmenting functions, the content is spliced on valid groups of pictures (GOP) boundaries, or I-frames. The spliced content is then examined, and a reference data file is created to describe it.

As illustrated, audio/video content is received by the MSO. The MSO sends the content to a staging processor 102 adapted to "stage" content for transmission over the network. The staging processor 102 is an entity adapted to prepare content for segmenting and/or for transmission to a VOD server 105 for streaming to one or more users.

Content is prepared for transmission and/or segmenting by processing through various staging processes, or software applications adapted to run on the digital processor associated with the staging processor 102. The processes effected by the staging processor 102 include, inter alia, at least one segmenting process 104. The segmenting process 104 divides the content video feed on valid GOP boundaries, or I-frames.

Segmenting the video feed at the segmenting process 104 results in content which is segmented based on a schedule. The segmented content is then examined by a business management process (BMS) 107. The management process 107, inter alia, creates a data file regarding the segmented content. The data file gives metadata regarding the content and "points" to the segmented portions of the content on the disk.

Once the management process 107 has created a data file for the content, it is sent to a VOD server 105. As described in greater detail subsequently herein, the VOD server 105 stores the content and/or data on hard disks; the VOD server 105 streams the content from these disks as well. The VOD server 105 is also sent a playlist of advertisements.

The VOD server 105, therefore, will receive the segmented content as well as a file indicating where the various portions of the content are and in what order they should be arranged; the VOD server also receives advertisements for insertion into the segmented content.

FIG. 1b is illustrative of a simplified prior art segmented content file 120 and secondary content (e.g., advertisement) playlist 130. As noted above, the content is segmented according to a schedule thus resulting in any number (n) content segments 122. The advertisement playlist 130 comprises some number (x) of advertisement segments 132. The number x of advertisement segments 132 may be e.g., equal to the number n of content segments 122; alternatively, the number of advertisement segments 132 may be one more (n+1) or one less (n−1) than the number of content segments 122.

When a CPE 106 requests the content from the VOD server 105 via the network 101, the VOD server 105 utilizes the data file (not shown) created by the management process 107 to find the start 124 and end 126 points of the content segments 122, and the start 134 and end 136 points for the advertisement segments 132. The first content segment 122a is delivered to the user, and at its end point 126a, the VOD server 105 sends the first advertisement segment 132a. At the end point 136a of the first advertisement segment 132a, the VOD server 105 sends the second content segment 122b. At the end point 126b of the second content segment 122b, the second advertisement segment 132b is sent. This pattern continues until the last of the content segments 122n and/or the last of the advertisement segments 132x have been presented to the user. The user will receive a seamless content-plus-advertisement stream 140 comprised of the various segments 122a, 132a, 122b, 132b . . . 122n, 132x sent. It is recognized that the first segment sent to the user may comprise either the first advertisement or the first content segment, still utilizing the pattern outlined above.

In nPVR and start-over enabled systems, MSOs ingest a large quantities of content to the VOD servers for storage and streaming, so as to offer the nPVR or start-over features on a variety of channels and/or for a variety of programs. Doing so quickly becomes exceedingly expensive. As the number of users or subscribers of services such as nPVR and start-over within a content delivery network grows, so does the required network-side digital data storage and processing capacity. To enable each given subscriber or household to record even a relatively limited number of hours of programming requires many terabytes (TB) of storage, which can be quite expensive to both initially procure and maintain.

Further, given that start-over capabilities are made available on a channel-by-channel basis, a large portion of the content stored and available for streaming from the VOD server is often never requested, such as during times when there are fewer viewers (e.g., between 12 midnight and 6 am). Thus, in the present systems, even when content is not requested, it must still be sent to the VOD server as discussed above.

Additionally, most content is received by the network operator (e.g., cable or satellite network MSO) in an encoding format (such as MPEG-2) that is not optimized in terms of storage or downstream bandwidth delivery requirements. Hence, maintenance of both the storage and delivery infrastructure necessary to keep pace with literally millions of users wanting to record several hours of programming per day via their nPVR or start-over service or equivalent becomes unduly burdensome and at some point, cost-inefficient.

In a typical storage/delivery paradigm, multiple copies of the same content are encoded and encrypted and sent to multiple different respective requesters, thereby requiring significant extra cloud storage space, and downstream bandwidth (i.e., from the network core outward) for delivery of the multiple copies.

Extant cloud-based architectures also generally utilize asymmetric delivery capability in their delivery of cloud content, in many cases by design. Technologies such as HFC in-band RF, DOCSIS (aka cable modems), A-DSL, and even some wireless and optical fiber (e.g., FiOS) technologies recognize that the asymmetry or ratio of DL to UL traffic is very high, and hence such solutions are optimized for such scenarios, including via allocation of more radio frequency or optical carriers for DL traffic versus UL traffic. This presents somewhat of a "check valve" for data flow into and from a given user CPE; i.e., users can obtain data much more quickly than they can upload it.

Such extant delivery technologies may also have significant temporal latency associated therewith; e.g., resolving URLs and IP addresses via DNS queries, accessing particular edge or origin servers for content chunks, etc., can require appreciable amounts of time (comparatively speaking), and result in reduced user QoE (quality of experience), manifest as e.g., stutters and delays in obtaining and rendering content for the user at their premises or via mobile device.

Moreover, current cloud-based solutions make limited use of CPE (e.g., DSTB, Smart TV, etc.) assets, instead offloading much of the processing to cloud servers or other distributed processing entities. Many CPE natively have significant processing capability in the form of multi-core CPU, GPUs, outsized flash and other memory, and high-speed data bus architectures such as USB and PCIe. They are also "application" heavy, including e.g., apps for gaming, social media, media decode and rendering, Internet search, and voice recognition. While many of these capabilities are used indigenously by the user, they are generally not accessed in any meaningful way by cloud-based processes or entities, or "repurposed" for other tasks. As such, the CPE capabilities are often under-utilized.

Radio Access Technologies including 5G "New Radio"-A multitude of wireless networking technologies, also known as Radio Access Technologies ("RATs"), provide the underlying means of connection for radio-based communication networks to user devices, including both fixed and mobile devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA + up to 21 Mbit/s). |
|  | 1900 MHz PCS, Band 2 (UMTS/HSPA + up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
| --- | --- | --- |
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide ultra-high bandwidth, ultra-low latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

NG-RAN is further configured specifically to provide its high bandwidths in a substantially symmetric fashion (as compared to prior art technologies such as e.g., DOCSIS described supra); i.e., afford high bandwidth data capability in both downlink (DL) and uplink (UL) transmissions relative to the end user node(s), with very low latencies induced by the RAN itself (and supporting backhaul). Hence, rather than being a largely asymmetric data pipe as in DOCSIS, NG-RAN enables high wireless bandwidths with low latency in both DL and UL, and out to ranges compatible with its underlying RAT (e.g., from very short "PAN" ranges out to metropolitan area ranges, depending on the RAT utilized).

In some aspects, Release 15 NG-RAN leverages technology and functions of extant LTE/LTE-A technologies (colloquially referred to as 4G or 4.5G), as bases for further functional development and capabilities. The NG-RAN also employs a "split" architecture—where gNB/ngeNB is split into (i) a CU (central or centralized unit) and (ii) a DU (distributed or disaggregated unit)—so as to provide inter alia, great flexibility in utilization and sharing of infrastructure resources.

Solutions Needed—

Given the pervasive nature of cloud-based delivery systems and asymmetric (and comparatively latent) bearer technologies, cloud-based systems in their present incarnations include several undesirable or non-optimal aspects, including: (i) high cloud data storage requirements; (ii) latency in delivery of stored data to requesting users (even when using network "edge" caching devices); and (iii) asymmetry in UL and DL capabilities. While asymmetry does not per se generally impact QoE, it does in effect "tie the hands" of operators in terms of where and how content can be positioned and delivered.

Based on the foregoing, there is a salient need for improved apparatus and methods of storing and delivering digitally rendered content to a large number of users associated with a content delivery network. Ideally, such improved apparatus and methods would minimize delivery latency and enhance QoE, and enable more flexible positioning and distribution of content within the network operator infrastructure (including CPE operative therein).

SUMMARY

The present disclosure addresses the foregoing needs by providing, inter alia, methods and apparatus for providing enhanced content storage and distribution within a content delivery network.

In a first aspect, an architecture for storing content within a content distribution network is disclosed. In one embodiment, the architecture includes (i) one or more network-based content storage locations; (ii) a plurality of edge-based content storage locations, and (iii) one or more network databases for tracking storage locations of various portions of the content. In one variant, content elements (e.g., digitally encoded movies, gaming applications, etc.) are initially ingested and stored with the network-based content storage location(s); the stored content is then fragmented into a plurality of components. These components are distributed among the plurality of edge-based storage locations (e.g., DSTBs and associated mass storage of network subscribers) according to a distribution scheme.

High-bandwidth, low-latency data connections between the various edge-based storage locations are utilized to assemble complete versions of the fragmented content by one or more of the edge-based devices to enable decode and rendering on an end-user device associated therewith.

In another variant, one or both of content-specific and fragment-specific encryption keys are generated and utilized to, inter alia, protect the content (fragments) from surreptitious de-fragmentation and use or copying.

In another aspect, a method of storing content within a network is disclosed. In one embodiment, the method includes: (i) fragmenting the content (element) according to a fragmentation algorithm; (ii) causing distribution of the constituent fragments to a plurality of different edge storage devices; and (iii) enabling inter-edge device communication channels to enable assembly of the constituent fragments from two or more edge devices into the content element.

In one variant, the method of storing further provides significant redundancy for the content by storing various combinations of the fragments across multiple different edge storage devices.

In another aspect, a computerized apparatus for use within a content delivery network is disclosed. In one embodiment, the computerized apparatus is configured to provide storage for a plurality of components or fragments of a digital content element, the storage accessible to other ones of computerized apparatus also within the network.

In one variant, the computerized apparatus comprises a DSTB or other CPE disposed at a user or subscriber premises or service area of an MSO network, and includes one or more computer programs configured to store and utilize fragmentation data to enable re-assembly of the (fragmented) content element, including via obtaining missing fragments from other similarly configured CPE.

In another variant, the computerized apparatus comprises a "communal" or shared server or device (or group of devices) which is/are dedicated to a prescribed sub-group of users or premises (e.g., dedicated to an apartment building or a particular business enterprise or university).

In yet another variant, the computerized apparatus comprises a computerized edge server disposed at an edge node or hub of an MSO network.

In another aspect of the disclosure, an algorithm for content fragmentation and distribution is disclosed. In one embodiment, the algorithm is embodied as part of a computer readable apparatus (e.g., program memory, HDD, SSD, etc.) having one or more computer programs, and is configured to, when executed, both: (i) fragment content elements into two or more constituent fragments, and (ii) distribute the two or more distributed fragments so as to optimize one or more parameters.

In one variant, the one or more parameters include "temporal proximity" (i.e., how long it takes to access the fragment from a prescribed accessing device or topological location), such as to support QoS (quality of service) and/or QoE requirements specified by the content originator or service provider. In another variant, the one or more parameters include redundancy (i.e., distribution such that re-constitution of the original content element can occur under the most likely one or more loss scenarios).

In yet another variant, all or portions of the constituent fragments are encrypted, and the one or more parameters includes distribution in order to optimize security from surreptitious re-constitution. In one implementation, the distribution of encrypted content fragments and cryptographic material increases as a number of participating users/devices increases, thereby enhancing security and authenticity.

In another aspect, a method of providing a delayed-provision service to users of content delivery network is disclosed. In one embodiment, the method includes purposefully caching fragments of content elements locally to a consuming entity or device (or group of devices) so as to mitigate redundant network core storage of multiple copies of the content element.

In another aspect, methods and apparatus for securing digitally rendered content are disclosed.

In another aspect, computerized network apparatus configured to enable fragmentation of digital content elements into a plurality of fragments, and distribution of the plurality of fragments to a plurality of 5G NR (New Radio) enabled client devices is disclosed. In one embodiment, the computerized network apparatus includes: digital processor apparatus; data interface apparatus in data communication with the digital processor apparatus and a digital content element store; data storage apparatus in data communication with the digital processor apparatus and configured to store at least one database, the at least one database comprising data relating to fragmentation of the digital content elements; and program storage apparatus in data communication with the digital processor apparatus and comprising at least one computer program.

In one variant, the at least one computer program is configured to, when executed by the digital processor apparatus: obtain a first one of the digital content elements via the data interface apparatus; fragment the obtained first one of the content elements into a plurality of fragments according to a fragmentation algorithm; create a logical cluster comprising a subset of the 5G NR enabled client devices; and cause distribution of the plurality of fragments of the obtained first one of the content elements to two or more of the subset of the 5G NR enabled client devices according to a distribution algorithm.

In a further aspect, a computerized client apparatus configured to support fragmented content element reassembly is disclosed. In one embodiment, the computerized client apparatus includes: digital processor apparatus; data interface apparatus in data communication with the digital processor apparatus and digital content distribution network; wireless data interface apparatus in data communication with the digital processor apparatus and configured to communicate data with a wireless network node; data storage apparatus in data communication with the digital processor apparatus and configured to store (i) at least one database, the at least one database comprising data relating to fragmentation of one or more digital content elements; and (ii) at least one of a plurality of fragments of a fragmented digital content element; and program storage apparatus in data communication with the digital processor apparatus and comprising at least one computer program.

In one variant, the at least one computer program is configured to, when executed by the digital processor apparatus: obtain via the data interface apparatus, the at least one of a plurality of fragments of the fragmented digital content element; store the obtained at least one fragment in the data storage apparatus; obtain via the data interface apparatus, data relating to a fragmentation scheme used to fragment the fragmented digital content element; store the obtained data relating to the fragmentation scheme in the data storage apparatus; receive data corresponding to a request for access to the digital content element, the request initiated by a user of the computerized client apparatus; based at least on the received data corresponding to the request, access both: (i) the stored at least one fragment; and (ii) the stored data relating to the fragmentation scheme; based at least on the accessed stored data relating to the fragmentation scheme, causing access via at least the wireless data interface apparatus of at least one other computerized client apparatus, the at least one other client apparatus comprising one or more of the plurality of fragments of the fragmented digital content element; using at least (i) the accessed one or more of the plurality of fragments of the fragmented digital content element, and (ii) the stored obtained at least one fragment, reassemble the fragmented digital content element; and cause decode and rendering of the reassembled fragmented digital content element to service the request.

These and other aspects shall become apparent when considered in light of the disclosure provided herein.

BRIEF DESCRIPTION OF THE DRAWINGS

FIG. 4a-1 is logical block diagram conceptually illustrating operation of the gNB architecture of FIG. 4a.

FIG. 4b is a functional block diagram of another exemplary embodiment of a gNB architecture including multiple $CU_{fe}$ and multiple corresponding DUs logically controlled by an MSO Fragmentation and Distribution Controller (FDC), according to the present disclosure.

FIG. 4c is a functional block diagram of yet another exemplary embodiment of a gNB architecture including multiple $CU_{fe}$ logically cross-connected to multiple different NG cores and to the MSO core, according to the present disclosure.

FIG. 4e is a functional block diagram of another exemplary embodiment of a gNB architecture including FDC control of CUs via the MSO infrastructure, according to the present disclosure.

Figure 1A:
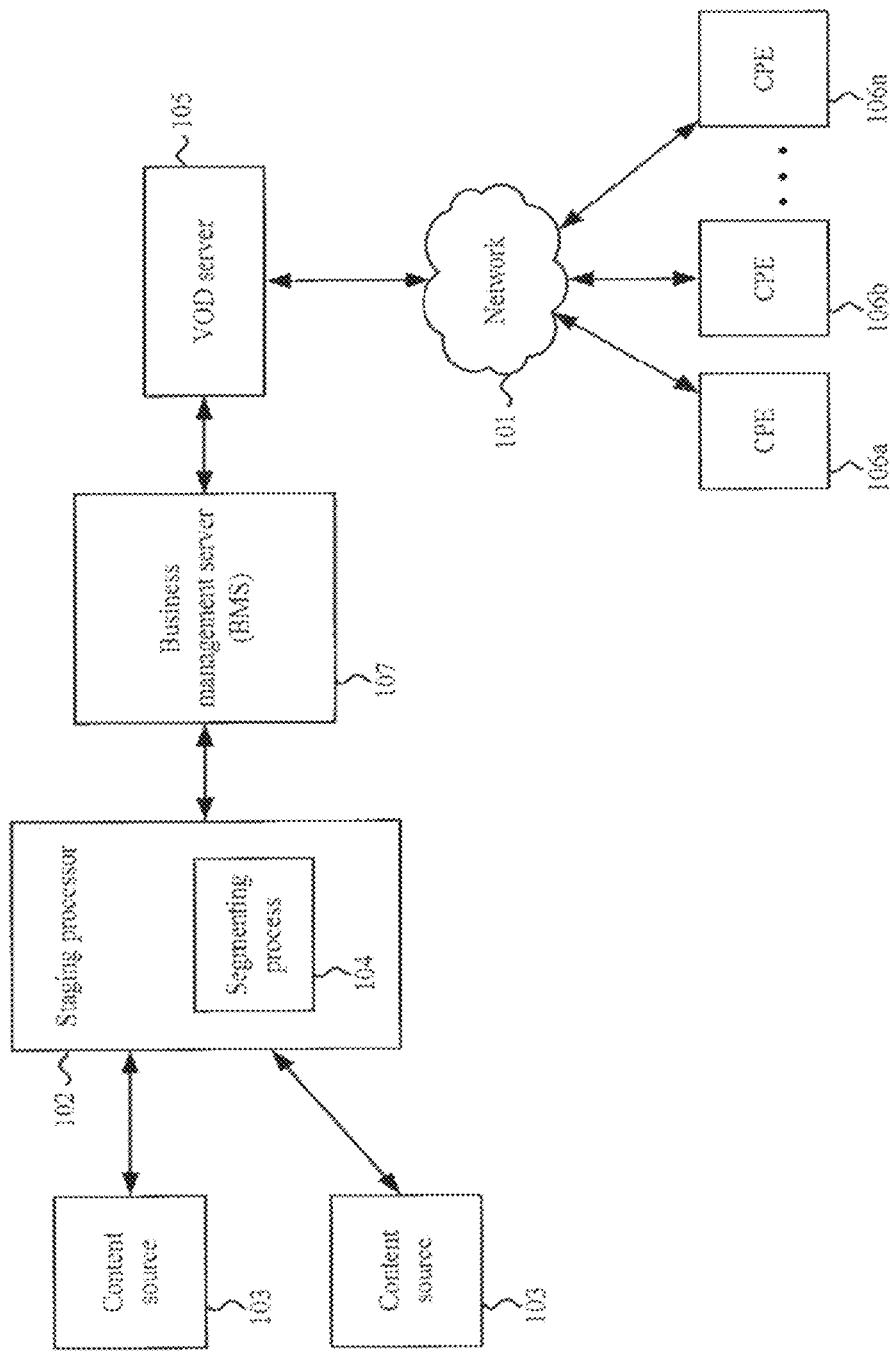
FIG. 1a is a functional block diagram illustrating an exemplary prior art VOD architecture useful for providing nPVR functionality.
Figure 1B:
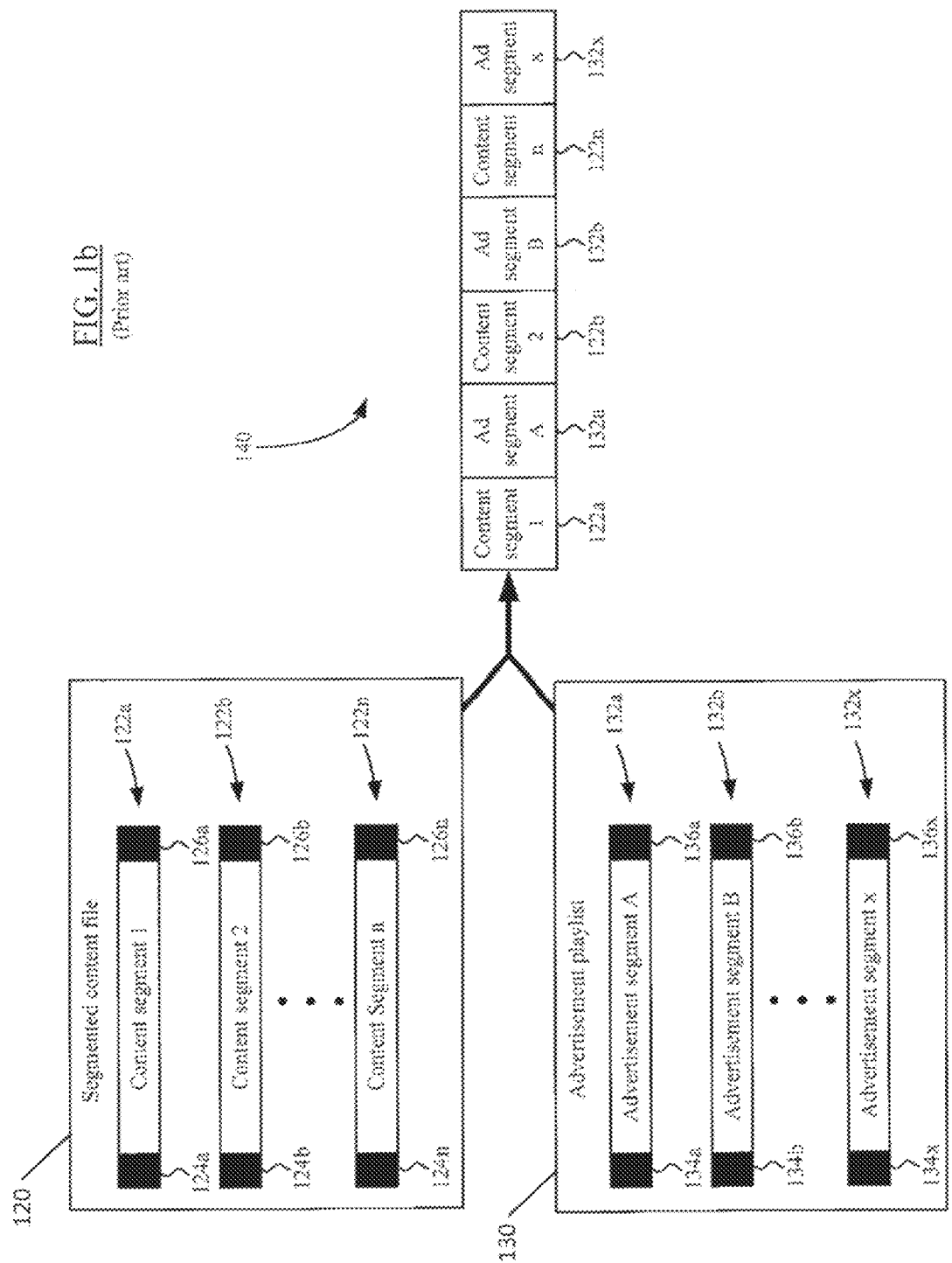
FIG. 1b is a functional block diagram illustrating an exemplary prior art content and advertisement stream assembly.

All figures © Copyright 2018 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. As used herein, the term "central unit" or "CU" refers without limitation to a centralized logical node within a wireless network infrastructure.

For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof. As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

DETAILED DESCRIPTION OF EXEMPLARY EMBODIMENTS

Exemplary embodiments of the apparatus and methods of the present disclosure are now described in detail. While these exemplary embodiments are described in the context of a managed network (e.g., hybrid fiber coax (HFC) cable) architecture having a multiple systems operator (MSO), digital networking capability, high-speed data (HSD) and IP delivery capability, and a plurality of client devices, the general principles and advantages of the disclosure may be extended to other types of networks and architectures that are configured to deliver digital media data (e.g., text, video, files, and/or audio), whether managed or unmanaged. Such other networks or architectures may be broadband, narrowband, wired or wireless, or otherwise.

It will also be appreciated that while described generally in the context of a network providing service to a customer or consumer (e.g., residential) end user domain, the present disclosure may be readily adapted to other types of environments including, e.g., commercial/enterprise and government/military applications. Myriad other applications are possible.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Moreover, while these exemplary embodiments are described in the context of the previously mentioned wireless access nodes (e.g., gNBs) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure.

Other features and advantages of the present disclosure will immediately be recognized by persons of ordinary skill in the art with reference to the attached drawings and detailed description of exemplary embodiments as given below.

Cloud Digital Fragmentation and Distribution Architecture (FDA)—

Figure 2:
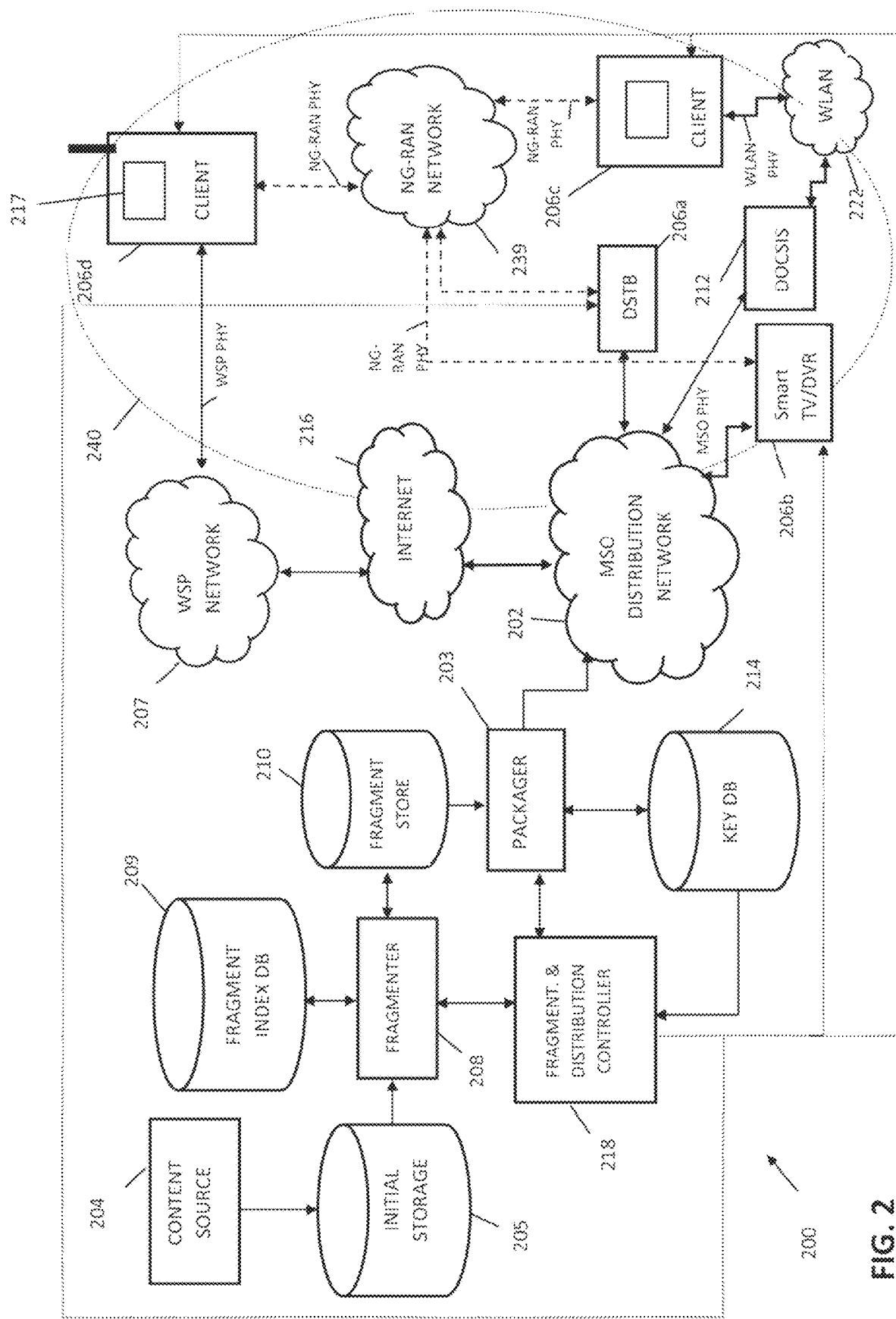
FIG. 2 is a functional block diagram illustrating an exemplary network architecture for storing and delivering content via a fragmentation and distribution (FD) model according to one embodiment of the present disclosure.
Figure 2A:
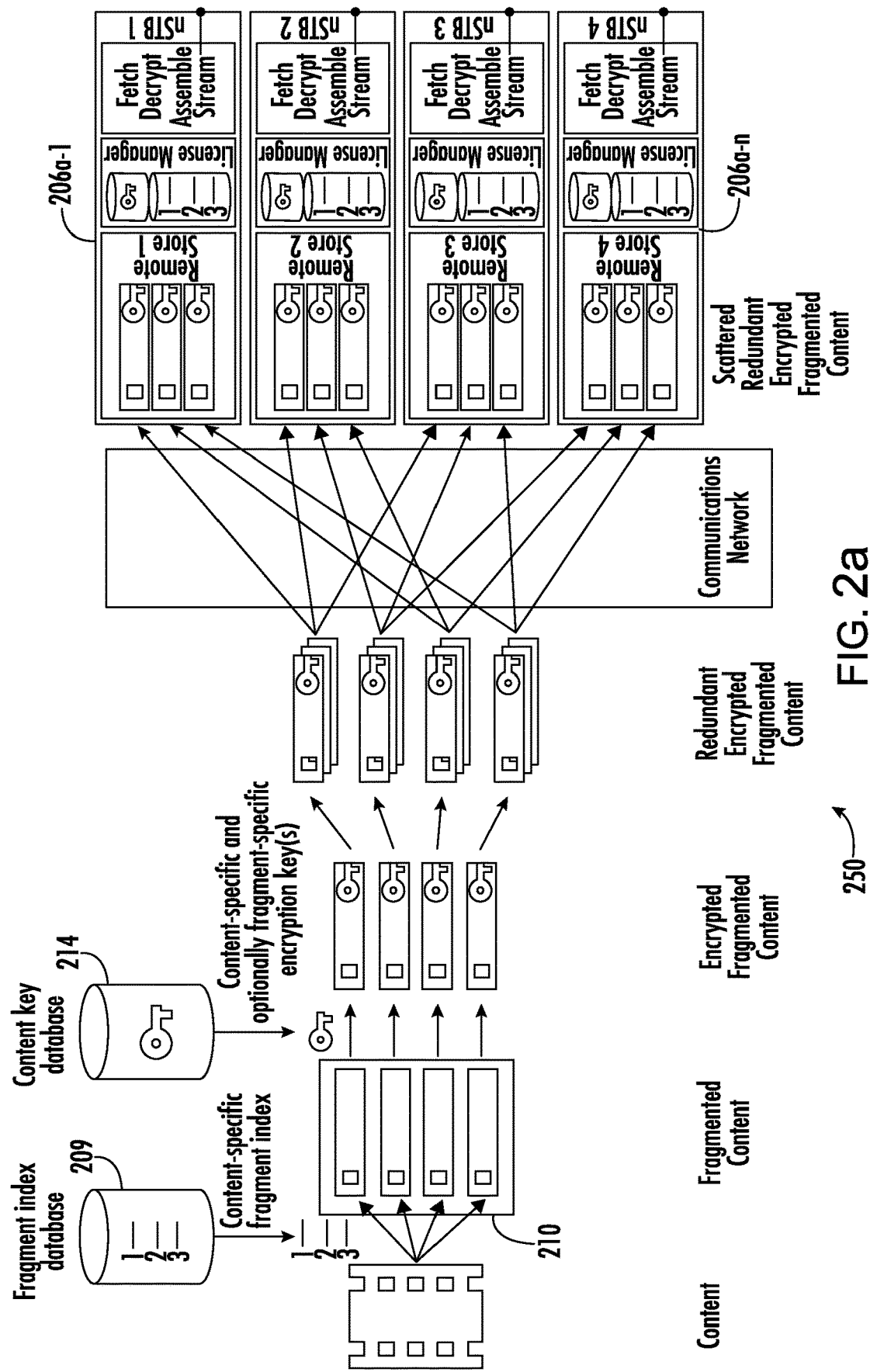
FIG. 2a is logical block diagram conceptually illustrating operation of the network architecture of FIG. 2 for fragmentation and distribution of the fragments of a given content file.

Referring now to FIG. 2, an exemplary embodiment of the generalized cloud digital video fragmentation and distribution architecture 200 according to the present disclosure is described in detail. It is noted that the apparatus, systems and methods described below are useful in providing storage and access to user-initiated content, as well as in providing storage and access to MSO-initiated content. Storage and access of MSO-initiated content according to the present disclosure enables, inter alia, a high degree of QoE, redundancy, and security, as described in greater detail below. It further enables a user to access content simultaneous to the content's broadcast, and to start the program over from the beginning after it has begun without the user having previously recorded the content (e.g., "start-over" functionality).

As shown in FIG. 2, the exemplary configuration of the FDA 200 generally comprises an MSO distribution network (DN) 202 that is in communication with one or more client devices (or premises, such as households) 206, as well as being in communication with an internetwork 216 such as e.g., the Internet. While described primarily in the context of Internet Protocol (IP) network transport, it will be recognized that the principles of the disclosure may be extended to other transport modalities and network paradigms.

The requesting client device 206 may include DSTBs, home gateway devices and/or media client devices. In one embodiment, the media client device is a portable device such as a wireless-enabled tablet computer or smartphone. Alternatively, the client device may include a Smart TV or the like. The present disclosure also contemplates a household or person using two or more client devices, and therefore may have access to two or more independent communications paths to the content being distributed (e.g., via the packager 203). For example, a user may have access to a DSTB 206a, Smart TV 206b, and a tablet 206c connected to the cable modem via a wireless communications network such as a wireless LAN (e.g., Wi-Fi) 222, as well as a smartphone 206d interfacing with a wireless service provider (WSP) network such as via an LTE or LTE-A interface, the WSP network in data communication with the Internet 216 (or directly to the distribution network 202, not shown).

In one variant, the user IP-enabled client devices 206a-d may also include an MSO-authored application program ("app") 217 operative thereon to interface with the MSO Fragmentation and Distribution Controller (FDC) 218 or other entity of the MSO network, so as to facilitate various user functions such as content re-constitution, decryption, program guides, browsing, recording, and even playback/rendering, as described in greater detail subsequently herein.

As shown, the FD architecture of FIG. 2 comprises at least one content source 204 providing content to the MSO network. Various third party and/or internal (i.e., MSO owned or operated) content sources 204 may provide content to the MSO network. For example, content may be received from a local, regional, or network content library as discussed in co-owned U.S. patent application Ser. No. 12/841,906 (now U.S. Pat. No. 8,997,136) entitled "Apparatus and methods for packetized content delivery over a bandwidth-efficient network", incorporated herein by reference in its entirety. Alternatively, content may be received from linear analog or digital feeds, as well as various third party content sources. In yet another embodiment, content may be received from subscriber and/or non-subscriber devices (e.g., a PC or smartphone-originated user made video which is uploaded, such as to an Internet or MSO-operated social media portal).

Content which is recorded, either by a user-initiated or an MSO-initiated request, is initially input into a first storage entity 205. In one embodiment, the content is placed in storage 205 as a single uncompressed copy (so as to avoid lossy compression degradation), and distributed as fragments to a plurality of user CPE 206.

As a brief aside, digital encoding utilizes one or more forms of video compression in order to economize on storage space and transmission bandwidth. Without such video compression, digital video content can require extremely large amounts of data storage capacity, making it difficult or even impossible for the digital video content to be efficiently stored, transmitted, or viewed.

Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards. The MPEG-4 Advanced Video Coding (AVC) standard (also known as MPEG-4, Part 10) is a newer standard jointly developed by the International Organization for Standardization (ISO) and ITU-T. The MPEG-4 AVC standard is published as ITU-T H.264 and ISO/IEC 14496-10. For purposes of clarity, MPEG-4 AVC is referred to herein as H.264.

As noted above, content often arrives from content sources at a content distribution network (CDN) in a digitally encoded format, such as MPEG-2. The MPEG-2 standard is ubiquitous and specifies, inter alia, methodologies for video and audio data compression and encoding. Specifically, in accordance with the MPEG-2 standard, video data is compressed based on a sequence of GOPs, made up of three types of picture frames: coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame. The GOP may represent additional frames by providing a much smaller block of digital data that indicates how small portions of the I-frame, referred to as macroblocks, move over time.

MPEG-2 achieves its compression by assuming that only small portions of an image change over time, making the representation of these additional frames compact. Although GOPs have no relationship between themselves, the frames within a GOP have a specific relationship which builds off the initial I-frame.

In a traditional content delivery scheme (e.g., for a cable network), the compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams, which utilize MPEG-2 encoded video content as their payload.

However, despite its ubiquity, MPEG-2 has salient limitations, especially relating to transmission bandwidth and storage. The more recently developed H.264 video coding standard is able to compress video much more efficiently than earlier video coding standards, including MPEG-2. H.264 is also known as MPEG-4 Part 10 and Advanced Video Coding (AVC). H.264 exhibits a combination of new techniques and increased degrees of freedom in using existing techniques. Among the new techniques defined in H.264 are 4×4 discrete cosine transform (DCT), multi-frame prediction, context adaptive variable length coding (CAVLC), SI/SP frames, and context-adaptive binary arithmetic coding (CABAC). The increased degrees of freedom come about by allowing multiple reference frames for prediction and greater macroblock flexibility. These features add to the coding efficiency (at the cost of increased encoding and decoding complexity in terms of logic, memory, and number of operations). Notably, the same content encoded within H.264 can be transmitted with only roughly half (50%) of the requisite bandwidth of a corresponding MPEG-2 encoding, thereby providing great economies in terms of CDN infrastructure and content storage.

Digital encoding also advantageously lends itself to transcoding of content. As used herein, the term "transcoding" refers generally to the process of changing content from one encoding to another. This may be accomplished for example by decoding the encoded content, and then re-encoding this into the target format. Transcoding can also accomplish the encoding of content to a lower bitrate without changing video formats, a process that is known as transrating.

Transcoding is used in many areas of content adaptation; however, it is commonly employed in the area of mobile devices such as smartphones, tablets, and the like. In such mobile applications, transcoding is essential due to the diversity of mobile devices. This diversity effectively requires an intermediate state of content adaptation, so as to ensure that the source content will adequately present or "render" on the target mobile device.

Delivery of encoded content may also utilize a technology known as "adaptive bitrate streaming." Adaptive bitrate (ABR) streaming is a technique to distribute program content over a large distributed network in an efficient manner based on, inter alia, available streaming capacity. In one implementation, multiple bitrates of a particular piece of content are available to stream to a viewer, and the selection of the bitrate is based on current network conditions. This means that when there is greater bandwidth availability, a larger bitrate version of the content may be selected. If available bandwidth narrows, a lower bitrate (i.e., smaller) version of the content may be selected to provide a seamless user experience. Typical ABR streaming solutions include e.g., DASH (dynamic adaptive streaming over HTTP), Microsoft Smooth Streaming, and Adobe HTTP Dynamic Streaming, which are further particularly adapted for HTTP-based environments such as Internet delivery. ABR streaming protocols are typically codec-agnostic (e.g., may use content encoded in e.g., H.264, MPEG-2, or others), and are notably distinguishable from such underlying encoding.

Returning again to the FD architecture 200 of FIG. 2, after initial storage, the content is next fragmented by a fragmentation process (e.g., server) 208. The fragmentation algorithm may comprise any number of different schemes, including for example based on a prescribed number of complete GOPs (e.g., N GOPS each having 15 frames), based on temporal divisions (e.g., every X minutes of rendered content), chapter divisions (e.g., higher level logic divisions of the content based on its topic/context), or yet other criteria. Fragments of the content element may be stored prior to distribution within a fragment storage apparatus 210, with the fragments being indexed by the fragmenter 208 according to an indexing scheme (stored in an index database 209). It will be appreciated that various approaches to indexing the fragments may be utilized consistent with the present disclosure. For instance, indexing may be based on a uniquely generated sequence such as a PBRS or other "randomized" approach, wherein fragments of a given content element are assigned values within the sequence, which is ostensibly unique from other sequences assigned to other content elements. As such, the sequence acts as "instructions" or a manifest for assembly of the content element in the proper order. In one variant, the generated values comprise a CSV or other data structure stored in association with a content ID for the (parent) content element. Storage of the fragments within the fragment DB 210 may also be according to a prescribed sequence; e.g., randomized to "wear level" the storage device over time, stored in common sectors or storage areas of the storage device to minimize access times for fragments of the same content element, etc.

In one embodiment, both the fragmentation scheme(s) and indexing for each content element are determined/maintained by the FDC 218; notably, the FDC may alter one or both of the scheme(s) for each different content element, depending on e.g., one or more parameters or attributes of (i) the content element itself (e.g., content encoded in a first format, being of a first size in GOPs, being of a first topical category, having a first geographic relevance, etc., may be fragmented/indexed differently than another content element having different attributes), and/or (ii) the target CPE 206 or other "edge" storage medium (e.g., edge caches at hubs) to which the fragments are to be distributed. As but one example, the granularity of fragmentation (e.g., into N "chunks") may be varied depending on the topological location and/or intervening PHY bearers of the network to those distribution points; e.g., a mobile device which receives the fragments initially via an LTE/LTE-A bearer and WSP 207 may be better optimized by receiving smaller sized chunks as opposed to a DSTB served by in-band or DOCSIS DL channel(s), due to e.g., mobility considerations for the mobile device.

Also shown in FIG. 2 is a key store or database 214 in which data regarding each content element (including in one variant, each fragment of each content element) and its relevant encryption scheme (including public/private key pair) are maintained.

A packager entity 203 is also in data communication with the key store 214, the fragment store 210, and the fragmenter 208 (and the FDC 218). The packager in one implementation is configured to access relevant fragments or chunks within the fragmentation DB 210, apply necessary encryption as directed by the FDC 218, store the relevant encryption data in the key store 214, and provide any other relevant operates necessary to distribute the packaged (and optionally encrypted) fragments according to the distribution scheme specified by the FDC 218. For example, the packager may also include a manifest file generation process, which generates manifest files to be sent to individual CPE 206 so as to enable, inter alia, re-constitution of the parent content element by the CPE for rendering.

In one implementation, the original content and the degree of fragmentation of the content, the content key database are all controlled by the MSO via the FDC 218.

Consider an example where multiple users pre-order and download the same VOD content element; users in a given geographical or topological portion of the network (which can be for instance as large as a subdivision or MDU or even a service group) will each be downloaded an encrypted portion(s) of the parent content element, and prior to (or as) the content is being decoded and rendered at a given CPE, it will fetch the remaining fragments or chunks from their designated "neighbors" in the topological portion (e.g., same service group) for a seemingly continued stream of content. In that all storage of needed fragments is at or proximate to the edge of the MSO network, latencies and bandwidth limitations associated with prior art URL-based approaches of accessing origin servers or other content stores are advantageously avoided.

As described in greater detail elsewhere herein, one key premise of the architecture 200 of FIG. 2 is that communications links (PHY) between the "edge" repositories (e.g., CPE 206a-d, and/or edge or hub caches) meets the uplink and downlink bandwidth and latency requirements for a service which meets the necessary QoE/QoS requirements for delivery of the particular content. Hence, in one incarnation of the architecture, a 5G NR bearer RAN and PHY 239 with coverage area 240 is used for inter-node (i.e., CPE-to-CPE, CPE-to-edge cache) communications. In effect, each "edge" node acts as a local content store for portions (fragments or chunks) of the parent content element for other nodes within the logical/topological "network" in which it is a member (at least for purposes of that content element).

It will be appreciated that while local network (e.g., geographical or topological group or network) membership may remain static across multiple content elements (e.g., the same CPE always consult other CPE in the same group to obtain the needed fragments), such membership may be dynamically varied, including on a per-content element basis. Moreover, a design level of redundancy can be built in (and dynamically varied), such that each given node has two or more choices or available nodes for the fragment(s) it needs. Hence, in one variant, "complete" redundancy is maintained, such that every node has two or more other nodes in its membership group from which it can obtain each "missing" fragment for a given content element. Alternatively, "thinner" redundancy/coverage can be utilized, such as where one redundant copy of each fragment is available to each edge node (e.g., CPE 206). In yet another implementation, less-than-complete redundancy can be maintained by the node's membership group, such as where less that all fragments of a given content element are maintained (e.g., lower interest fragments such as those at the very beginning or end of a content element, those having very low ME (motion estimation) change on an inter-frame or inter-GOP basis and hence being indicative of little "lost action," etc.).

In one embodiment, the FDC 218 is configured such that as the number of users/subscribers streaming the fragmented content increases, the fragmentation ratio (i.e., the number of fragments per content element) is increased proportionally, as is the distribution scope of the fragments, thereby, inter alia, providing increased security in that more fragments, each ostensibly carrying their own unique encryption, will need to be "broken" (e.g., via brute force or other decryption techniques), in effect making obtaining and decrypting all content fragments untenable. As a simple illustration, consider a movie that is fragmented into 2 unique (or at least partly unique) parts. These two parts can be distributed to two different entities; further distribution of the same parts to additional entities may, while aiding in redundancy, reduces security, in that a surreptitious entity can obtain the necessary (two) constituent parts from more places, albeit perhaps with different encryption. Conversely, the same content element fragmented into 10 parts, and distributed to 10 different entities, makes such surreptitious use significantly harder, especially where the 10 parts are non-duplicative of one another in terms of encryption (or content).

Similarly, with the increase in the number of users/subscribers using the service (e.g., belonging to a particular membership group), more copies of the same fragment will be available to a given user, resulting in redundancy should one or a group of subscribers lose connectivity, as discussed supra.

It will further be appreciated that while certain embodiments are described herein as being limited to particular finite-sized groups (e.g., based on service group membership, topological or geographic location, etc.), the present disclosure contemplates other use cases; e.g., where the entire MSO topology is utilized as the basis of the group or pool from which content fragments can be drawn. This approach has the benefits of, inter alia, large degrees of redundancy and security; however, depending on the geographic/topological spread of the various fragments, QoS/QoE requirements may not be met in all cases.

In yet another embodiment, perpetual or non-expiring content fragment keys are assigned for any users or subscribers who purchase a VOD or other content asset, and as such the asset can be played back on any device by that user. In one variant, the fragments of the content asset are assembled on the purchasing user's CPE after purchase, such that they do not need to obtain fragments from other CPE or edge nodes for subsequent playback. Alternatively, the FDC 218 may direct that the fragments of the purchased asset remain distributed; however, they can be tagged (or other mechanisms used) to ensure unimpeded or open access by the purchasing user(s)/subscribers. For instance, where multiple subscribers purchase the same asset (e.g., a new first-run movie), fragments for that asset can be made accessible according to a whitelist listing the MAC address or other unique identifying user/CPE information associated with each fragment (or groups of fragments), such that unimpeded access is provided to the purchasers while maintaining redundancy and security via distribution of the fragments.

It will further be appreciated that the FDC 218 (including via the corresponding $CU_{fe}$) may communicate with the various CPE 106 and edge devices (e.g., edge caches disposed at hubs, etc.) to maintain data on (i) the topological location of content element fragments within the network; (ii) access to the various fragments by various CPE (i.e., to generate a "heat map" and related data for determination of optimal positioning of the individual fragments such as to reduce latency and meet QoS/QoE targets), and (iii) move or relocate individual fragments based on the data of (ii), changes in network topology due to e.g., maintenance or outages/equipment failure, or yet other considerations such as the geographic/temporal relevance of the content, and any "blackouts" that may be imposed or lifted as a function of time.

In one model, the FDC 218 maintained data on the specific locations of fragmented content elements which are available to the target user/subscriber CPE 206 requesting the content. When a specific fragmented content unit is required at the target CPE, the FDC sends control information (e.g., via control plane messaging or other technique) to one or more source CPE which has the required content fragment(s), as well as to the target CPE that is requesting the fragment(s). In some implementations, the FDC may also send control data to the $CU_{fe}$ or other edge node responsible for coordinating the re-constitution of the content element, in effect to establish a session between the two or more CPE (source(s) and target(s)). In one variant, the requested fragment(s) is/are sent by the source CPE and relayed to the target CPE through the DU 406 associated with a given NR $CU_{fe}$ 404, as described below with respect to FIGS. 4a-4f (depending on configuration). This mechanism can be employed for each of the required fragments with a different source subscriber CPE supplying a given fragment.

It also be appreciated that in some implementations, the network (cloud) fragment store 210 can be utilized as a CPE or edge cache proxy (albeit disposed further into the network core, such as at an MSO headend). For instance, where the service membership group (e.g., a topologically local grouping of CPE acting as fragment sources/sinks with one another) is topologically disposed proximate to the store 210, such that QoE/QoS requirements can be met through delivery of fragments to sink CPE 206 within the membership group from the store 210, then the store 210 can be instructed by the FDC 218 to supply fragments to the sink CPE, as if the store was just another CPE in the membership group. This approach can be particularly useful where, for instance, the membership group has few members (for whatever reason, including e.g., geographic isolation or lack of user/subscriber CPE with enough indigenous capacity); additional "genetic diversity" from a redundancy/security aspect can be added using the super-CPE capability afforded by the store 210 and other cloud-based delivery systems. Moreover, in cases where the fragments supplied by the could store 210 and related components may be supplied with latency (i.e., use of a look-ahead fragment buffering approach), the store 210 and related components may not need to obey the stringent QoS/QoE requirements that can be supported through use of local CPE and the high symmetric bandwidth, low latency connections (e.g., 5G NR links) described below.

The network architecture 200 of FIG. 2 further includes one or more packaging processes or entities 203 in data communication with the FDC server 218. The exemplary packager may be configured to perform a number of different functions, including: (i) transcoding of content; (ii) segmentation and associated processing; (iii) digital rights management (DRM) data processing and insertion; and (iv) secondary content (e.g., advertisement) insertion. The "packaged" streams are then distributed to the requesting users, such as on an individual basis; i.e., per requesting device IP address via one or more routers and other network infrastructure (e.g., HSD/DOCSIS modem) of the distribution network 202.

FIGS. 2a-2e are logical block diagrams conceptually illustrating operation of the exemplary network architecture of FIG. 2 according to one particular implementation. In this implementation, the following assumptions and mathematical model calculations are utilized, although it will be appreciated by those of ordinary skill given the present disclosure that other parameters (and values thereof), assumptions, and/or calculations or mathematical relationships may be used consistent with the disclosure.

First, it is assumed that the clients (e.g., CPE or nSTBs) have an available mean upload speed UMbit/s (e.g. 100 Mbit/s). Further, it is assumed that no more than u % (u being less than 100%) of this uplink capacity from contributing nSTBs may be used for sharing content with other subscribers; however, it will be appreciated that the value of u may be varied on a per-nSTB, per-cluster, per-subgroup, etc. basis, including dynamically as a function of time or other parameters such as network available bandwidth or D (described below); that is, u may scale with D and/or U.

Next, it is assumed that client devices or nSTBs each have a given download speed D Mbit/s (e.g. 1000 Mbit/s), which may be the same or different than the upload speed U. No more than d % (d being less than 100%) of this downlink capacity of the receiving client devices may be used for downloading content from other subscribers; however, it will be appreciated that the value of u may be varied on a per-nSTB, per-cluster, per-subgroup, etc. basis, including dynamically as a function of time or other parameters such as network available bandwidth or U (described above); that is, d may scale with D and/or U.

One or more given clusters of nSTBs or client devices are also defined as $C_i$ ($C_i>1$), where i is the index identifying a particular cluster within the system 250, and the value of $C_i$ is the number of nSTBs in that ith cluster. In one implementation, each cluster is nSTB-specific (i.e., not only does c specify how many nstbs, but also their particular identities (e.g., via the FIT, which maps nSTBs to fragments)

It is further assumed that each cluster $C_i$ is "self-sufficient" in terms of uplink capacity for all of the clients in that cluster to be consuming video content simultaneously. In one implementation, sufficiency is determined in relation to another quantity such as downlink capacity for that cluster (i.e., that there is sufficient uplink capacity for the cluster as a whole relative to the downlink capacity, thereby obviating the need for additional uplink). For example, the total uplink capacity within a given cluster of nSTB $(C_i)=a\cdot C_i\cdot u\cdot U$ Mbit/s, while the total downlink capacity required when all active nSTB are consuming video content=$a\cdot C_i\cdot V$ Mbit/s. For a given cluster to be self-sufficient, downlink demand should be ≤80% of total uplink capacity, per Eqn. (1):

$$a\cdot C_i\cdot V \le 80\% \; a\cdot C_i\cdot u\cdot U \quad \text{Eqn. (1)}$$

and therefore $u\cdot U \ge V/0.8$ Mbit/s.

A given cluster $C_i$ of clients may have some percentage (e.g., a %) of then-active devices which are able to contribute to the total uplink capacity. As devices become active or inactive (due to e.g., equipment failure, power-up/down, etc.), the value of a may vary.

Another assumption of the exemplary model implementation is that the maximum bitrate required for a given class of designated content (e.g., video)=V Mbit/s, with a stream or file duration=T seconds. Maximum dimensioned downlink demand is e.g., 80% of total uplink capacity and the maximum downlink throughput is a prescribed percentage (e.g., 80%) of total downlink capacity (D). The "≤" relationship and the prescribed fraction (e.g., 80% factor) assure self-sufficiency, including in environments where the supporting network protocols (e.g., Ethernet IEEE Std. 802.3) cannot continuously sustain data throughput at the peak data rate. It is further assumed that minimum media (e.g., video) buffer playback duration=P seconds, and the buffer download (buffer fill) time=L seconds.

Figure 4A:
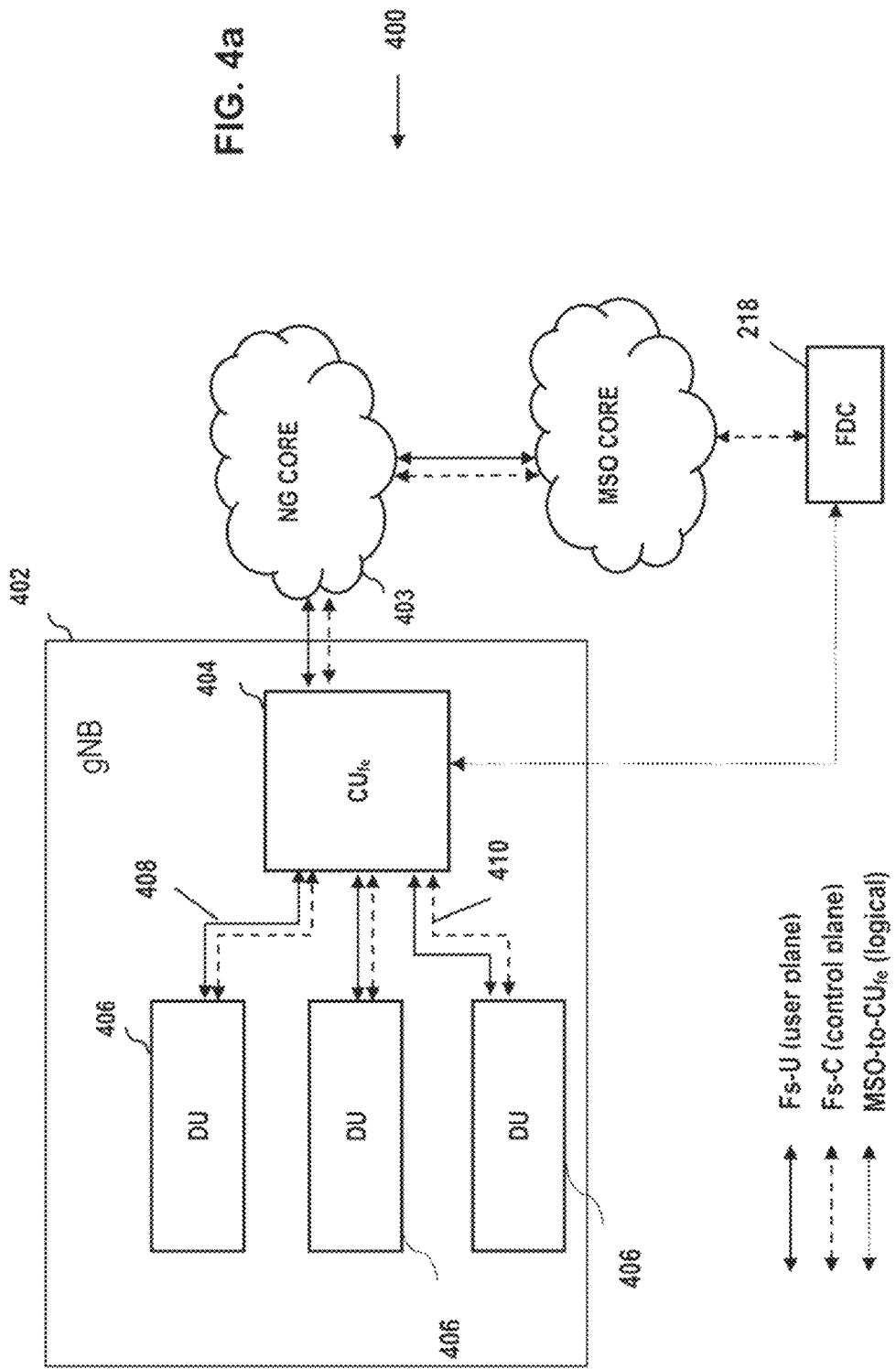
FIG. 4a is a functional block diagram of one exemplary embodiment of a gNB architecture including fragmentation-enabled CU ($CU_{fe}$) and multiple DUs, according to the present disclosure.
Figures 1, 4A:
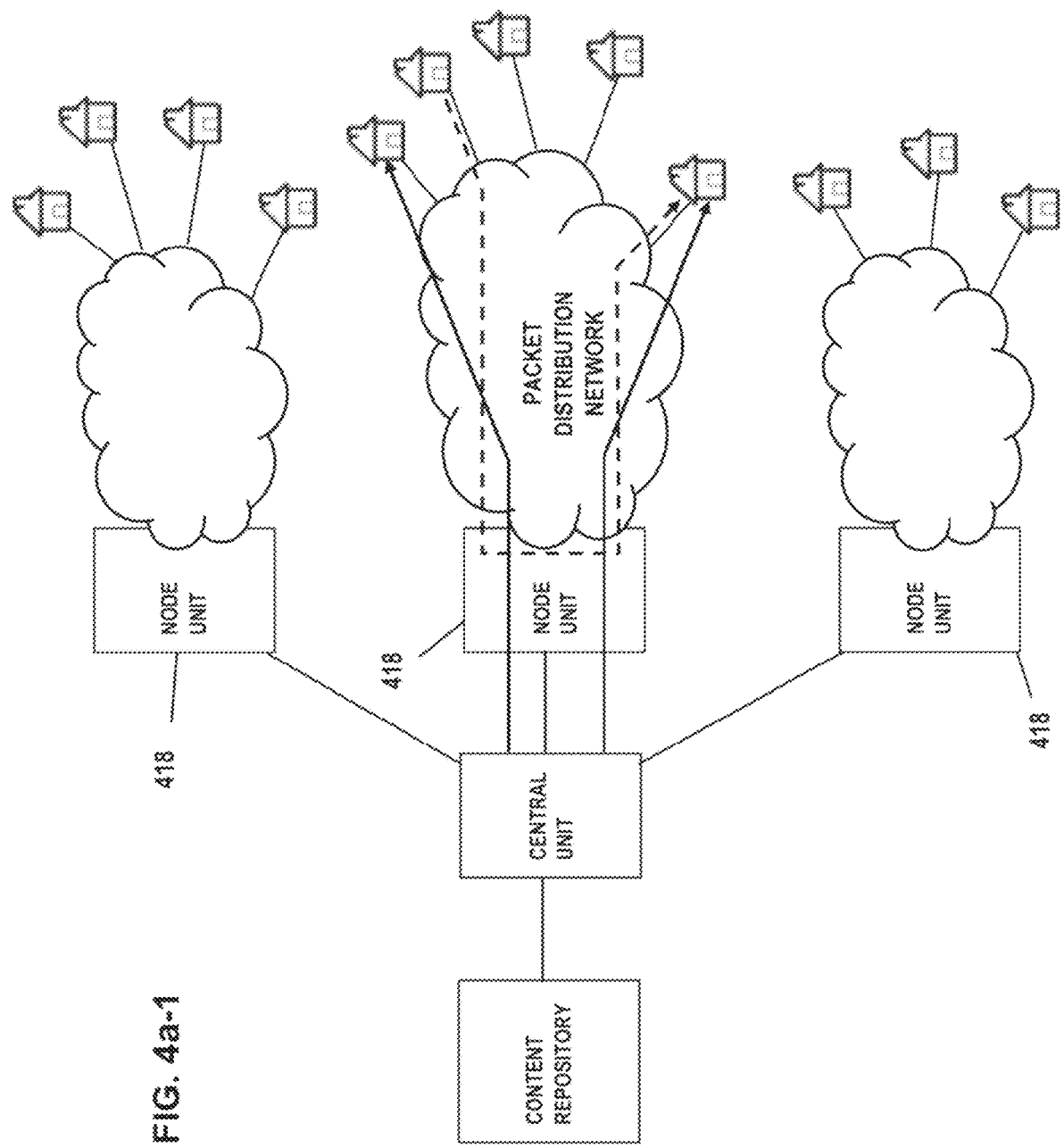
Figure 4D:
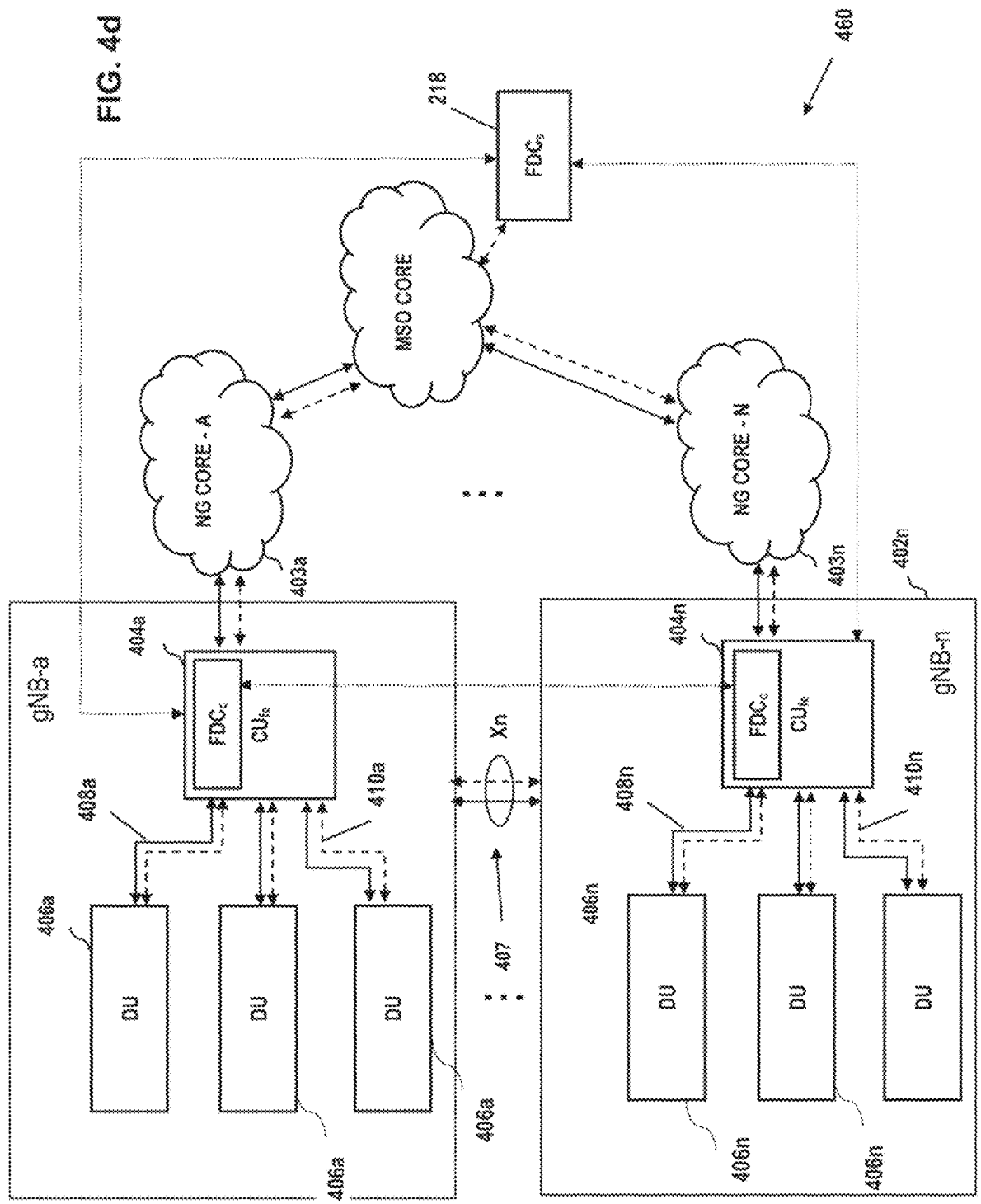
FIG. 4d is a functional block diagram of yet a further exemplary embodiment of a gNB architecture including multiple $CU_{fe}$ entities implementing a distributed FDC (dFDC), according to the present disclosure.

Moreover, it is assumed that a media "library" or total number of video titles=v files. The exemplary model also creates various identifiers (IDs) for use in the fragmentation, distribution, and re-assembly processes. Specifically, a global network nSTB identifier (Global_nSTB_ID) is defined per Eqn. (2):

$$\text{Global\_nSTB\_ID}=\text{Node\_ID}\cdot 2^{10}+\text{nSTB\_ID}(\text{Total 32 bits}) \quad \text{Eqn. (2)}$$

wherein the Node_ID (e.g., the particular servicing node 418 within the topology; see FIG. 4a-1) is 22 bits ($2^{22} \approx 4.2$ million possible combinations), and the nSTB_ID is 10 bits ($2^{10} \approx 1K$ possible combinations).

A global network fragment identifier (Global_Fragment_ID) is defined per Eqn. (3):

$$\text{Global\_Fragment\_ID}=\text{Title\_ID}\cdot 2^{32}+\text{Fragment\_ID}\cdot 2^{22}+\text{Redundancy\_ID}(64 \text{ bits}) \quad \text{Eqn. (3)}$$

wherein the Redundancy_ID is 10 bits ($2^{10}=1K$ possible combinations), the Fragment_ID is 22 bits ($\approx 4.2$ million possible combinations), and the Title_ID is 32 bits ($2^{32} \approx 4.3$ Billion possible combinations).

The minimum downlink speed required at a participating nSTB is defined by Eqn. (4):

$$D \geq (P \cdot V)/(d \cdot L \cdot 80\%) \quad \text{Eqn. (4)}$$

In the exemplary implementation, the content (e.g., video or other media) file of size $F_C$ is divided (distributed within the network) so that no single user or nSTB may have all the fragments. The minimum fragment size ($F_{min}$) is therefore given by Eqn. (5):

$$F_{min} \leq F_C/2 \text{ Mbits} \quad \text{Eqn. (5)}$$

Conversely, the maximum fragment size $F_{max}$ is defined by the initial video buffer size and the capacity of the uplink, such that:

$$F_{max} \leq \text{Minimum}(P \cdot V, u \cdot U \cdot L) \text{ Mbits}. \quad \text{Eqn. (6)}$$

A "typical" fragment size is given by Eqn. (7):

$$F_t = \text{Minimum}(P \cdot V, u \cdot U \cdot L, F_C/2) \text{ Mbits} \quad \text{Eqn. (7)}$$

A minimum number of fragments per video file is defined per Eqn. (8):

$$f_V \geq T \cdot V/F_t \quad \text{Eqn. (8)}$$

Further, a redundancy factor R is defined for e.g., storage failure contingency in active nSTBs (such as where all or a portion of an HDD or SSD fails or the nSTB is otherwise unavailable). In one variant, the content fragments and nSTBs are divided into R lists, where R is the redundancy factor, and the list index r is determined by:

$$r = \text{Global\_Fragment\_ID Mod } R+1 \text{ (for content fragments); and} \quad \text{Eqn. (9)}$$

$$r = \text{Global\_nSTB\_ID Mod } R+1 \text{ (for nSTBs)}. \quad \text{Eqn. (10)}$$

In this exemplary implementation, each file also has a Fragment Index Table (FIT) that maps all fragments (regardless of r index) to one or more recipient nSTBs. As described in greater detail below with respect to FIG. 2d, a given nSTB receives and stores the FIT within its own Fragment Index Database (FID), which contains FITs for all content files for which that nSTB has fragments.

Table 4 shows how the nSTBs are mapped to different list index r for a sample network with 2 Nodes and 5 nSTB connected to each Node.

TABLE 4

| Node_ID | nSTB_ID | Global_nSTB_ID | Redundancy List Index [r] |
|---|---|---|---|
| 1 | 1 | 1025 | 3 |
| 1 | 2 | 1026 | 1 |
| 1 | 3 | 1027 | 2 |
| 1 | 4 | 1028 | 3 |
| 1 | 5 | 1029 | 1 |
| 2 | 1 | 2049 | 1 |
| 2 | 2 | 2050 | 2 |
| 2 | 3 | 2051 | 3 |
| 2 | 4 | 2052 | 1 |
| 2 | 5 | 2053 | 2 |

Table 5 shows how each list index r is then associated with a different number of nSTB, according to Eqn. (10):

TABLE 5

| Redundancy List Index [r] | | |
|---|---|---|
| 1 | 2 | 3 |
| 1026 | 1027 | 1025 |
| 1029 | 2050 | 1028 |
| 2049 | 2053 | 2051 |
| 2052 | | |

Table 6 shows how 3 exemplary content titles, each with 4 fragments, and 3 instances of each fragment for redundancy (r=3) are mapped to nSTB by common list index r value:

TABLE 6

| Title | Fragment | Redundancy | Global_Fragment_ID | Redundancy List Index [r] | Global_nSTB_ID |
|---|---|---|---|---|---|
| 1 | 1 | 1 | 4299161601 | 1 | 1026 |
| 1 | 1 | 2 | 4299161602 | 2 | 1027 |
| 1 | 1 | 3 | 4299161603 | 3 | 1025 |
| 1 | 2 | 1 | 4303355905 | 2 | 2050 |
| 1 | 2 | 2 | 4303355906 | 3 | 1028 |
| 1 | 2 | 3 | 4303355907 | 1 | 1029 |
| 1 | 3 | 1 | 4307550209 | 3 | 2051 |
| 1 | 3 | 2 | 4307550210 | 1 | 2049 |
| 1 | 3 | 3 | 4307550211 | 2 | 2053 |
| 1 | 4 | 1 | 4311744513 | 1 | 2052 |
| 1 | 4 | 2 | 4311744514 | 2 | 1027 |
| 1 | 4 | 3 | 4311744515 | 3 | 1025 |
| 2 | 1 | 1 | 8594128897 | 2 | 2050 |
| 2 | 1 | 2 | 8594128898 | 3 | 1028 |
| 2 | 1 | 3 | 8594128899 | 1 | 1026 |
| 2 | 2 | 1 | 8598323201 | 3 | 2051 |
| 2 | 2 | 2 | 8598323202 | 1 | 1029 |
| 2 | 2 | 3 | 8598323203 | 2 | 2053 |
| 2 | 2 | 1 | 8602517505 | 1 | 2049 |
| 2 | 3 | 2 | 8602517506 | 2 | 1027 |
| 2 | 3 | 3 | 8602517507 | 3 | 1025 |
| 2 | 4 | 1 | 8606711809 | 2 | 2050 |
| 2 | 4 | 2 | 8606711810 | 3 | 1028 |

TABLE 6-continued

| Title | Fragment | Redundancy | Global_Fragment_ID | Redundancy List Index [r] | Global_nSTB_ID |
|---|---|---|---|---|---|
| 2 | 4 | 3 | 8606711811 | 1 | 2052 |
| 3 | 1 | 1 | 12889096193 | 3 | 2051 |
| 3 | 1 | 2 | 12889096194 | 1 | 1026 |
| 3 | 1 | 3 | 12889096195 | 2 | 2053 |
| 3 | 2 | 1 | 12893290497 | 1 | 1029 |
| 3 | 2 | 2 | 12893290498 | 2 | 1027 |
| 3 | 2 | 3 | 12893290499 | 3 | 1025 |
| 3 | 3 | 1 | 12897484801 | 2 | 2050 |
| 3 | 3 | 2 | 12897484802 | 3 | 1028 |
| 3 | 3 | 3 | 12897484803 | 1 | 2049 |
| 3 | 4 | 1 | 12901679105 | 3 | 2051 |
| 3 | 4 | 2 | 12901679106 | 1 | 2052 |
| 3 | 4 | 3 | 12901679107 | 2 | 2053 |

In this fashion, each participating nSTB includes data relating to (i) local storage of certain fragments of a given content file, and (ii) non-local (e.g., other nSTB) storage of the same and/or other fragments of the same given content file. Hence, each individual nSTB can access its own local database to determine where each of the individual fragments of the given content file can be obtained (whether locally, or at one or more other nSTBs within the cluster).

Moreover, in another variant, a given nSTB can make "calls" (e.g., transmit a request message to prompt a reply from one or more other entities, such as another nSTB in the cluster, or a network supervisory or management process having a "master" database of FITs such as the fragmenter 208 and master FID 209 in FIG. 2) to determine fragment location(s) if not available via the nSTB's local database, or where drawing certain fragments from particular nSTBs is desired from a network perspective). This capability advantageously supports a variety of use cases or scenarios, and provides other benefits in terms of functionality. For example, if there are content security requirements that mandate fragments be distributed outside of the given service area, the foregoing capability provides the ability to use a larger portion of the total network for larger segments of fragmentation and scattering.

Moreover, such capability can be leveraged if is determined that it is easier/more cost effective to upgrade network infrastructure to enable lower latency (and network-based buffering), as opposed to adding more capability on the multitude of nSTBs in service.

Yet further, the foregoing functionality allows for a much higher order of redundancy to, inter alia, support seamless user experience when streaming.

Consider also the scenario of when a new content file has just become available (e.g., at a central content repository of the network), and the end-user or subscriber knows that this content should become available at that time; e.g., because the release of the content has been publicized in advance. Since there is insufficient time for the network content management and distribution elements to pre-load or populate the nSTBs with encrypted fragments of the new content, requesting nSTBs can obtain the Fragment Index Database for the section of the FIT applicable to the desired (new) content during such periods. Since the fragments and nSTB are identified in the FIT using their global IDs, the requesting nSTB is not restricted to fetching missing fragments from other nSTBs connected to the same Node.

Figure 2B:
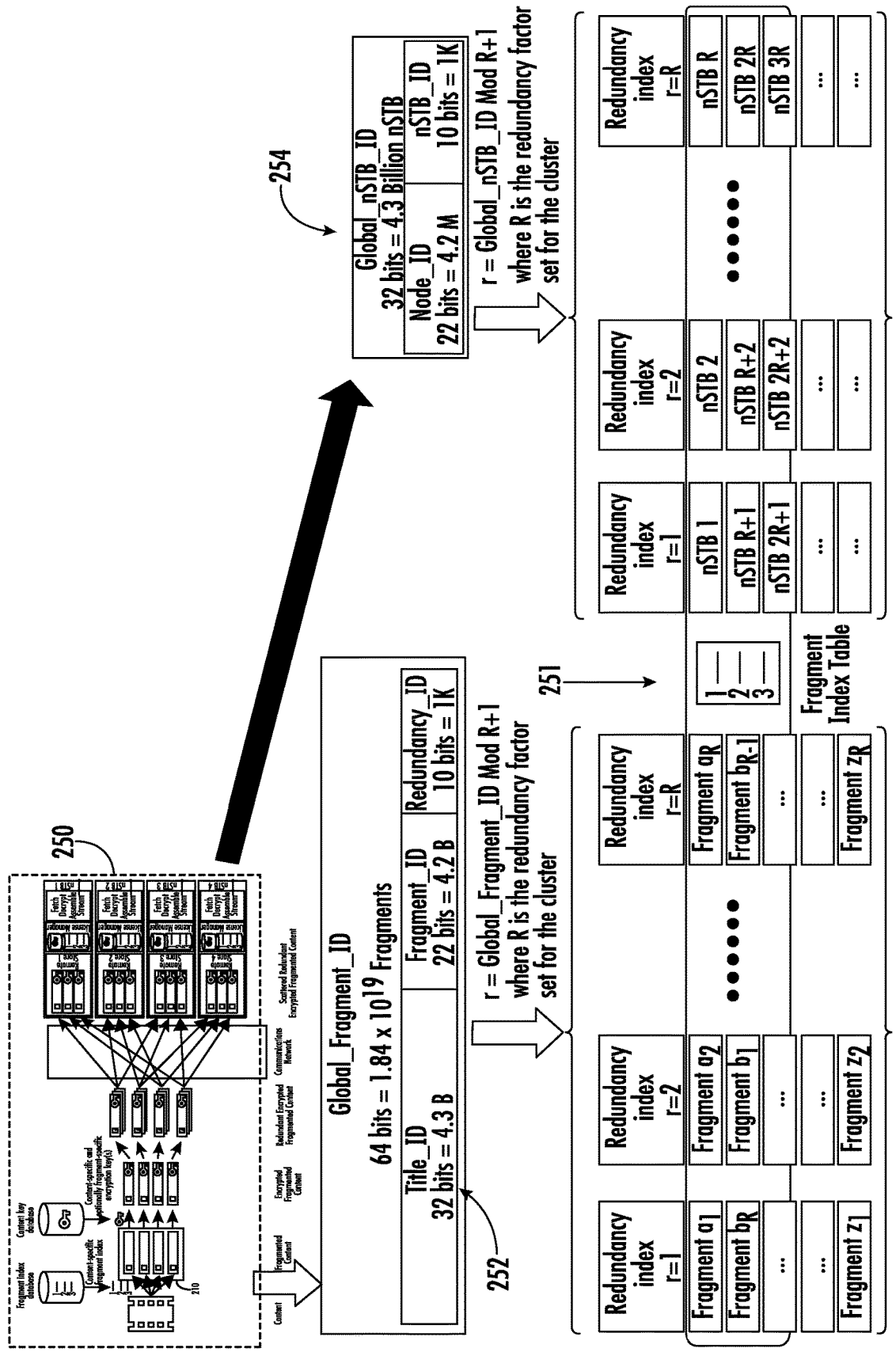
FIG. 2b graphically illustrates generation of the Global_Fragment_ID and Global_nSTB_ID, as well as the Fragment Index Table (FIT), according to one embodiment of the disclosure.

FIG. 2b graphically illustrates generation of the Global_Fragment_ID 252 and Global_nSTB_ID 254, as well as the FIT 251, according to one embodiment.

Figure 2C:
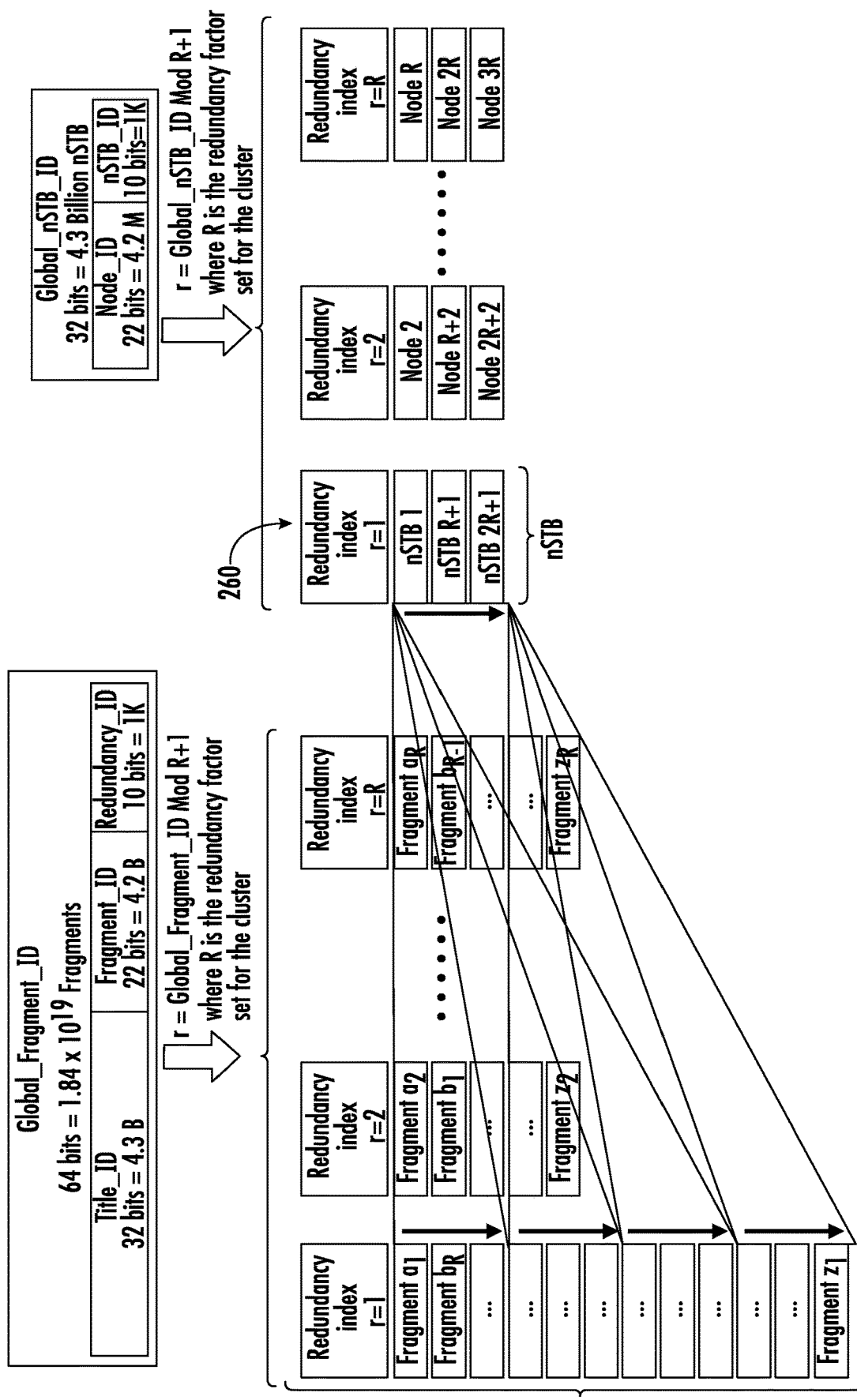
FIG. 2c graphically illustrates mapping of content file fragments to those nSTBs with the same "r" index according to one embodiment of the disclosure.

As shown in FIG. 2c, content file fragments are in the exemplary implementation mapped to those nSTBs with the same "r" index. Since the number of fragments are expected to exceed the number of nSTB (whether within the same cluster or globally throughout the network), the fragments 261 for a given content file are mapped sequentially to nSTBs and when the number of nSTBs is exhausted (i.e., the bottom of the nSTB list for index r=i 260 as shown in FIG. 2c), the mapping algorithm returns to the top of the nSTB list 260 to continue mapping fragments. In this manner, every nSTB in the cluster within which the content file is being mapped is given at least one fragment, and some two or more (depending on the relationship of the number of fragments for that file to the number of nSTBs).

It will appreciated, however, that other approaches for mapping may be used, whether alone or in combination with the foregoing, including for example (i) allocating two or more sequential file fragments (e.g., Fragment$_{a1}$ and Fragment$_{b1}$ in FIG. 2c) to a given nSTB on the list 260 before moving to the next nSTB on the list; (ii) utilizing a randomized or pseudo-randomized sequence for assigning fragments to nSTBs; (iii) using one or more metrics relating to the content file to determine allocation (e.g., wherein larger files with ostensibly more fragments are allocated using a scheme different than that used for smaller files with less files); and/or (iv) using one or more metrics relating to the target nSTB(s) to determine allocation (e.g., wherein nSTBs with ostensibly more storage and/or which have less "offline" or down time) are allocated using a scheme different than that used for other nSTBs).

In the exemplary implementation, the number of unique fragments in a given cluster $C_i$ is given by Eqn. (11):

$$f_{Ci} = v \cdot f_V \qquad \text{Eqn.(11)}$$

The total number of fragments stored per nSTB is given by Eqn. (12):

$$f_S = f_C \cdot R/C \qquad \text{Eqn. (12)}$$

Accordingly, a total amount of data storage per client (e.g., nSTB) S is given by Eqn. (13), $$S = F \cdot f_S/(8.1024) \ GB \qquad \text{Eqn. (13)}$$

Figure 2D:
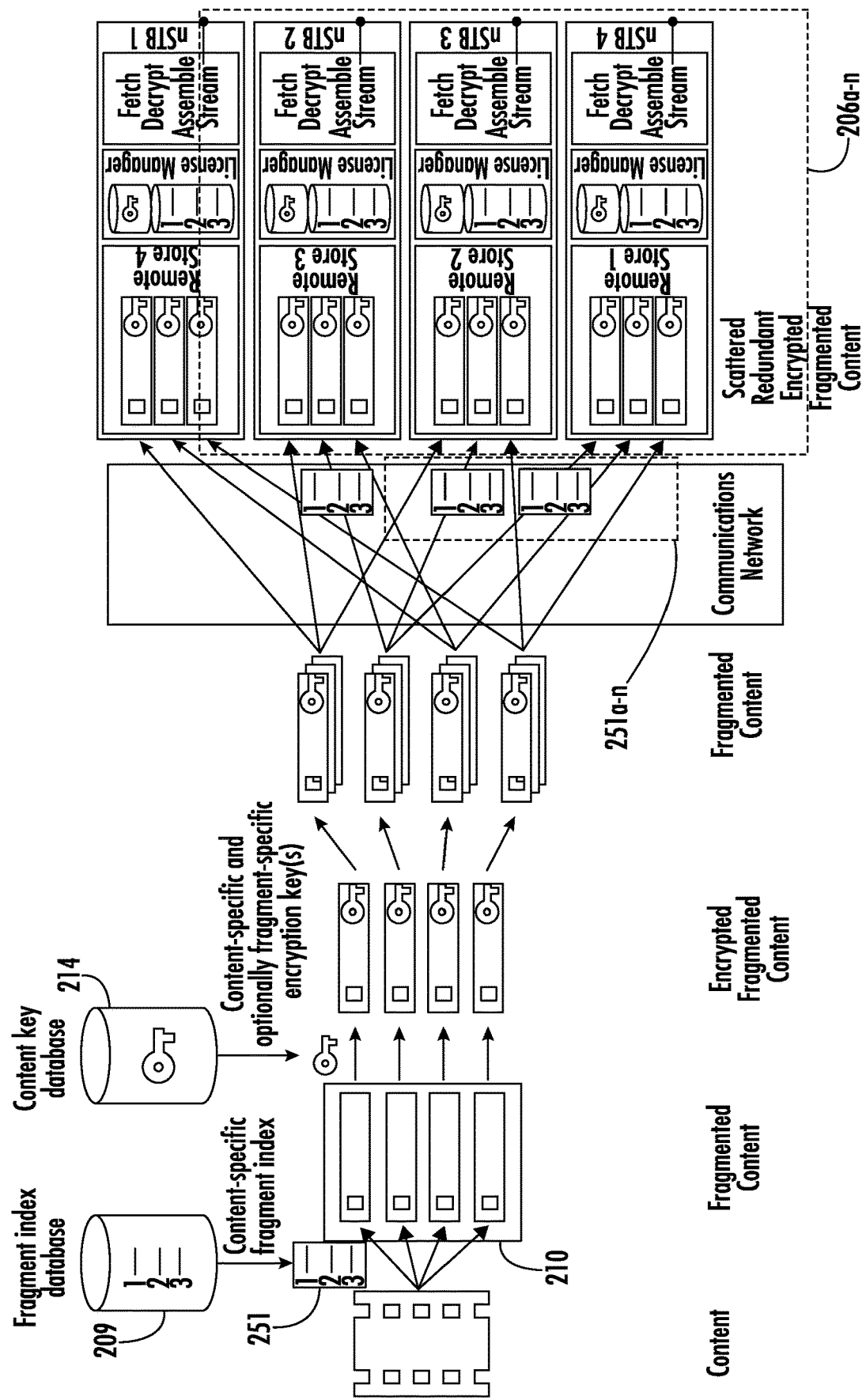
FIG. 2d graphically illustrates distribution of common FITs to participating nSTBs within a cluster $C_i$ according to one embodiment of the disclosure.

FIG. 2d illustrates an exemplary implementation of a FIT allocation scheme according to the present disclosure. As discussed previously, the FIT is used by the nSTBs participating within a cluster $C_i$ to determine where the fragments of a given content file are located, including those needed by a given nSTB to complete the file for decode/rendering.

In the exemplary embodiment, the FIT 251 for a given content file is distributed as individual FITs 251a-n as shown, to all nSTBs which are recipients of the fragments of that file. The receiving nSTB stores the FIT 251a-n within its own Fragment Index Database (FID) in local or attached storage (e.g., HDD or SSD or other memory device) fur use during reconstitution/reassembly. In this manner, unnecessary duplication is avoided (i.e., nSTBs only have FITs for content files for which they possess or will possess fragments). It will be appreciated, however, that alternatively, FITs can be "broadcast" or "multicast" to wider subsets of the nSTB population, such as e.g., for the purpose of performing local or edge analytics based on the data of where all fragments of a given content file (or set of files) are stored, and not merely just those to which a given nSTB fragments relate. For instance, for purposes of most efficiently pulling fragments from a given one or more nSTBs, it may be desirous for the requesting (target) nSTB to know which of the candidate source nSTBs is most heavily loaded or encumbered, such as by determining how many different content files it maintains fragments. Small, lightly-loaded fragment repositories that are "local" to the target nSTB may in fact be better candidates than distant, mass-fragment repositories for purposes of obtaining one or more fragments within QoS and/or latency requirements.

Alternatively, broader distribution of FITs may be used for FIT/FID redundancy purposes (i.e., so that the "big picture" mapping of all content element files and their fragments can be reconstituted in the event of e.g., fragmenter 208/database 209 corruption or failure via access to local (nSTB) stores of FITs).

Referring again to FIG. 2d, when decoding/rendering a content file, the target nSTB uses its FIT to identify other nSTBs within the cluster which maintain the needed fragments which the target nSTB does not possess. Once identified, these other source nSTB(s) are contacted by the target nSTB via e.g., control plane messaging via Layer 2/3 to cause transmission of the requisite fragments via the interposed transmission PHY (e.g., one or more 5G NR bearers).

Note that in the case where a given decoding/rendering nSTB maintains no fragments for a given content file, it downloads a complete FIT from e.g., the network database 209 (or alternatively another local nSTB possessing the complete FIT for that file), and then invoke the foregoing procedure to obtain all fragments for that file (which are sourced from at least two different nSTBs within the cluster). Alternatively, as described above, the target nSTB may already possess the FIT for a file which it has no fragments (e.g., per the broadcast/multicast mechanisms) to obviate contacting the network database 209.

Figure 2E:
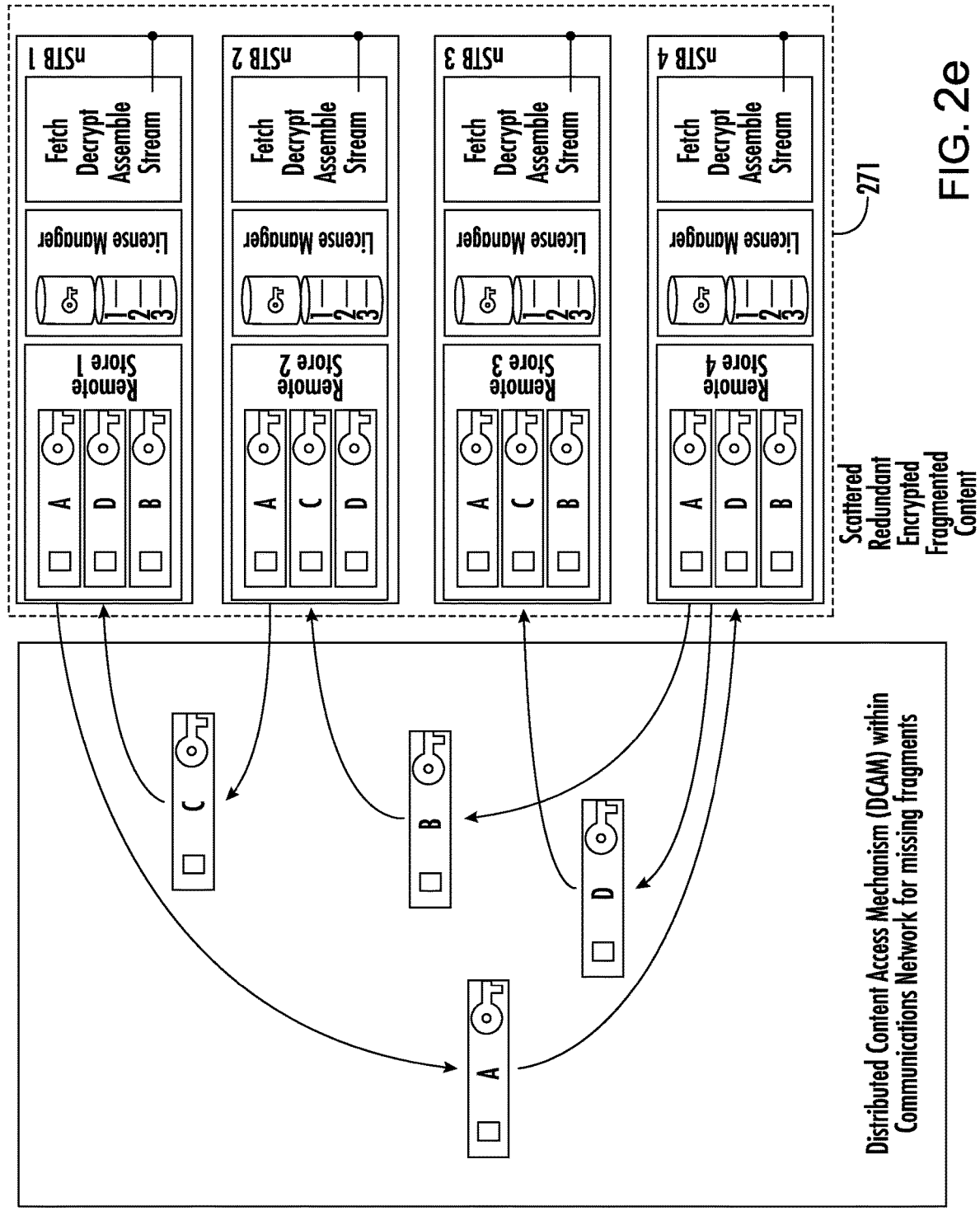
FIG. 2e graphically illustrates various nSTBs within a common cluster $C_i$ obtaining fragments A-D of a hypothetical content file to complete file reassembly.

FIG. 2e graphically and conceptually illustrates various nSTBs 206a-n within a common cluster $C_i$ 271 obtaining fragments A-D of a hypothetical content file to complete file reassembly (and thereby permit decode and rendering).

The following exemplary scenarios further illustrate application of the foregoing principles.

Scenario 1—

In a first scenario, an 8K HDR (high dynamic range), 60 frames per second (fps) movie-length video is streamed. As a brief aside, 8K resolution, or 8K UHD, is the greatest current ultra-high definition television (UHDTV) resolution in digital television and digital cinematography. The term "8K" refers to the horizontal resolution of 7,680 pixels, forming the total image dimensions of (7680×4320), otherwise known as 4320p (based on a 16:9 aspect ratio).

The 8K streaming HDR video at 60 fps consumes V=150 Mbit/s. If no more than u=50% of a user's upload capacity should be used to contribute content to other subscribers, a subscriber's uplink speed should be U≥375 Mbit/s. Likewise, if no more than d=50% of a user's download capacity should be used to initially buffer a video stream, and if a 2-second video playback buffer (P=2) is to be downloaded in 1 second for responsiveness (L=1), then a subscriber's downlink speed should be D≥750 Mbit/s. The maximum fragment size $F_{max}$=Minimum(300, 187.5) Mbits; therefore, $F_{max}$=187.5 Mbits (or ≈23.44 MB).

Given a 90-minute movie video file duration, then T=5400 seconds. The minimum number of fragments per video file $f_f$=5400.150/187.5=4320. With an assumed 1000 titles (v=1000) stored with redundancy factor 2 (R=2) in a cluster of 1000 nSTB ($C_i$=1000), the total fragments stored per nSTB=1000·4320·2/1000, $f_S$=8640, thereby requiring a total storage per nSTB=187.5·8640/(8.1024), or S=197.8 GB per nSTB.

Scenario 2—

In a second exemplary scenario, a full-HD 30 fps movie-length video is streamed. Assuming that full-HD at 30 fps consumes V=8 Mbit/s and if no more than u=50% of a user's upload capacity should be used to contribute content to other subscribers, then a subscriber's uplink speed should be U≥20 Mbit/s. If no more than d=50% of a user's download capacity should be used to initially buffer a video stream, and if a 2-second video playback buffer (P=2) is to be downloaded in 1 second for responsiveness (L=1), then a subscriber's downlink speed should be D≥40 Mbit/s. The maximum fragment size F=Minimum(16, 10) Mbits; with an F=10 Mbits (=1.25 MB), a 90-minute movie video file duration T=5400 seconds, and the minimum number of fragments per video file $f_f$=4320. Assuming 1000 titles (v=1000) stored with redundancy factor 2 (R=2) in a cluster of 1000 nSTB ($C_i$=1000), the total fragments stored per nSTB=1000·4320·2/1000, $f_S$=8640, and hence the total storage per nSTB=187.5·8640/(8.1024), S=10.6 GB. It is noted that this comparatively low value allows for one or more other factors to be expanded (e.g., use of a higher redundancy factor R, the ability to have more titles v in the library, and/or others), since 10.6 GB of storage is well below that typically found on current nSTB and other mass storage devices (whether SSD or HDD).

Distributed FDC/gNB Architectures—

Figure 3:
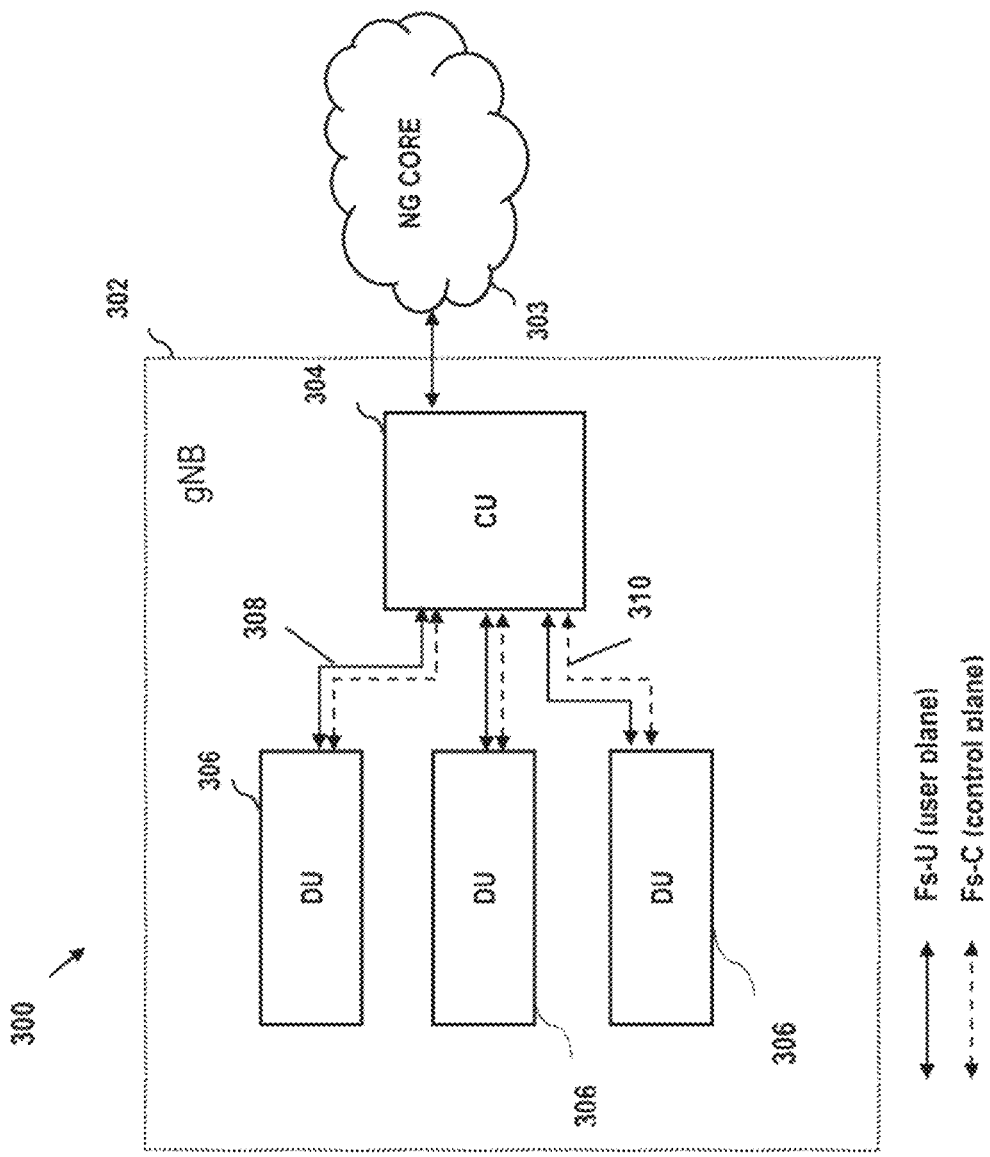
FIG. 3 is a functional block diagram of a prior art gNB architecture including CU and multiple DUs.
Figure 4F:
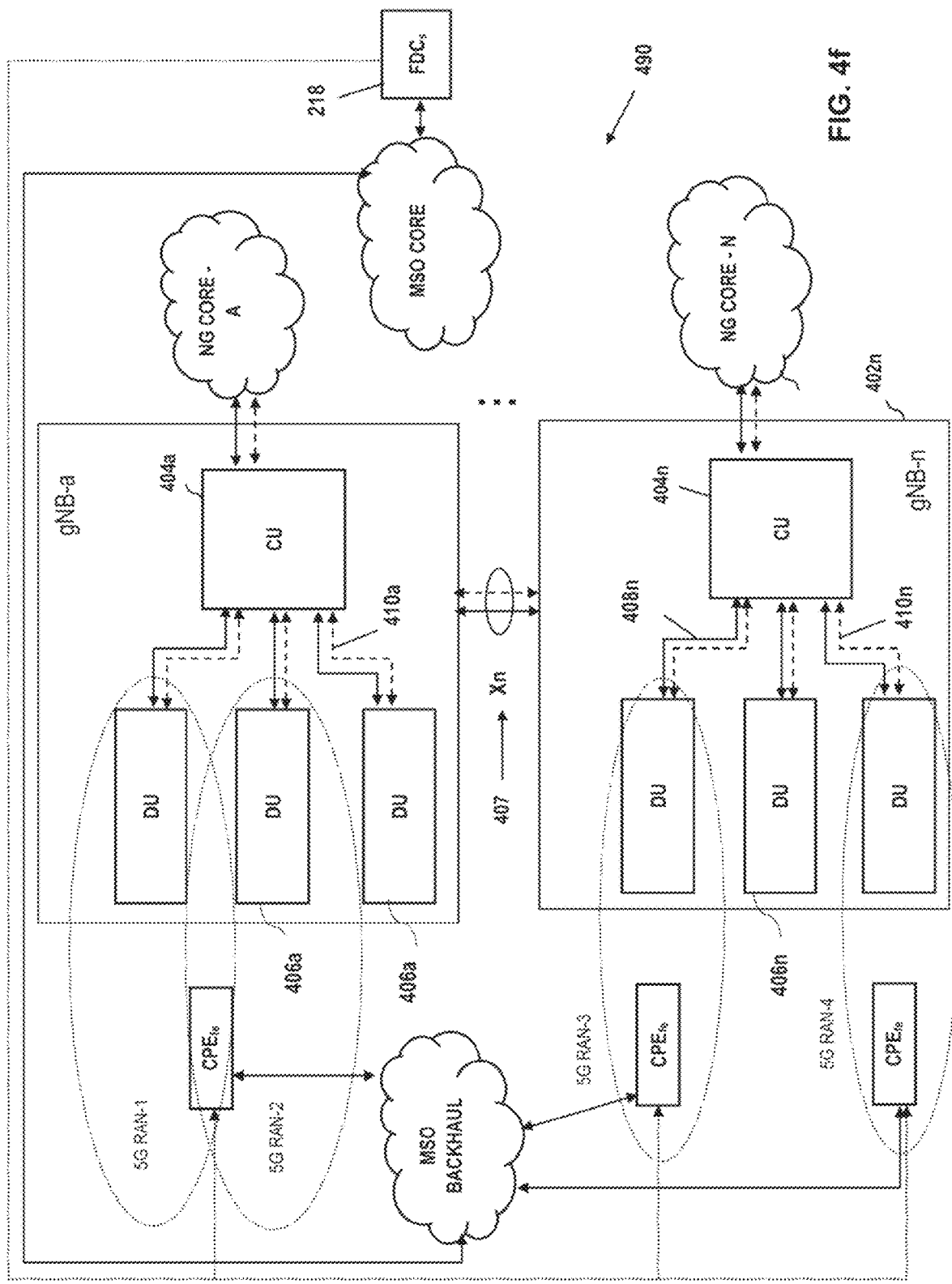
FIG. 4f is a functional block diagram of a further exemplary embodiment of a FDC architecture including multiple FD-enabled CPE, according to the present disclosure.

Referring now to FIGS. 3-4f, various embodiments of the distributed FDC and (CU/DU) gNB architecture according to the present disclosure are described.

FIG. 3 is a functional block diagram of a prior art 5G NR gNB architecture including CU and multiple DUs. In effect, the gNBs act as split or distributed eNBs utilized in 4G/4.5G (i.e., LTE/LTE-A).

As a brief aside, and referring to FIG. 3, the CU 304 (also known as gNB-CU) is a logical node within the NR architecture 300 that communicates with the NG Core 303, and includes gNB functions such as transfer of user data, session management, mobility control, RAN sharing, and positioning; however, other functions are allocated exclusively to the DU(s) 306 (also known as gNB-DUs) per various "split" options described subsequently herein in greater detail. The CU 304 communicates user data and controls the operation of the DU(s) 306, via corresponding front-haul (Fs) user plane and control plane interfaces 308, 310.

Accordingly, to implement e.g., the Fs interfaces 308, 310 and other user/control plane functions, a (standardized) F1 interface is employed. It provides a mechanism for interconnecting a gNB-CU 304 and a gNB-DU 306 of a gNB 302 within an NG-RAN, or for interconnecting a gNB-CU and a gNB-DU of an en-gNB within an E-UTRAN. The F1

Application Protocol (F1AP) supports the functions of F1 interface by signaling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

Within such an architecture 300, a gNB-DU 306 (or ngeNB-DU) is under the control of a single gNB-CU 304. When a gNB-DU is initiated (including power-up), it executes the F1 SETUP procedure (which is generally modeled after the above-referenced S1 SETUP procedures of LTE) to inform the controlling gNB-CU of, inter alia, the number of cells (together with the identity of each particular cell) in the F1 SETUP REQUEST message. The gNB-CU at its discretion may choose to activate some or all cells supported by that gNB-DU, and even alter certain operational parameters relating thereto, indicating these selections/alterations in the F1 SETUP RESPONSE message. The identity of each cell to be activated is also included in F1 SETUP RESPONSE.

In the 5G NR model, the DU(s) 306 comprise logical nodes that each may include varying subsets of the gNB functions, depending on the functional split option. DU operation is controlled by the CU 304 (and ultimately for some functions by the NG Core 403). Split options between the DU 406 and $CU_{fe}$ 404 in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PCDP split), the RRC (radio resource control) is in the $CU_{fe}$ 404 while PDCP (packet data convergence protocol), RLC (radio link control), MAC, physical layer (PHY) and RF are kept in the DU 406, thereby maintaining the entire user plane in the distributed unit.

Under Option 2 (PDCP/RLC split), there are two possible variants: (i) RRC, PDCP maintained in the $CU_{fe}$, while RLC, MAC, physical layer and RF are in the DU(s) 406; and (ii) RRC, PDCP in the CUe (with split user plane and control plane stacks), and RLC, MAC, physical layer and RF in the DU's 406.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the $CU_{fe}$ 404, while MAC, physical layer, and RF are maintained in the DU's.

Under Option 5 (Intra-MAC split), RF, physical layer and lower part of the MAC layer (Low-MAC) are in the DU's 406, while the higher part of the MAC layer (High-MAC), RLC and PDCP are in the $CU_{fe}$ 404.

Under Option 6 (MAC-PHY split), the MAC and upper layers are in the $CU_{fe}$, while the PHY layer and RF are in the DU's 406. The interface between the $CU_{fe}$ and DU's carries data, configuration, and scheduling-related information (e.g. Moduclation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DU's 406, while remaining functions reside in the $CU_{fe}$ 404. In the DL, iFFT and CP addition may reside in the DU 406, while the remainder of the PHY resides in the $CU_{fe}$ 404.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

The foregoing split options are intended to enable flexible hardware implementations which allow scalable cost-effective solutions, as well as coordination for e.g., performance features, load management, and real-time performance optimization. Moreover, configurable functional splits enable dynamic adaptation to various use cases and operational scenarios. Factors considered in determining how/when to implement such options can include: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

As shown in FIG. 4a, a first NG RAN architecture 400 according to the present disclosure modifies the prior art gNB and includes a gNB 402 having a fragmentation-enabled CU ($CU_{fe}$) 404 and a plurality of DUs 406. As described in greater detail subsequently herein, these fragmentation enabled $CU_{fe}$'s, whether autonomously or under control of another logical entity (such as the FDC 218 with which the gNB communicates, or components thereof), enable setup and establishment of high bandwidth, symmetric, low-latency wireless communication channels between (i) two or more DU 406 within the same gNB 402, and/or (ii) two or more DU within different gNBs. As such, in one variant, the F1 SETUP protocol described previously may be leveraged for e.g., cell activation, DU setup, and other functions enabling inter-edge device sessions and content fragment transfers pursuant thereto, thereby obviating a customized protocol for the gNB infrastructure.

The individual DU's 406 in FIG. 4a communicate data and messaging with the $CU_{fe}$ 404 via interposed physical communication interfaces 408 and logical interfaces 410. Such interfaces may include a user plane and control plane, and be embodied in prescribed protocols such as F1AP. Operation of each DU and $CU_{fe}$ are described in greater detail subsequently herein; however, it will be noted that in this embodiment, one $CU_{fe}$ 404 is associated with one or more DU's 406, yet a given DU is only associated with a single $CU_{fe}$. Likewise, the single $CU_{fe}$ 404 is communicative with a single NG Core 403, such as that operated by an MNO or MSO. Each NG Core 403 may have multiple gNBs 402 associated therewith.

In the architecture 420 of FIG. 4b, two or more gNBs 402a-n are communicative with one another via e.g., an Xn interface 407, and accordingly can conduct at least $CU_{fe}$ to $CU_{fe}$ data transfer and communication. Separate NG Cores 403a-n are used for control and user plane (and other) functions of the network.

In the architecture 440 of FIG. 4c, two or more gNBs 402a-n are communicative with one another via e.g., the Xn interface 407, and accordingly can conduct at least $CU_{fe}$ to $CU_{fe}$ data transfer and communication. Moreover, the separate NG Cores 403a-n are logically "cross-connected" to the gNBs 402 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 402 other than its own, and so forth), or the gNBs 402 and NG Cores 403 may form a "mesh" topology where multiple cores 403 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MNOs/MSOs, which is especially useful in e.g., dense deployment environments which may not be able to support multiple sets of RAN infrastructure.

It will be appreciated that the FD controller logic may be, in whole or part, distributed or placed in alternate location(s) within the network, whether within the MSO domain or outside thereof. For instance, in one variant, the FDC 218 comprises a series or set of distributed $FDC_c$ (client) entities in communication with one or more FDCs (server) portions, as shown in the architecture 460 of FIG. 4d. These client portions may be operative within the different $CU_{fe}$, and/or in other components (including one or more DU 406).

FIG. 4e is a functional block diagram of another exemplary embodiment of a gNB architecture including FDC control of CUs via the MSO infrastructure, according to the present disclosure. In this architecture 480, the NR gNBs 402 are backhauled by MSO backhaul infrastructure (e.g., via DOCSIS drops or nodes), such that the gNBs may individually communicate with the MSO core (and FDC 218), as well as their "home" NG Cores 403a-n. As such, the NG Cores in this embodiment are logically "short circuited" by the direct MSO-to-gNB links (user and control planes), such that the MSO can exert control over gNB (and hence DU) operation via the $CU_{fe}$ 404 of each gNB. This approach, inter alia, advantageously reduces control plane load and latency, since the NG Core of each gNB is bypassed when establishing edge-to-edge (e.g., CPE to CPE) sessions for fragment exchange.

FIG. 4f is a functional block diagram of a further exemplary embodiment of a FDC architecture including multiple FD-enabled CPE, according to the present disclosure. In this architecture 490, the MSO core (including FDC 218) are in logical communication with fragmentation-enabled CPE ($CPE_{fe}$); notably, the gNB components (DU 406 and CU 404) do not require FE logic, and hence can be COTS or "off the shelf" devices. The $CPE_{fe}$ in one embodiment include MSO-provided software (whether an application layer program, or firmware disposed to operate within low layers of the $CPE_{fe}$ stack) which utilize the 5G NR radio modems of the $CPE_{fe}$ (e.g., network layer, session layer, etc.) to establish CPE-to-CPE sessions via their respective 5G NR modems to exchange fragments under control of the FDC 218. In this instance, the NG RAN and wireless service provider infrastructure is completely transparent or pass-through to the FDA and FDC logic. PHY communication with the $CPE_{fe}$ may be established via e.g., the MSO infrastructure (e.g., in-band or DOCSIS channels), such that for example FDC 218 control plane data and commands can be passed to the $CPE_{fe}$ with low latency, thereby enabling rapid 5G NR session establishment and teardown.

It will also be appreciated that while described primarily with respect to a unitary gNB-CU entity or device 404 as shown in FIGS. 4a-4f, the present disclosure is in no way limited to such architectures. For example, the techniques described herein may be implemented as part of a distributed or dis-aggregated or distributed CU entity (e.g., one wherein the user plane and control plane functions of the CU are dis-aggregated or distributed across two or more entities such as a CU-C (control) and CU-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architectures of FIGS. 4a-4f. For instance, a given DU may act (i) solely as a DU (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area. Notably, however, E-UTRAN systems and components may not provide sufficiently high performance (low latency, symmetry, etc.) to support the requisite QoS/QoE requirements, such as for GaaS (described below).

In certain embodiments, each DU 406 is located within and/or services one or more areas within one or more venues or residences (e.g., a building, room, or plaza for commercial, corporate, academic purposes, and/or any other space suitable for wireless access). Each DU is configured to provide wireless network coverage within its coverage or connectivity range for its RAT (e.g., 5G NR), as shown in the exemplary coverage area 240 of FIG. 2. Notably, different classes of DU 406 may be utilized. For instance, by analogy, Class A LTE eNBs can transmit up 30 dbm (1 watt), while Class-B LTE eNBs can transmit up to 50 dbm, so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc. Similarly, different types of NR-enabled DU 406 can be used depending on these factors, whether alone or with other wireless PHYs such as LTE, WLAN, etc.

As a brief aside, a number of different identifiers are used in the NG-RAN architecture, including those of UE's and for other network entities (each of which may comprise CPE 206 herein for content fragmentation, distribution, and re-constitution). Specifically:

the AMF Identifier (AMF ID) is used to identify an AMF (Access and Mobility Management Function);

the NR Cell Global Identifier (NCGI), is used to identify NR cells globally, and is constructed from the PLMN identity to which the cell belongs, and the NR Cell Identity (NCI) of the cell;

the gNB Identifier (gNB ID) is used to identify gNBs within a PLMN, and is contained within the NCI of its cells;

the Global gNB ID, which is used to identify gNBs globally, and is constructed from the PLMN identity to which the gNB belongs, and the gNB ID;

the Tracking Area identity (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network, as well as CPE 206 associated with those DU/gNBs.

Encryption Handling—

Figure 5A:
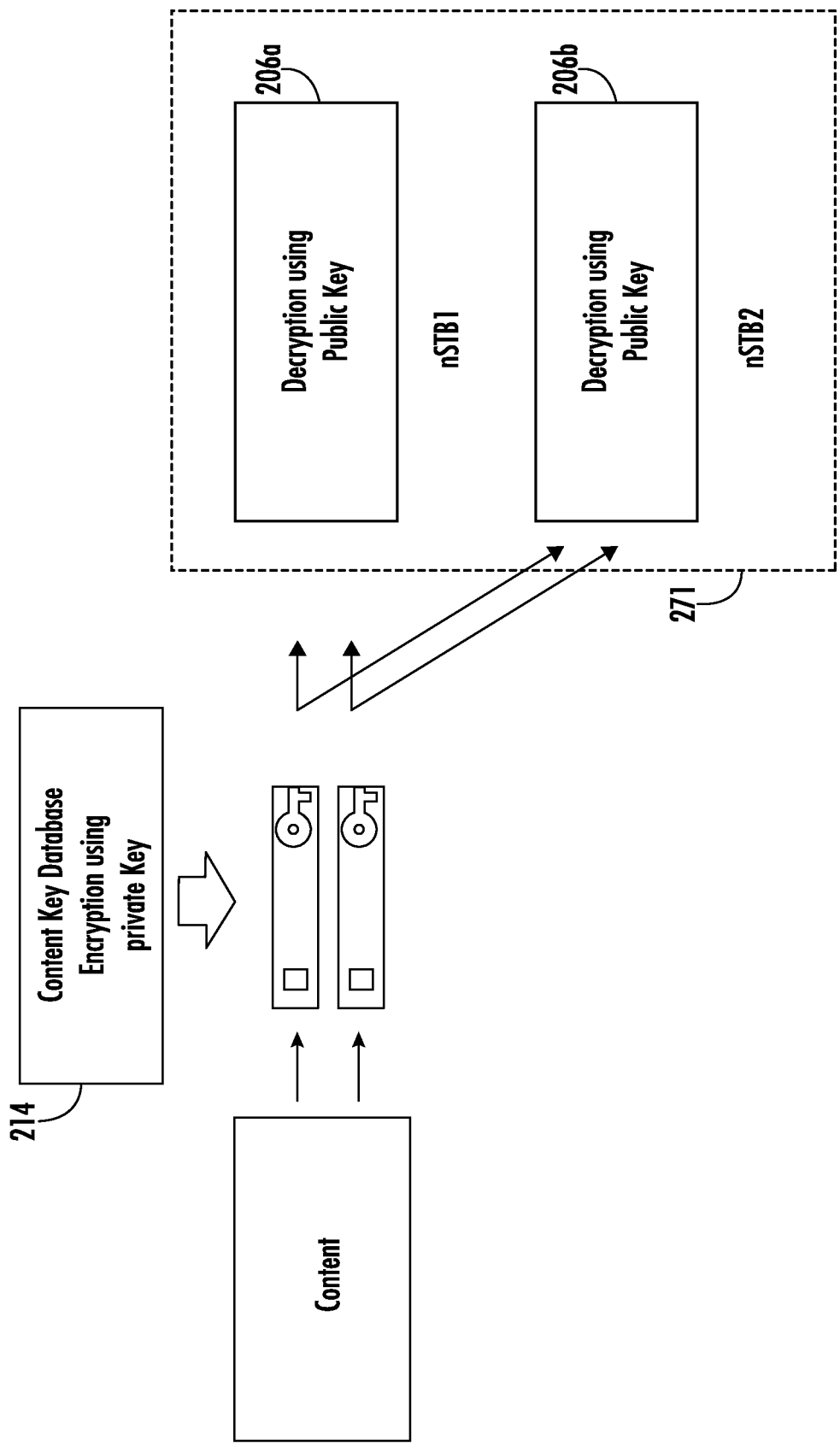
FIGS. 5a and 5b are logical block diagrams conceptually illustrating operation of various aspects of one exemplary encryption scheme useful with the fragmentation and distribution approach of the present disclosure.
Figure 5B:
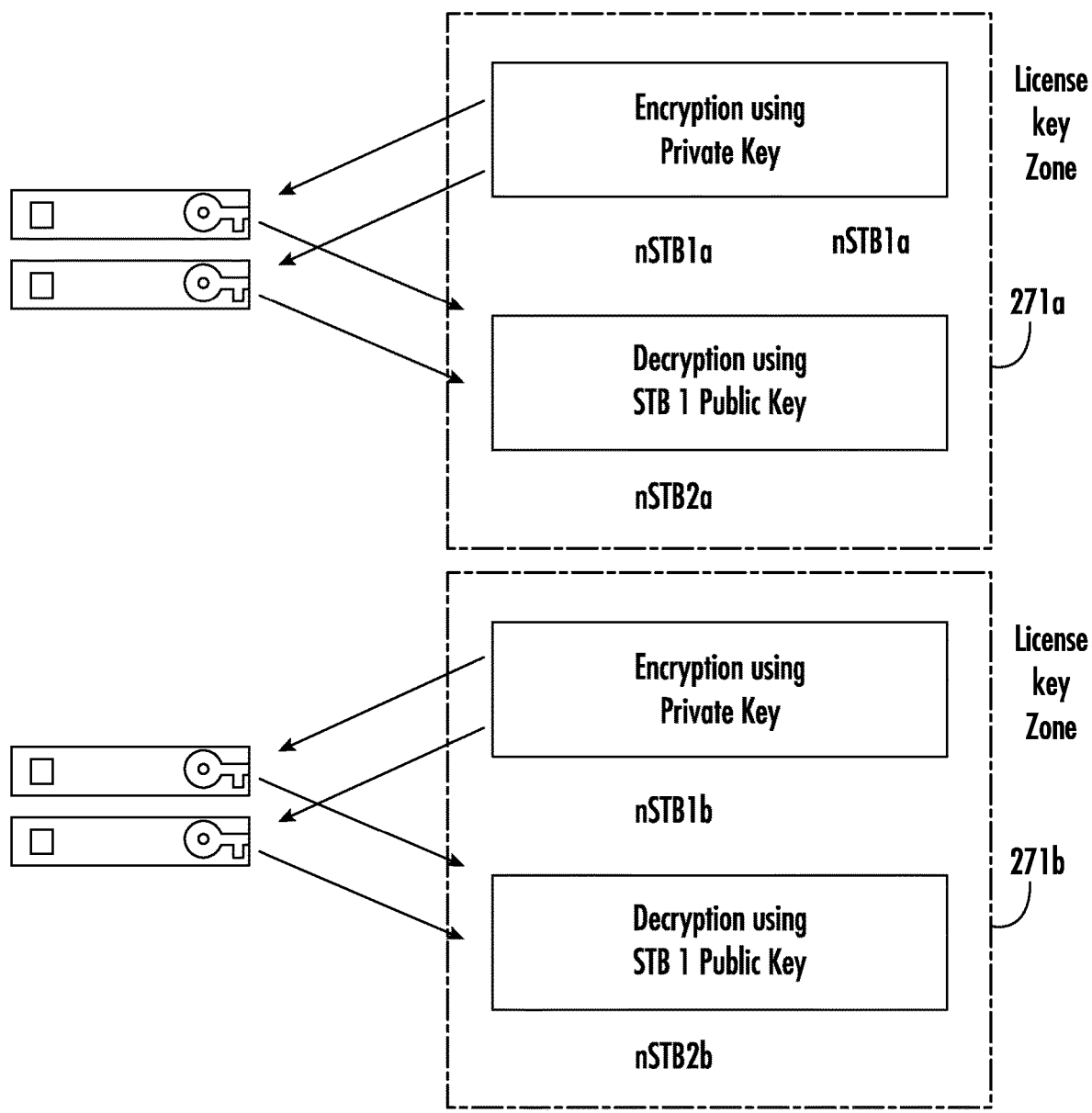

FIGS. 5a and 5b are logical block diagrams conceptually illustrating operation of various aspects of one exemplary encryption scheme useful with the fragmentation and distribution approach of the present disclosure.

In the exemplary implementation of the system architecture 200 of FIG. 2, encryption functionality is provided using private key and public key mechanisms. The fragmented content is encrypted by the main key database 214 using a main or common private key, and decrypted by the CPE 206 using, inter alia, the public key, as shown in 5a. The public keys in one implementation are stored per geographical area or license key zone, within the CPE (such as in a secure element or SE thereof); see FIG. 5b.

In another embodiment, each content fragment is separately encrypted using different keys, such that multiple keys are required to decrypt and access each of the fragments of a given content element.

FDC Apparatus—

Figure 6:
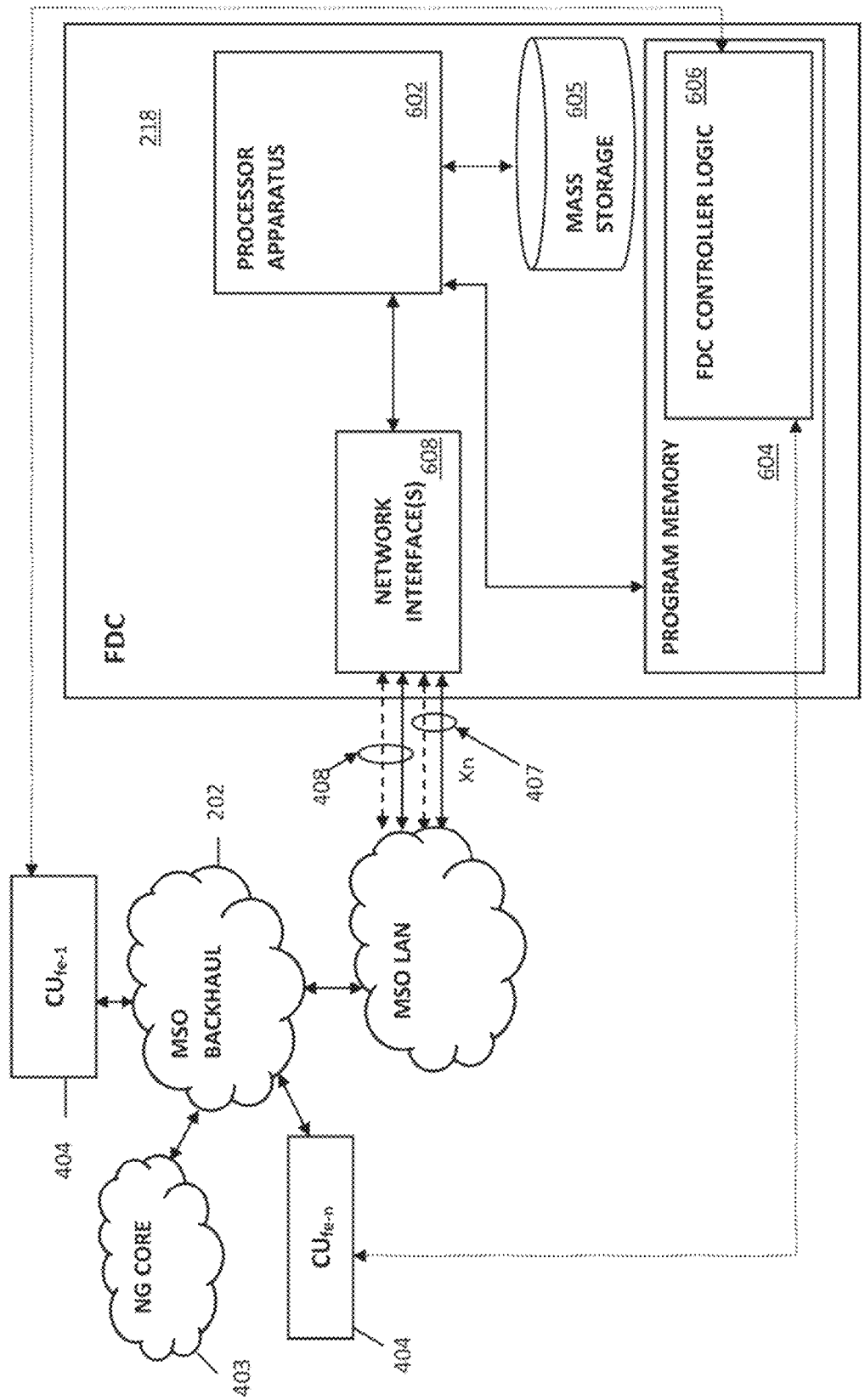
FIG. 6 is a functional block diagram illustrating a first exemplary embodiment of a Fragmentation and Distribution Controller (FDC) apparatus useful with various embodiments of the present disclosure.

FIG. 6 is a functional block diagram illustrating a first exemplary embodiment of a Fragmentation and Distribution Controller (FDC) apparatus useful with various embodiments of the present disclosure.

As shown, the FDC 218 includes, inter alia, a processor apparatus or subsystem 602, a program memory module 604, mass storage 605, FDC controller function logic 606, and one or more network interfaces 608.

In the exemplary embodiment, the processor 602 may include one or more of a digital signal processor, microprocessor, field-programmable gate array, or plurality of processing components mounted on one or more substrates. The processor 602 may also comprise an internal cache memory, and is in communication with a memory subsystem 604, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 602.

The processing apparatus 602 is configured to execute at least one computer program stored in memory 604 (e.g., a non-transitory computer readable storage medium); in the illustrated embodiment, such programs include FDC controller logic 606, such as how and where to allocate content fragments generated by the fragmenter 208, and other logical functions performed by the FDC as described elsewhere herein. Other embodiments may implement such functionality within dedicated hardware, logic, and/or specialized co-processors (not shown). The FDC controller logic 606 is a firmware or software module that, inter alia, communicates with a corresponding $CU_{fe}$ logic portion (i.e., for message exchange and protocol implementation), and/or other upstream or backend entities such as those within the NG Core 403 in alternate embodiments.

In some embodiments, the FDC logic 606 utilizes memory 604 or other storage 705 configured to temporarily hold a number of data relating to the various fragments, encryption key schemes, and the like before transmission via the network interface(s) 708 to the $CU_{fe}$ 404 or NG Core 403.

In other embodiments, application program interfaces (APIs) such as those included in an MSO-provided application or those natively available on the FDC may also reside in the internal cache or other memory 704. Such APIs may include common network protocols or programming languages configured to enable communication with the $CU_{fe}$ 404 and other network entities (e.g., via API "calls" to the FDC by MSO network processes tasked with gathering load, configuration, or other data).

In one implementation, the MSO subscriber or client database may also optionally include the provisioning status of the particular $CU_{fe}$ or DU that is associated with (i.e., which provides service to) an MSO subscriber.

It will be appreciated that any number of physical configurations of the FDC 218 may be implemented consistent with the present disclosure. As noted above, the functional "split" between DU's and CU has many options, including those which may be invoked dynamically (e.g., where the functionality may reside in both one or more DUs and the corresponding CUe, but is only used in one or the other at a time based on e.g., operational conditions); as such, FDC functionality may also be distributed or split in similar fashion, as described elsewhere herein.

$CU_{fe}$ Apparatus—

Figure 7:
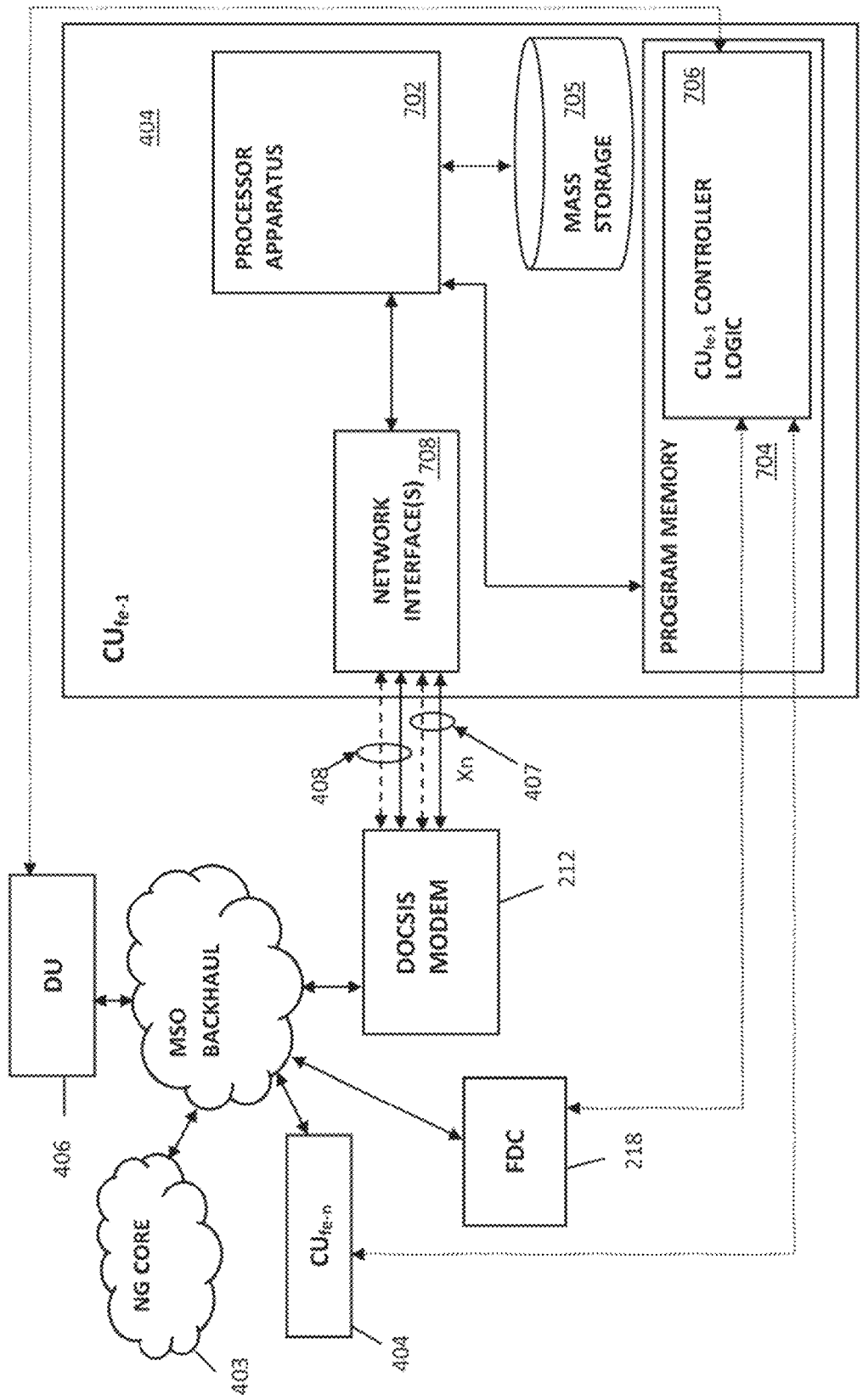
FIG. 7 is a functional block diagram illustrating a first exemplary embodiment of an enhanced NR fragmentation-enabled central(ized) unit ($CU_{fe}$) apparatus useful with various embodiments of the present disclosure.

FIG. 7 illustrates a block diagram of an exemplary embodiment of a $CU_{fe}$ 404 apparatus, useful for operation in accordance with the present disclosure.

In one exemplary embodiment as shown, the $CU_{fe}$ 404 includes, inter alia, a processor apparatus or subsystem 702, a program memory module 704, $CU_{fe}$ controller logic 706 (here implemented as software or firmware operative to execute on the processor 702), network interfaces 710 for communications and control data communication with the relevant DU's 406, and a communication with the NG Core 403 and FDC 218 as shown in FIGS. 4a-4f, as well as with other gNBs via the Xn interface 407.

In one exemplary embodiment, the $CU_{fe}$'s 404 are maintained by the MSO and are each configured to utilize a non-public IP address within an IMS/Private Management Network "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet, but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a $CU_{fe}$ "spoof" or MITM attack whereby an attacker might attempt to hijack one or more $CU_{fe}$ to obtain data from the corresponding DU's (or even CPE or UE's utilizing the DU's).

Although the exemplary $CU_{fe}$ 404 may be used as described within the present disclosure, those of ordinary skill in the related arts will readily appreciate, given the present disclosure, that the "centralized" controller unit 404 may in fact be virtualized and/or distributed within other network or service domain entities (e.g., within one of the DU 406 of a given gNB 402, within the NG Core 403 or an MSO entity such as a server, a co-located eNB, etc.), and hence the foregoing apparatus 404 of FIG. 7 is purely illustrative.

In one embodiment, the processor apparatus 702 may include one or more of a digital signal processor, microprocessor, field-programmable gate array, or plurality of processing components mounted on one or more substrates. The processor apparatus 702 may also comprise an internal cache memory. The processing subsystem is in communication with a program memory module or subsystem 704, where the latter may include memory which may comprise, e.g., SRAM, flash and/or SDRAM components.

The memory module 704 may implement one or more of direct memory access (DMA) type hardware, so as to facilitate data accesses as is well known in the art. The memory module of the exemplary embodiment contains one or more computer-executable instructions that are executable by the processor apparatus 702. A mass storage device (e.g., HDD or SSD, or even NAND flash or the like) is also provided as shown.

The processor apparatus 702 is configured to execute at least one computer program stored in memory 704 (e.g., the logic of the $CU_{fe}$ including content fragmentation and distribution/key management in the form of software or firmware that implements the various functions described herein). Other embodiments may implement such functionality within dedicated hardware, logic, and/or specialized co-processors (not shown).

In one embodiment, the $CU_{fe}$ 404 is further configured to register known downstream devices (e.g., access nodes including DU's 406, other $CU_{fe}$ devices), and centrally control the broader gNB functions (and any constituent peer-to-peer sub-networks or meshes). Such configuration include, e.g., providing network identification (e.g., to DU's, gNBs, client devices such as roaming MNO UEs, and other devices, or to upstream devices such as MNO or MSO NG Core portions 403 and their entities, or the FDC 218), and managing capabilities supported by the gNB's NR RAN.

The $CU_{fe}$ may further be configured to directly or indirectly communicate with one or more authentication, authorization, and accounting (AAA) servers of the network, such as via the interface 708 shown in FIG. 7. The AAA servers, whether locally maintained by the MSO or remotely by e.g., an MNO of the subscriber, are configured to provide services for, e.g., authorization and/or control of network subscribers (including roaming MNO "visitors") for controlling access and enforcing policies, auditing usage, and providing the information necessary to bill for services.

nSTB Apparatus—

Figure 8:
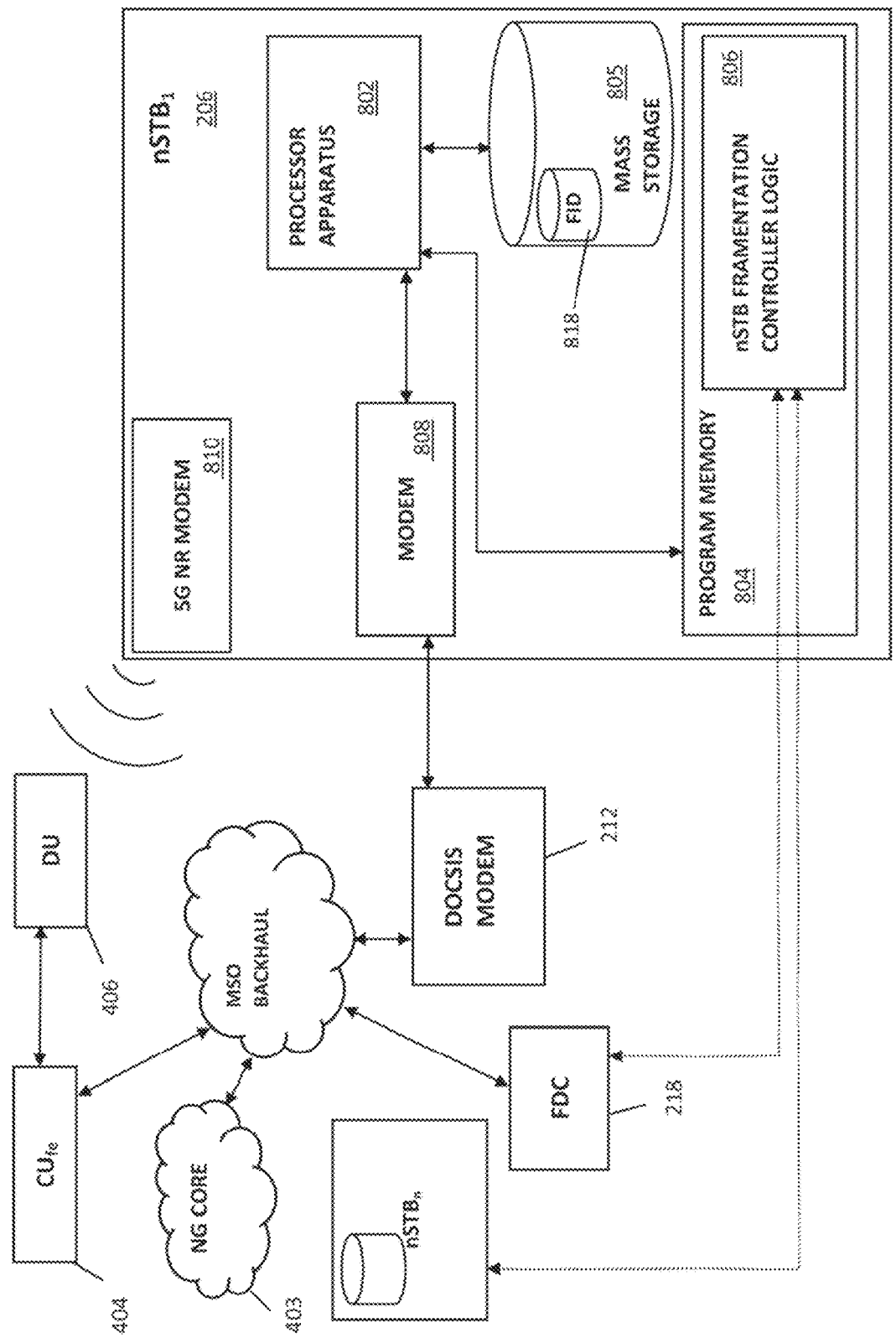
FIG. 8 is a functional block diagram illustrating a first exemplary embodiment of an enhanced 5G fragmentation-enabled nSTB apparatus useful with various embodiments of the present disclosure.

FIG. 8 illustrates a block diagram of an exemplary embodiment of an nSTB apparatus 206, useful for operation in accordance with the present disclosure.

In one exemplary embodiment as shown, the nSTB 206 includes, inter alia, a processor apparatus or subsystem 802, a program memory module 804, nSTB fragmentation controller logic 806 (here implemented as software or firmware operative to execute on the processor 802), a DOCSIS network interface for communication with the host service provider (e.g., cable MSO) network including the backhaul and FDC 218, and 5 g NR modem 810 for communications and control data communication with the relevant DUs 406 (i.e., for file fragment sourcing/sinking).

In one exemplary embodiment, the nSTBs 206 are maintained by the MSO and are each configured to utilize an IP address within the MSO network, which is related to the nSTB_ID previously described (the latter being used for fragmentation location identification, the former being used for network-layer addressing of the nSTB within the MSO network).

In one embodiment, the processor apparatus 802 may include one or more of a digital signal processor, microprocessor, field-programmable gate array, or plurality of processing components mounted on one or more substrates. The processor apparatus 802 may also comprise an internal cache memory. The processing subsystem is in communication with a program memory module or subsystem 804, where the latter may include memory which may comprise, e.g., SRAM, flash and/or SDRAM components. The memory module 804 may implement one or more of direct memory access (DMA) type hardware, so as to facilitate data accesses as is well known in the art. The memory module of the exemplary embodiment contains one or more computer-executable instructions that are executable by the processor apparatus 802. A mass storage device (e.g., HDD or SSD, or even NAND flash or the like) is also provided as shown, which in the illustrated embodiment includes the FID 818 which maintains the various FITs 251 as previously described.

The processor apparatus 802 is configured to execute at least one computer program stored in memory 804 (e.g., the logic of the nSTB including FIT receipt and management, content reassembly and key management in the form of software or firmware that implements the various functions described herein). Other embodiments may implement such functionality within dedicated hardware, logic, and/or specialized co-processors (not shown). As previously described, the controller logic 806 is also in logical communication with the FDC 218, as well as other participating nSTBs 206 within the relevant cluster(s). It will be appreciated that while a given nSTB participates in one cluster, it may also (concurrently or in the alternative, depending on how the logic 806 is configured) participate in one or more other clusters within the network as established by the FDC 218.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computerized network apparatus configured to enable fragmentation of digital content elements into a plurality of fragments, and distribution of the plurality of fragments to a plurality of 5G NR (New Radio) enabled client devices, the computerized network apparatus comprising:

digital processor apparatus;
data interface apparatus in data communication with the digital processor apparatus and a digital content element store;
data storage apparatus in data communication with the digital processor apparatus and configured to store at least one database, the at least one database comprising data relating to the fragmentation of the digital content elements; and
program storage apparatus in data communication with the digital processor apparatus and comprising at least one computer program, the at least one computer program configured to, when executed by the digital processor apparatus:
  obtain a first one of the digital content elements via the data interface apparatus;
  fragment the obtained first one of the content elements into a plurality of fragments according to a fragmentation algorithm, the fragmentation comprising division of the obtained first one of the content elements based at least on a maximum fragment size, wherein the maximum fragment size is based on a first value associated with a buffer playback duration compared to a second value associated with a buffer download time;
  create a logical cluster comprising a subset of the 5G NR enabled client devices; and
  cause distribution of the plurality of fragments of the obtained first one of the content elements to two or more of the subset of the 5G NR enabled client devices according to a distribution algorithm.

2. The computerized network apparatus of claim 1, wherein:
the fragmentation algorithm comprises an algorithm which performs the fragmentation based at least on:
(i) a minimum fragment size comprising:
$F_{min} \geq F_c/2$ Mbits; and
(ii) the maximum fragment size comprising:
$F_{max} \leq \text{Minimum}(P \cdot V, u \cdot U \cdot L)$ Mbits;
wherein:
$Fc$ comprises a size in Mb of the obtained first digital content element;
$P$ comprises the buffer playback duration in seconds;
$L$ comprises the buffer download time in seconds;
$V$ comprises a maximum bitrate required for the obtained first digital content element, in Mbit/s;
$U$ comprises an available mean upload speed for the two or more of the subset of 5G NR client devices, in Mbit/s (e.g. 100 Mbit/s); and
$u$ comprises a percentage of $U$ that may be used for sharing content with others of the two or more of the subset of 5G NR client devices.

3. The computerized network apparatus of claim 1, wherein:
the distribution algorithm comprises an algorithm which performs the distribution based at least on:
each the subset of the of 5G NR client devices receiving less than all of the plurality of fragments of the obtained first one of the digital content elements;
each of the subset of the of 5G NR client devices receiving at least one of the plurality of fragments of the obtained first one of the digital content elements; and
one or more of the subset of the of 5G NR client devices receiving at least two of the plurality of fragments of the obtained first one of the digital content elements.

4. The computerized network apparatus of claim 1, wherein the data relating to fragmentation of the digital content elements comprises a plurality of fragmentation indexes, the fragmentation indexes each comprising at least: (i) data indicating the at least two or more of the subset of the 5G NR enabled client devices to which fragments of a corresponding digital content file have been distributed, and (ii) data correlating ones of a plurality of fragments of the corresponding digital content file to individual ones of the at least two or more of the subset of the 5G NR enabled client devices to which they have been distributed.

5. The computerized network apparatus of claim 1, further comprising a content packaging entity configured to at least: (i) process the plurality of fragments of the obtained first digital content element into individually transmissible data elements; and (ii) include with each of the individually transmissible data elements, index data correlating ones of the plurality of fragments of the first digital content element to individual ones of the at least two or more of the subset of the 5G NR enabled client devices to which they have been or are to be distributed.

6. Computerized client apparatus configured to support fragmented content element reassembly, the computerized client apparatus comprising:
digital processor apparatus;
data interface apparatus in data communication with the digital processor apparatus and digital content distribution network;
wireless data interface apparatus in data communication with the digital processor apparatus and configured to communicate data with a wireless network node;
data storage apparatus in data communication with the digital processor apparatus and configured to store (i) at least one database, the at least one database comprising data relating to fragmentation of one or more digital content elements; and (ii) at least one of a plurality of fragments of a fragmented digital content element; and
program storage apparatus in data communication with the digital processor apparatus and comprising at least one computer program, the at least one computer program configured to, when executed by the digital processor apparatus:
  obtain via the data interface apparatus, the at least one of a plurality of fragments of the fragmented digital content element;
  store the obtained at least one of a plurality of fragments in the data storage apparatus;
  obtain via the data interface apparatus, data relating to a fragmentation scheme used to fragment the fragmented digital content element;
  store the obtained data relating to the fragmentation scheme in the data storage apparatus;
  receive data corresponding to a request for access to the digital content element, the request initiated by a user of the computerized client apparatus;
  based at least on the received data corresponding to the request, access both: (i) the stored at least one fragment; and (ii) the stored data relating to the fragmentation scheme;
  based at least on the accessed stored data relating to the fragmentation scheme, causing access via at least the wireless data interface apparatus of at least one other computerized client apparatus, the at least one other computerized client apparatus comprising one or more of the plurality of fragments of the fragmented digital content element;

utilize at least (i) the one or more of the plurality of fragments of the fragmented digital content element, and (ii) the stored obtained at least one of a plurality of fragments, to reassemble the fragmented digital content element; and cause decode and rendering of the reassembled fragmented digital content element to service the request;

wherein the fragmentation scheme is based at least on a maximum fragment size, and the maximum fragment size is less than or equal to the minimum value of: (i) a buffer playback duration multiplied by a maximum bitrate required for the content element, and (ii) a buffer download time multiplied by available mean upload speed for the computerized client apparatus and the at least one other computerized client apparatus multiplied by a percentage of the available mean upload speed that can be used for sharing content with additional computerized client apparatus.

7. The computerized client apparatus of claim 6, wherein the wireless data interface apparatus comprises a 5G NR (New Radio) compliant wireless data interface having a maximum prescribed latency, and the access of one or more of the plurality of fragments of the fragmented digital content element from the at least one other computerized client apparatus is configured to occur within a second maximum prescribed latency, the second maximum prescribed latency being greater in magnitude than the first maximum prescribed latency.

8. The computerized client apparatus of claim 7, wherein the computerized client apparatus and the at least one other computerized client apparatus comprise members of a designated cluster of computerized client apparatus which are selected based at least in part on being able to at least meet the first maximum prescribed latency.

9. The computerized client apparatus of claim 7, wherein the computerized client apparatus and the at least one other computerized client apparatus comprise members of a designated cluster of computerized client apparatus, all of the fragments of the fragmented digital content element being distributed to only members of the designated cluster.

10. The computerized client apparatus of claim 6, wherein the computerized client apparatus and the at least one other computerized client apparatus comprise common public key encryption data, the common public key encryption data enabling the computerized client device to decrypt the accessed one or more of the plurality of fragments of the fragmented digital content element, and the stored obtained at least one fragment, so as to enable said reassembly.

11. The computerized client apparatus of claim 6, wherein the obtained data relating to the fragmentation scheme comprises a file index table, the file index table comprising a plurality of data correlating each of the plurality of fragments of the fragmented digital content element with one or more locations thereof.

12. A computerized method of operating a content distribution network, comprising:
(i) fragmenting a digital content element according to a fragmentation algorithm to produce a plurality of fragments, wherein the fragmenting of the digital content element according to the fragmentation algorithm comprises fragmenting the digital content element according to at least a maximum fragment size, the maximum fragment size characterized by at least an initial video buffer size and a capacity of an uplink;
(ii) causing distribution of the plurality of fragments to a plurality of different edge storage devices; and (iii) enabling one or more inter-edge device communication channels to enable re-assembly of the plurality of fragments from two or more of the plurality of different edge storage devices into the digital content element such that the digital content element can be decoded and rendered.

13. The computerized method of claim 12, wherein:
the digital content element comprises a digitally encoded content file;
the fragmenting comprises division of the digitally encoded content file based further on a minimum fragment size;
the minimum fragment size comprises:
$F_{min} \geq Fc/2$ Mbits;
the maximum fragment size comprises:
$F_{max} \leq \mathrm{Minimum}(P \bullet V, u \bullet U \bullet L)$ Mbits;
and wherein:
Fc comprises a size in Mb of the digitally encoded content file;
P comprises a buffer playback duration in seconds;
L comprises a buffer download time in seconds;
V comprises a maximum bitrate required for the digitally encoded content file, in Mbit/s;
U comprises an available mean upload speed for the two or more of the plurality of different edge storage devices, in Mbit/s (e.g. 100 Mbit/s); and
u comprises a percentage of U that may be used for sharing content with others of the two or more of the plurality of different edge storage devices.

14. The computerized method of claim 12, wherein the causing the distribution of the plurality of fragments to the plurality of different edge storage devices comprises distributing the plurality of fragments such that no individual one of the plurality of different edge storage devices has all of the plurality of fragments.

15. The computerized method of claim 14, wherein distributing the plurality of fragments such that no individual one of the plurality of different edge storage devices has all of the plurality of fragments comprises at least (i) causing distribution of a first of the plurality of fragments to a first one of the plurality of different edge storage devices, and (ii) causing distribution of any remaining undistributed ones of the plurality of fragments such that each of the plurality of different edge storage devices has at least one of the plurality of fragments distributed thereto before any subsequent fragment distribution.

16. The computerized method of claim 15, wherein the causing distribution of the plurality of fragments to the plurality of different edge storage devices further comprises:
defining a cluster of participating ones of the plurality of different edge storage devices;
distributing the first of the plurality of fragments to the first one of the plurality of different edge storage devices of the cluster;
distributing a second of the plurality of fragments to a second one of the plurality of different edge storage devices of the cluster; and
distributing a third and subsequent ones of the plurality of fragments respectively to a third and subsequent ones of the plurality of different edge storage devices of the cluster until all of the fragments have been distributed.

17. The computerized method of claim 16, wherein the distributing the third and subsequent ones of the plurality of fragments respectively to the third and subsequent ones of the plurality of different edge storage devices of the cluster until all of the plurality of fragments have been distributed comprises distributing any remaining undistributed ones of the plurality of fragments beginning again with the first one of the plurality of different edge storage devices, after each of the plurality of different edge storage devices of the cluster has at least one of the plurality of fragments distributed thereto.

18. The computerized method of claim 12, further comprising defining a cluster of participating ones of the plurality of different edge storage devices; and
  wherein the enabling one or more inter-edge device communication channels to enable re-assembly of the plurality of fragments from two or more of the plurality of different edge storage devices into the digital content element such that the digital content element can be decoded and rendered comprises:
    establishing a communication channel between a first 5G New Radio (5G NR) distributed unit (DU) and a first of the plurality of different edge storage devices of the cluster;
    establishing a communication channel between a second 5G New Radio (5G NR) distributed unit (DU) and a second of the plurality of different edge storage devices of the cluster, the second of the different edge storage devices having at least one of the plurality of fragments which the first of the plurality of different edge storage devices does not possess; and
    causing transmission of the at least one of the plurality of fragments from the second of the plurality of different edge storage devices to the first of the plurality of different edge storage devices;
  wherein at least the transmission is performed so as to meet at least one of a QoS (quality of service) or latency requirement associated with the decode and rendering of the content element.

19. The computerized method of claim 18, wherein the defining a cluster of participating ones of the plurality of different edge storage devices comprises defining a cluster based at least in part on an evaluation of at least the first distributed unit (DU) and the second DU being able to meet the at least one of the QoS (quality of service) or the latency requirement.

20. The computerized method of claim 12, further comprising:
  generating index data correlating ones of the plurality of fragments of the digital content element to individual ones of the at least two of the plurality of different edge storage devices to which they have been or are to be distributed; and
  transmitting at least the index data to each of the at least two of the plurality of different edge storage devices for storage thereon, the transmitted index data configured to enable each of the at least two of the plurality of different edge storage devices to perform said reassembly of the plurality of fragments without having to contact a network server.

* * * * *